(12) United States Patent
Ono et al.

(10) Patent No.: US 7,420,544 B2
(45) Date of Patent: *Sep. 2, 2008

(54) INFORMATION PROCESSING APPARATUS AND INFORMATION PROCESSING METHOD

(75) Inventors: Kenichi Ono, Tokyo (JP); Hidenori Yamaji, Tokyo (JP)

(73) Assignee: Sony Corporation, Tokyo (JP)

( * ) Notice: Subject to any disclaimer, the term of this patent is extended or adjusted under 35 U.S.C. 154(b) by 685 days.

This patent is subject to a terminal disclaimer.

(21) Appl. No.: 10/235,662

(22) Filed: Sep. 6, 2002

(65) Prior Publication Data

US 2003/0067446 A1 Apr. 10, 2003

(30) Foreign Application Priority Data

Sep. 7, 2001 (JP) ............................. 2001-272742
Aug. 13, 2002 (JP) ............................. 2002-235503

(51) Int. Cl.
*G06F 3/02* (2006.01)
(52) U.S. Cl. ...................................... 345/172; 708/145
(58) Field of Classification Search ................ 345/168, 345/169, 171, 172; 710/104; 400/489; 708/145
See application file for complete search history.

(56) References Cited

U.S. PATENT DOCUMENTS

| | | | | |
|---|---|---|---|---|
| 5,485,614 A | * | 1/1996 | Kocis et al. ................. | 345/168 |
| 5,754,798 A | * | 5/1998 | Uehara et al. ............... | 710/104 |
| 5,867,729 A | * | 2/1999 | Swonk ....................... | 345/172 |
| 5,973,688 A | * | 10/1999 | May ........................... | 345/172 |
| 6,011,495 A | * | 1/2000 | Chen .......................... | 345/172 |
| 6,078,323 A | * | 6/2000 | Gest ........................... | 345/172 |

(Continued)

FOREIGN PATENT DOCUMENTS

JP 6-103019 A 4/1994

(Continued)

OTHER PUBLICATIONS

Walkowiak, Diane Kaye; "Using Accessibility Options in Windows 95", Smart Computing, Feb. 1997, vol. 8 Issue 2.*

(Continued)

*Primary Examiner*—Sumati Lefkowitz
*Assistant Examiner*—William L Boddie
(74) *Attorney, Agent, or Firm*—Oblon, Spivak, McClelland, Maier & Neustadt, P.C.

(57) ABSTRACT

A new-type user interface for providing a hotkey is disclosed, which has high operability and which can also be used to provide the hotkey in a conventional manner. In information processing apparatus has a hierarchical structure including a keyboard as one of hardware parts in a bottom layer, a built-in controller as one of hardware parts in a layer higher than the keyboard, and an operating system and an application program as software part in a layer higher than the built-in controller, wherein the operating system and the application program are connected to the built-in controller via a bus. In this information processing apparatus, if an Fn key is pressed and released, information indicating that the Fn key has been pressed and released is supplied to a utility via an SPIC which is logically different from the keyboard controller. In response, a launcher including hotkey menu icons corresponding to additional keys is displayed on a display.

26 Claims, 29 Drawing Sheets

U.S. PATENT DOCUMENTS

| | | | |
|---|---|---|---|
| 6,469,694 B1 * | 10/2002 | Mikan | 345/168 |
| 6,712,535 B2 * | 3/2004 | McLoone et al. | 400/489 |
| 2003/0058215 A1 | 3/2003 | Yamaji et al. | |
| 2003/0067446 A1 * | 4/2003 | Ono et al. | 345/172 |

FOREIGN PATENT DOCUMENTS

| | | | |
|---|---|---|---|
| JP | 6-103210 A | | 4/1994 |
| JP | 11-7357 A | | 1/1999 |
| JP | 2000-194545 A | | 7/2000 |
| JP | 2000-214990 | | 8/2000 |
| JP | 2000214990 A | * | 8/2000 |
| JP | 2001-202188 A | | 7/2001 |
| JP | 2002-366290 A | | 12/2002 |

OTHER PUBLICATIONS

Emiko Madoka, "Please Take Care of Ease of Use," Tomorrow's Windows 98 Q & A No. 12, PCfan, vol. 6, No. 7, Japan, Mainichi Communications Co., Ltd., Apr. 15, 1999, vol. 6 pp. 106-107.

Kentaro Akasaka, "Entire Review From the Basic Tool to the Special Technique," Technique of Window's Configuration Set Up, DOS/V Magazine, vol. 10, No. 6, Japan, Softbank Publishing Co., Ltd., Mar. 15, 20001, vol. 10 pp. 153 and 308.

* cited by examiner

FIG. 28

| POWER STATE | ENABLED/DISABLED STATE | LOCKED/UNLOCKED STATE |
|---|---|---|
| ACTIVE STATE → STANDBY STATE | HOLD THE CURRENT STATE | SWITCH INTO THE UNLOCKED STATE |
| ACTIVE STATE → SLEEP STATE | SWITCH INTO THE DISABLED STATE | SWITCH INTO THE UNLOCKED STATE |
| STANDBY STATE → ACTIVE STATE | HOLD THE CURRENT STATE | SWITCH INTO THE UNLOCKED STATE |
| SLEEP STATE → ACTIVE STATE | SWITCH INTO THE DISABLED STATE | SWITCH INTO THE UNLOCKED STATE |

FIG. 29

| KEYBOARD BIOS | UTILITY | OPERATION OF KEYBOARD BIOS | OPERATION OF THE UTILITY | Fn KEY LOCKING MECHANISM |
|---|---|---|---|---|
| NEW | NEW | INFORM THE UTILITY THAT THE KEYBOARD BIOS IS OF THE NEW TYPE AND RESPONDS, AS THE NEW-TYPE KEYBOARD BIOS, TO A COMMUNICATION REQUEST FROM THE UTILITY | RECOGNIZE THAT THE KEYBOARD BIOS IS OF THE NEW TYPE | ADAPTED |
| NEW | CONVENTIONAL | NO COMMUNICATION REQUEST IS TRANSMITTED FROM THE UTILITY, AND THUS THE BIOS BEHAVES AS A CONVENTIONAL-TYPE BIOS | NO OPERATION | NOT ADAPTED |
| CONVENTIONAL | NEW | THE BIOS CANNOT RESPOND TO A QUERY FROM THE UTILITY | RECOGNIZE THAT THE KEYBOARD BIOS IS OF THE CONVENTIONAL TYPE | NOT ADAPTED |
| CONVENTIONAL | CONVENTIONAL | NO OPERATION | NO OPERATION | NOT ADAPTED |

INFORMATION PROCESSING APPARATUS AND INFORMATION PROCESSING METHOD

BACKGROUND OF THE INVENTION

1. Field of the Invention

The present invention relates to an information processing apparatus and an information processing method for performing a specific process in response to pressing a combination of a predetermined specific key and one of predetermined additional keys.

2. Description of the Related Art

In recent years, information processing apparatuses such as personal computers have become very popular in a wide variety of applications. The information processing apparatuses have various high capabilities depending on requirements of users. With increasingly expansion of requirements for capabilities of information processing apparatus, the manners of operating an input device such as a keyboard or a mouse are also expanding.

Among such operation methods using various types of input apparatuses, a hotkey is known as a method to perform a specific process in response to pressing a specific combination of keys. An example of a hotkey is that achieved by pressing one of particular alphanumeric keys or function keys labeled "F1", "F2", . . . , etc., on a keyboard while holding down a Fn key labeled "Fn" on the keyboard.

The Fn key is provided on an information processing apparatus, such as a notebook personal computer, which is limited in area for disposing a keyboard thereon. For example, some keys, such as keys for scrolling a screen up and down, which are usually provided in desktop personal computers, are not provided in some personal computers. In such a case, the Fn key can be used to realize a function equivalent to the function of a missing key. More specifically, the equivalent function is provided when the Fn key and another specific key are simultaneously pressed.

For example, a hotkey for controlling the volume of a speaker in hardware may be assigned to a combination of the Fn key and a function key labeled "F4" on the keyboard. As another example, a hotkey for controlling the brightness of a display may be assigned to a combination of the Fn key and a function key labeled "F5" on the keyboard.

In recent years, in various types of information processing apparatuses such as personal computers and associated apparatuses, from the viewpoint of barrier-free or universal design, it is required that apparatuses should be designed such that the apparatuses can be easily used not only by normal users but also physically disabled users.

From such the viewpoint, the hotkey is not necessarily a good user interface, because it is required to simultaneously press a plurality of keys and thus a physically disabled user, such as one who has lost some finger or who has only one arm, cannot easily use the hotkey. Even for physically normal users, the hotkey is difficult to use, if users have small hands.

Another problem is that necessity of simultaneously pressing a plurality of keys makes it difficult to conceptually understand the hotkey. Furthermore, the increase in the number of keys to be pressed causes the operation to become complicated.

In view of the above, an object of the present invention is to provide an information processing apparatus and an information processing method, in which both a conventional hotkey user interface and a new-type high-operability hotkey user interface are available so that many users can easily use a hotkey thereby providing high convenience to users.

SUMMARY OF THE INVENTION

According to an aspect of the present invention, there is provided an information processing apparatus having a capability of performing a specific process in response to pressing of a combination of a predetermined specific key and a predetermined additional key, the information processing apparatus comprising: key input means including a plurality of keys arranged thereon and including the specific key and the additional key; and control means for controlling the key input means and for controlling displaying, on the display means, various kinds of information including at least a user interface for presenting a specific menu including a specific process menu icon button assigned to the specific process corresponding to the additional key, wherein, in response to pressing or releasing of the specific key, the control means activates the user interface for presenting the specific menu and displays the user interface on the display means.

In this information processing apparatus, as described above, in response to pressing or releasing of the specific key, the control means activates the user interface for presenting the specific menu and displays the user interface on the display means.

The information processing apparatus according to the present invention may further comprise built-in control means for operating firmware so as to monitor the key input means to detect an input operation performed on the key input means, wherein the built-in control means includes first and second input/output ports which are logically different from each other and implemented in the built-in control means, the first input/output port having a capability of transmitting information to a higher-level system in response to pressing or releasing of a normal key other than the specific key on the key input means to notify the higher-level system that the normal key has been pressed or released, the second input/output port serving to communicate with the control means; and in response to pressing or releasing of the specific key, the built-in control means transmits, by operating the firmware and via the second input/output port, information indicating that the specific key has been pressed or released to a utility which is software executed by the control means to control the key input means and control displaying, on the display means, various kinds of information including the user interface for presenting the specific menu.

In this information processing apparatus, the built-in control means operates firmware so as to inform the utility via the second input/output port that the specific key has been pressed or released, and the control means operates the utility so as to activate the user interface for presenting the specific menu and display the user interface on the display means.

In the information processing apparatus according to the present invention, the built-in control means may perform a process associated with a specific key locking mechanism having a locked state in which the specific key is equivalently kept pressed down although the specific key is not actually pressed down and also having an unlocked state in which the specific key is equivalently not pressed; and the control means may display, on the display means, the user interface which indicates at least the state of the specific key locking mechanism.

In the information processing apparatus according to the present invention, the control means may detect the state of the built-in control means via the second input/output port, and the control means may set the built-in control means into either an enabled state in which the specific key locking mechanism is enabled or a disabled state in which the specific key locking mechanism is disabled.

In the information processing apparatus according to the present invention, the built-in control means may operate the firmware so as to perform a process associated with the specific key locking mechanism, and the control means may operate the utility so as to detect the state of the firmware via the second input/output port and to set the firmware into either the enabled state or the disabled state.

In the information processing apparatus, the control means may display, on the display means, a user interface for setting the specific key locking mechanism into the enabled state or the disabled state.

That is, in this information processing apparatus according to the present invention, the user interface for setting the specific key locking mechanism into the enabled state or the disabled state is displayed on the display means under the control of the control means.

In the information processing apparatus according to the present invention, when the specific key locking mechanism is in the enabled state, the control means may display, on the display means, the state indication user interface so as to indicate that the specific key locking mechanism is in the enabled state.

That is, in this information processing apparatus according to the present invention, when the specific key locking mechanism is in the enabled state, the state indication user interface indicating that the specific key locking mechanism is in the enabled state is displayed on the display means under the control of the control means.

In the information processing apparatus according to the present invention, when the specific key locking mechanism is in the disabled state, the control means may not display the state indication user interface on the display means, or the control means may display, on the display means, the state indication user interface indicating that the specific key locking mechanism is in the disabled state.

That is, in this information processing apparatus according to the present invention, when the specific key locking mechanism is in the disabled state, under the control of the control means, the state indication user interface is not displayed on the display means or the state indication user interface indicating that the specific key locking mechanism is in the disabled state is displayed on the display.

According to another aspect of the present invention, there is provided an information processing method for performing a specific process in response to pressing of a combination of a predetermined specific key and a predetermined additional key, the information processing method comprising the steps of controlling key input means and controlling displaying, on display means, various kinds of information including at least a user interface for presenting a specific menu including a specific process menu icon button assigned to the specific process corresponding to the additional key; and in response to pressing or releasing of the specific key disposed on key input means including a plurality of keys arranged thereon and including the specific key and the additional key, activating the user interface for presenting the specific menu and displaying the user interface on the display means.

That is, in this information processing method according to the present invention, as described above, in response to pressing or releasing of the specific key, the control means activates the user interface for presenting the specific menu and displays the user interface on the display means.

The information processing method according to the present invention may further comprising the steps of monitoring, by operating firmware, the key input means to detect an input operation performed on the key input means; and in response to detecting that the specific key has been pressed or released, notifying the utility that the specific key has been pressed or released, via a second input/output port for communicating with a utility which is software for controlling the key input means and display means on which various kinds of information including the user interface for presenting the specific menu are displayed, the second input/output port being logically different from a first input/output port having a capability of transmitting information to a higher-level system in response to pressing or releasing of a normal key, on the key input means, other than the specific key to notify the higher-level system that the normal key has been pressed or released.

That is, in this information processing method according to the present invention, in response to pressing or releasing the specific key, the firmware is operated so as to inform the utility via the second input/output port that the specific key has been pressed or released, and the utility is operated so as to activate the user interface for presenting the specific menu and display the user interface on the display means.

In the information processing method according to the present invention, the firmware may be operated so as to perform a process associated with a specific key locking mechanism having a locked state in which the specific key is equivalently kept pressed down although the specific key is not actually pressed down and also having an unlocked state in which the specific key is equivalently not pressed; and the user interface indicating at least the state of the specific key locking mechanism may be displayed on the display means.

Furthermore, in the information processing method according to the present invention, the utility may be operated so as to detect the state of the firmware via the second input/output port and set the firmware into either an enabled state in which the specific key locking mechanism is enabled or a disabled state in which the specific key locking mechanism is disabled.

That is, in this information processing method according to the present invention, the firmware is operated so as to perform the process associated with the specific key locking mechanism, and the utility is operated so as to detect the state of the firmware via the second input/output port and to set the firmware into either the enabled state or the disabled state.

In this information processing method according to the present invention, the utility may be operated so as to display, on the display means, a user interface for setting the specific key locking mechanism into the enabled state or the disabled state.

That is, in this information processing method according to the present invention, the user interface for setting the specific key locking mechanism into the enabled state or the disabled state is displayed on the display means under the control of the utility.

In this information processing method according to the present invention, if the specific key locking mechanism is in the enabled state, the utility may be operated so as to display, on the display means, a state indication user interface indicating that the specific key locking mechanism is in the enabled state.

That is, in this information processing method according to the present invention, if the specific key locking mechanism is in the enabled state, the state indication user interface indicating that the specific key locking mechanism is in the enabled state is displayed on the display means under the control of the utility.

In this information processing method according to the present invention, if the specific key locking mechanism is in the disabled state, the utility is operated so as to not display the state indication user interface on the display means or so as to display, on the display means, the state indication user interface indicating that the specific key locking mechanism is in the disabled state.

That is, in this information processing method according to the present invention, if the specific key locking mechanism is in the disabled state, the utility is operated such that the state indication user interface is not displayed on the display means or the state indication user interface indicating that the specific key locking mechanism is in the disabled state is displayed on the display means.

BRIEF DESCRIPTION OF THE DRAWINGS

FIG. 28 is a table showing state transitions of the Fn key locking mechanism, which occur in response to various changes in the state of a power supply;

FIG. 29 is a table showing backward compatibility of the information processing apparatus;

DESCRIPTION OF THE PREFERRED EMBODIMENTS

The present invention is described in further detail below with reference to embodiments in conjunction with the accompanying drawings.

Figure 1:
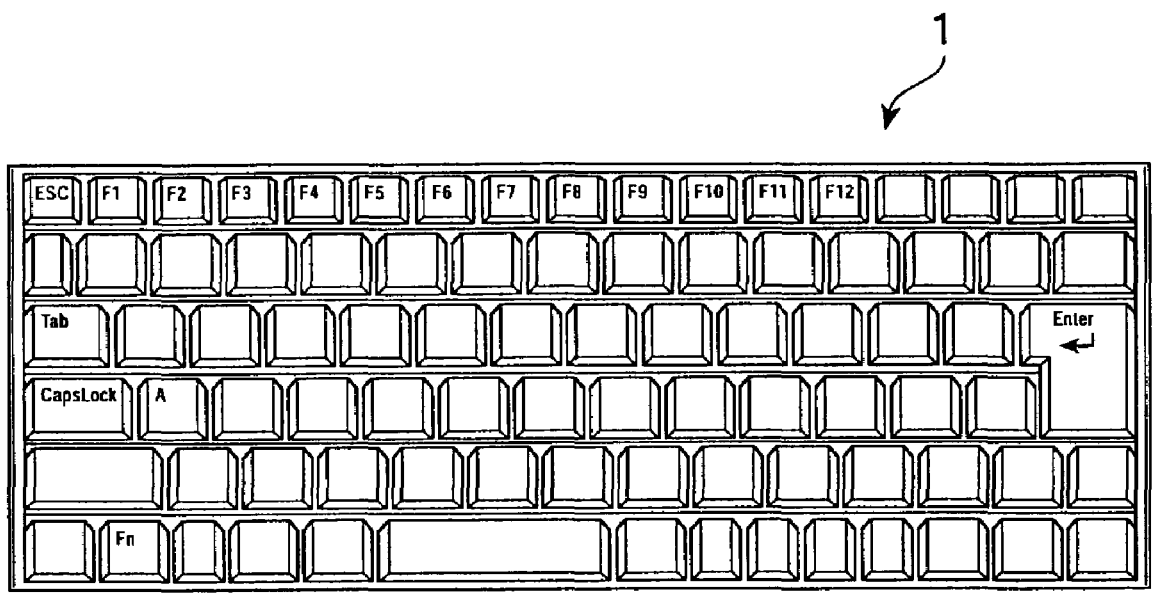
FIG. 1 is a plan view of a keyboard provided in an information processing apparatus according to an embodiment of the present invention.

In the embodiments described below, the information processing apparatus to which the present invention is applied is assumed to be a personal computer. The information processing apparatus includes, as shown in FIG. 1, a keyboard 1 serving as key input means having a plurality of keys arranged thereon. In this information processing apparatus, if a specific key is pressed in combination with an arbitrary additional key, a hotkey is provided as a user interface, that is, a specific process assigned to the combination of the specific key and the pressed additional key is performed.

More specifically, in this information processing apparatus, a key labeled "Fn" on the keyboard is used as the specific key for providing hotkeys. In conventional information processing apparatuses, a hotkey function is provided only when one of predetermined additional keys such as alphanumeric keys or function keys labeled "F1", "F2", and so on is pressed while holding down the Fn key. In the user interface according to the present invention, in contrast, a hotkey function is provided not only when a plurality of keys are simultaneously pressed in the above-described manner, but also when a plurality of keys are pressed separately one after another.

More specifically, in the present invention, the information processing apparatus can be in either a state in which the Fn key is regarded as being equivalently kept pressed down although the Fn key is not actually kept pressed down or a state in which the Fn key is regarded as not being pressed. When the information processing apparatus is in the state in which the Fn key is regarded as being equivalently kept pressed down, if an additionally key is singly pressed without simultaneously pressing the Fn key, a function equivalent to a normal hotkey function is provided.

Figure 2:
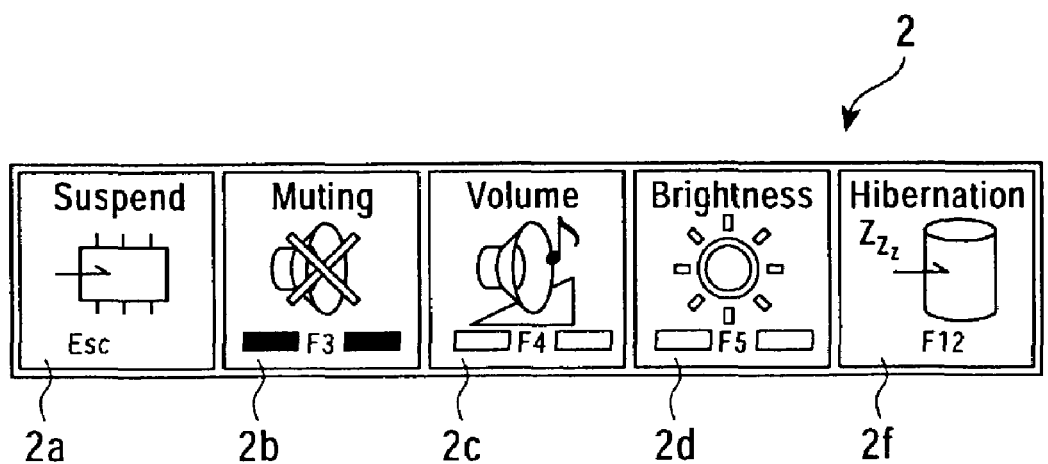
FIG. 2 is a diagram showing an example of a launcher displayed on a display of the information processing apparatus.

That is, in the present information processing apparatus, as shown in FIG. 2, a launcher 2 serving as a user interface for presenting a specific menu including hotkey menu icons 2*a*, 2*b*, 2*c*, 2*d*, and 2*f* serving as icon buttons for performing specific hotkey functions corresponding to the additional keys is displayed. A desired one of the hotkey menu icons 2*a*, 2*b*, 2*c*, 2*d*, and 2*f* in the launcher 2 can be directly selected by using a particular key such as cursor key (arrow key) or a Tab key on the keyboard serving as input operation means or by using a pointing device such as a mouse or a jog dial or the like. That is, in the present information processing apparatus, the hotkey function similar to the conventional one can be achieved by directly selecting one of the hotkey menu icons 2*a*, 2*b*, 2*c*, 2*d*, and 2*f* in the launcher 2 via the predetermined operation described above.

Hereinafter, the state in which the Fn key is regarded as being equivalently pressed although the Fn key is not actually pressed is referred to as a "locked state", and the state in which the Fn key is regarded as not being pressed is referred to as an "unlocked state". A mechanism which provides the locked state and the unlocked state is referred to as a Fn key locking mechanism. A state in which the Fn key locking mechanism is enabled is referred to as an "enabled state", and a state in which the Fn key locking mechanism is disabled is referred to as a "disabled state".

The Fn key is provided on a notebook personal computer or the like in which some keys which are usually provided in a desktop personal computer are not provided due to its limited space for installing a keyboard thereon. Therefore, the Fn key is not defined in the specifications for computers compatible with PC/AT (Personal Computer/Advanced Technology), and thus Fn key is not recognized by the operating system.

In view of the above, in the present information processing apparatus, although normal keys are handled by the BIOS (Basic Input/Output System), information associated with the Fn key, which cannot be recognized by a keyboard driver for driving a keyboard controller, is transmitted from the BIOS a lower level to a higher-level system via an input/output port different from the keyboard controller. The higher-level system can set the lower-level BIOS into either the enabled state or the disabled state described above.

More specifically, in the present information processing apparatus, the process associated with the Fn key locking mechanism is performed by the BIOS, and the higher-level system obtains information indicating the state of the BIOS performing the process associated with the Fn key locking mechanism, by performing communication with the BIOS via the input/output port different from the input/output port used by the keyboard controller. Furthermore, in the present information processing apparatus, unlike the conventional information processing apparatus in which the higher-level system cannot change the setting of the lower-level BIOS via the keyboard controller, the higher-level system can change the setting of the lower-level BIOS as to the state of the Fn key locking mechanism. This makes it possible for the present information processing apparatus to provide the user interface by which a hotkey function is provided in response to singly pressing a key or pointing to a single icon button, while the hotkey function is also provided when a plurality of keys are simultaneously pressed in the conventional manner.

In the present embodiment, by way of example, additional keys which can be used in conjunction with the Fn key to provide hotkeys include an escape key labeled "ESC", a function key labeled "F3", a function key labeled "F4", a function key labeled "F5", and a function key labeled "F12", which are all disposed on the keyboard.

More specifically, a hotkey assigned to a combination of the Fn key and the escape key provides a suspend function for saving working data and working status into a memory such as a RAM (Random Access Memory) and bringing the operation state into a standby state. A hotkey assigned to a combination of the Fn key and the function key labeled "F3" on the keyboard provides a muting function for muting a sound or voice output from a speaker which is one of hardware parts. A hotkey assigned to a combination of the Fn key and the function key labeled "F4" on the keyboard provides a volume control function for controlling the volume of the sound or voice output from the speaker. A hotkey assigned to a combination of the Fn key and the function key labeled "F5" on the keyboard provides a brightness control function for controlling the brightness of a display which will be described later. A hotkey assigned to a combination of the Fn key and the function key labeled "F12" on the keyboard provides a hibernation function for saving working data and working status onto an HDD (Hard Disk Drive) that will be described later and bringing the operation state into a sleep state.

In the present information processing apparatus, a launcher 2 is displayed as shown in FIG. 2, wherein the launcher 2 includes hotkey menu icon buttons 2a, 2b, 2c, 2d, and 2f for performing the suspend function, the muting function, the volume control function, the brightness control function, and the hibernation function, which are specific processes assigned to the respective additional keys, that is, the Esc key and function keys labeled "F3", "F4", "F5", and "F12".

The construction of the information processing apparatus is described below.

Figure 3:
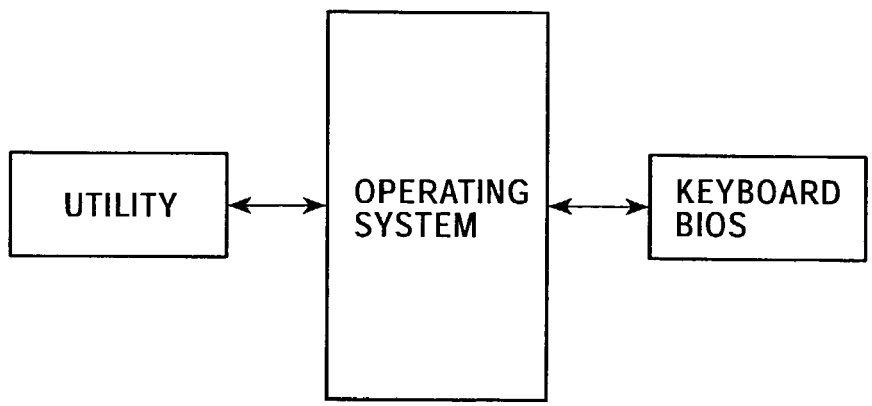
FIG. 3 is a block diagram showing a software configuration of the information processing apparatus.

As shown in FIG. 3, in the present information processing apparatus, software needed to realize the hotkey capability using the Fn key includes a utility and a keyboard BIOS, wherein the utility is software for controlling an input device such as a keyboard 1 and also for controlling a display, which will be described later, for displaying various kinds of information including at least the launcher 2 and a graphical user interface for indicating the state of the Fn key locking mechanism, and the keyboard BIOS is firmware for performing the process associated with the Fn key locking mechanism.

The utility is a program which is usually stored on the HDD, which is one of hardware parts, as will be described later. The utility is embedded in an application program in the higher-level system and is executed on a CPU (Central Processing Unit) which will be described later. The keyboard BIOS is a program stored in a ROM (Read Only Memory), described later, which is also one of hardware parts. The keyboard BIOS serves to interface between the keyboard 1 and the higher-level system and mange transmission of data between them. The keyboard BIOS is executed on a built-in controller which will be described later.

The utility may also be provided via a storage medium such as a compact disc or a via a transmission medium such as the Internet. The keyboard BIOS may also be provided by replacing a ROM disposed on a motherboard, which is one of hardware parts of the information processing apparatus.

In the present information processing apparatus, information associated with normal keys other than the Fn key is transmitted from the keyboard BIOS to the higher-level system via the keyboard driver embedded in the operating system. On the other hand, in the present information processing apparatus, because the Fn key is not recognized as a normal key by the operating system as described earlier, information associated with the Fn key is transmitted between the keyboard BIOS and the utility via a path different from the path for information associated with the normal keys.

Figure 4:
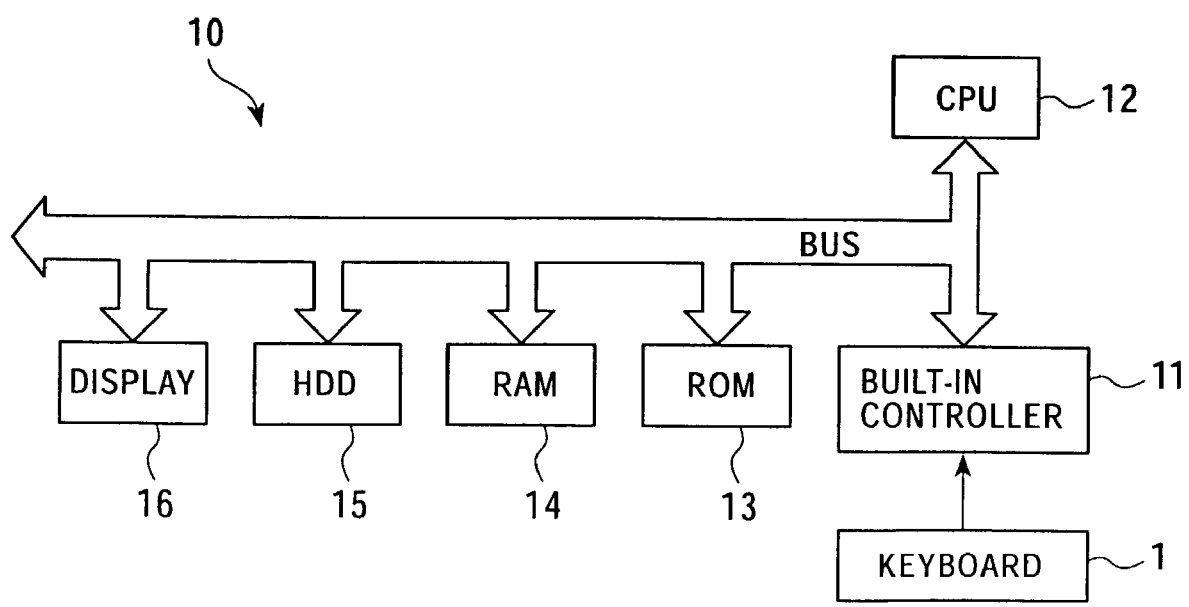
FIG. 4 is a block diagram showing a hardware configuration of the information processing apparatus.

The structure of the hardware of the information processing apparatus including the software described above is described in FIG. 4. As shown in FIG. 4, the information processing apparatus 10 includes, in addition to the keyboard 1 described above, a controller 11 serving as built-in control means for monitoring an input operation performed by a user on the keyboard 1 and controlling it, a CPU 12 serving as control means for generally controlling various parts of the information processing apparatus 10, a read-only-memory (ROM) 13 for storing information including various programs, a RAM 14 serving as a work area, an HDD 15 for writing and reading various programs and data, and a display 16 serving as display means for display various kinds of information, wherein the built-in controller 11, the CPU 12, the ROM 13, the RAM 14, the HDD 15, and the display 16 are connected to each other via a bus.

Although not shown in the figures, the information processing apparatus 10 may include a user interface of a type other than the keyboard 1, such as a mouse or a jog dial, as required. The information processing apparatus 10 may also include a communication unit for communicating with an external device and/or a drive for writing/reading various kinds of information on/from a removable storage medium.

The keyboard 1 includes keys arranged in the above-described manner. More specifically, the Fn key serving as the specific key is disposed in the bottom row, and additional keys including the Esc (escape) key and function keys are disposed in the top row. In the keyboard 1, identification numbers called scan codes are assigned to the respective keys. Furthermore, in the keyboard 1, two different scan codes are assigned to each key so that the scan codes indicate whether the key is pressed or released by a user. The built-in controller 11 periodically checks the keyboard 1 to detect whether some key has been pressed or released.

The built-in controller 11 operates the keyboard BIOS described above with reference to FIG. 5, and also manages the power supply of the information processing apparatus. Furthermore, the built-in controller 11 has capabilities of a keyboard controller 11a serving as a first input/output port and a programmable input/output control device (SPIC) 11b serving as a second input/output port, as will be described later. The built-in controller 11 periodically checks or monitors the keyboard 1 to detect pressing and releasing of keys. If the built-in controller 11 detects that an arbitrary key has been pressed, the built-in controller 11 detects the scan code of the pressed key and informs, by means of an interrupt and via a bus, the higher-level system running on the CPU 12 that the key has been pressed. Furthermore, the built-in controller 11 queries the keyboard 1 for information associated with the pressed key. Not only when the arbitrary key on the keyboard 1 is pressed, but also when the key is released, the built-in controller 11 acquires similar information. More specifically, if the built-in controller 11 detects that an arbitrary key has been released, the built-in controller 11 detects the scan code of the released key and informs, by means of an interrupt and via the bus, the higher-level system running on the CPU 12 that the key has been released. Furthermore, the built-in controller 11 queries the keyboard 1 for information associated with the released key.

The CPU 12 is connected via a bus to the built-in controller 11, the ROM 13, the RAM 14, the HDD 15, and the display 16. The CPU 12 serves to execute the operating system and various application programs stored in the ROM 13 or the HDD 15. In particular, the utility described earlier with reference to FIG. 3 is executed by the CPU 12. If the CPU 12 receives a message, from the built-in controller 11 via the bus, indicating that an arbitrary key has been pressed or released, the CPU 12 performs a process depending on which key has been pressed or released. In a particular case in which the Fn key has been pressed, the CPU 12 executes the utility to display the launcher 2 on the display 16. In a case in which a hotkey has been pressed or released, the CPU 12 executes the utility to display a specific graphical user interface on the display 16, as will be described later.

The ROM 13 stores information including various programs. In particular, the ROM 13 stores the keyboard BIOS described earlier. The keyboard BIOS stored in the ROM 13 is read and executed under the control of the built-in controller 11.

The RAM 14 serves as a work area used by the CPU 12 in execution of various programs. That is, the RAM temporarily stores various data under the control of the CPU 12.

The HDD 15 writes and/or reads various programs or data to/from a hard disk under the control of the CPU 12. In particular, the hard disk stores the above-described utilities and other various programs, which are read under the control of the CPU 12.

The display 16 is a device such as an LCD (Liquid Crystal Display) for displaying various kinds of information such as data stored on the HDD 15 under the control of the CPU 12. More specifically, in addition to displaying the launcher 2, the display 16 also displays, under the control of the CPU 12, a dialog box or a task tray icon serving as a graphical user interface associated with a hotkey using the Fn key.

Figure 5:
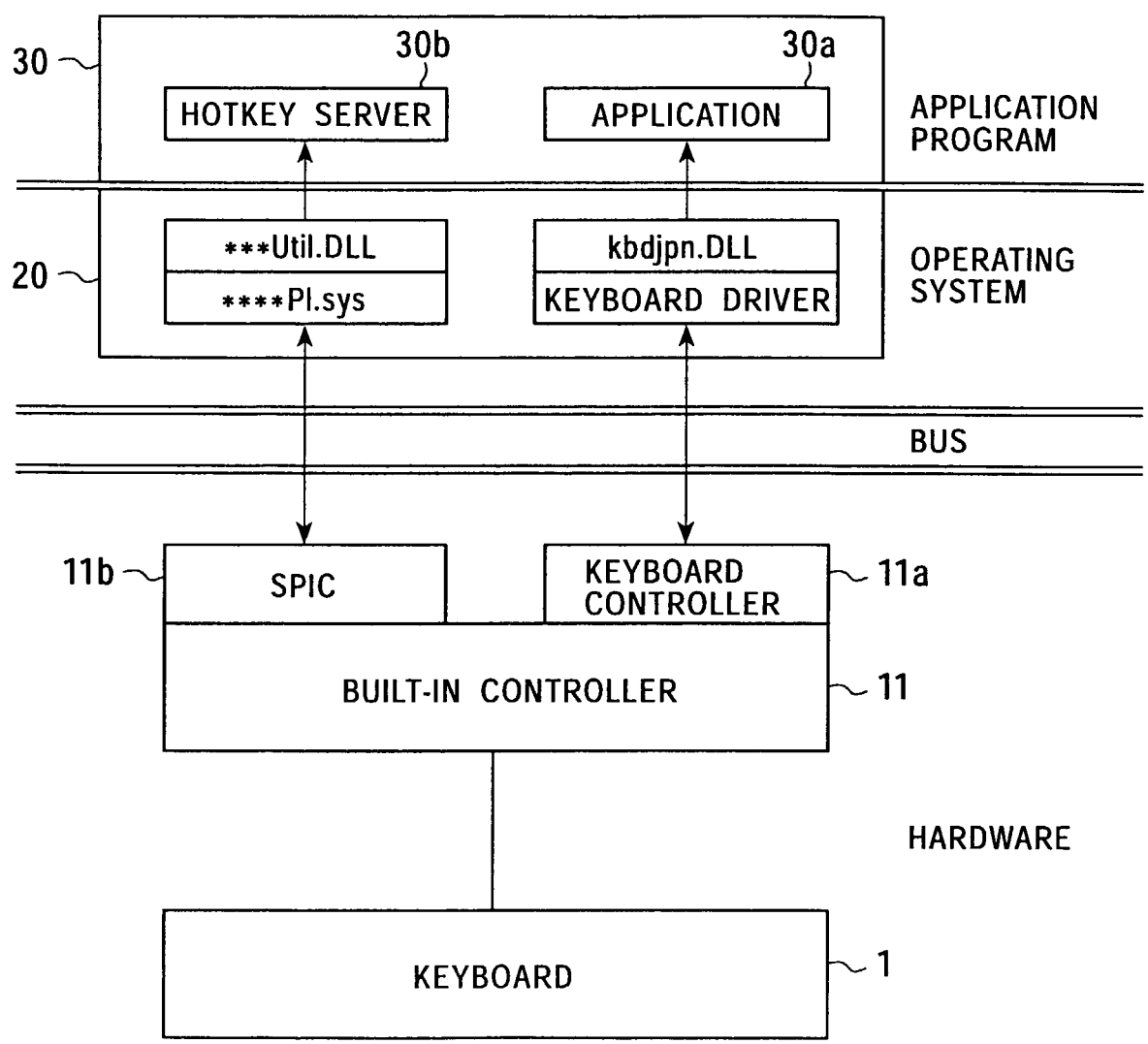
FIG. 5 is a diagram showing the hierarchical software and software structure of the information processing apparatus.

FIG. 5 shows hierarchical structures of the hardware and software of the information processing apparatus 10. In the information processing apparatus 10, as shown in FIG. 5, the keyboard 1, which is one of hardware parts, is located at the lowest level, and the built-in controller 11, which is another hardware part, is located at a level higher than the keyboard 1. Furthermore, at a level higher than the built-in controller 11, an operating system 20, which is one of software parts, coupled with the built-in controller 11 via the bus, and an application program 30, which is another software part, is located at a level higher than the operating system 20.

As described earlier, the built-in controller 11 includes the keyboard controller 11a and the SPIC 11b. The keyboard controller 11a monitors the keyboard 1 to determine whether any key is pressed or released. If pressing or releasing of some key is detected, the keyboard controller 11a informs the higher-level system that the key has been pressed or released. The SPIC 11b serves to communicate with the utility to transmit/receive information associated with keys that are not included in a key table. Conceptually, the Fn key serves as a key that switches, in response to being pressed, key mapping so that particular keys on the keyboard 1 are switched so as to serve as keys for performing specific processes, thereby equivalently providing keys that are not included in the key table. Thus, as described earlier, the Fn key is not recognized by the operating system as an ordinal key. The keyboard controller 11a and the SPIC 11b may or may not be the same in physical form, but, logically, they behave as different input/output ports.

Transmission of information between the system and the built-in controller 11 including the keyboard controller 11a and the SPIC 11b is performed via the bus. More specifically, in the built-in controller 11, information output from the keyboard controller ha is transmitted via the bus to the keyboard driver and the stub driver in the operating system 20, and information output from the SPIC 11b is transmitted via the bus to "**PI.sys" and "*Util.DLL" in the operating system 20. Furthermore, in the built-in controller 11, information received from "****PI.sys" of the operating system 20 is supplied to the SPIC 11b via the bus.

The operating system 20 includes the keyboard driver associated with the keyboard controller 11a implemented on the built-in controller 11, the stub driver that is a subroutine such as "kbdjpn.DLL" associated with the keyboard controller 11a, the device driver "**PI.sys" associated with the SPIC 11b implemented on the built-in controller 11, and "*Util.DLL" for transferring a message supplied from "**PI.sys" to a hotkey server 30b that will be described later. In the operating system 20, the keyboard driver and "PI.sys" are implemented in a kernel mode layer, and the stub driver and "*.Util.DLL" are implemented in a user mode layer. Among those drivers, the keyboard driver, the stub driver, "**PI.sys", and "*Util.DLL", described above, the keyboard driver and the stub driver are included in a usual operating system. However, "**PI.sys" and "*Util.DLL" are special programs which are provided to realize the hotkey capability in conjunction with the Fn key locking mechanism.

In the operating system 20, information received from the keyboard controller 11a in the built-in controller 11 is supplied to an application 30a of the application programs 30 via the keyboard driver and the stub driver, and information received from the SPIC 11b in the built-in controller 11 is supplied to the hotkey server 30b of the application programs 30 via "**PI.sys" and "*Util.DLL". Furthermore, in the operating system 20, information received from the hotkey server 30b of the application programs 30 is supplied to the SPIC 11b in the built-in controller 11 via "*Util.DLL" and, "**PI.sys".

The application programs 30 include the application 30a such as Notepad for producing a text file and the hotkey server 30b serving as the utility for presenting the graphical user interface associated with the hotkeys using the launcher 2 or the Fn key. In the application programs 30, information received from the hotkey driver or the stub driver in the operating system 20 is supplied to the application 30a. On the other hand, information received from "**PI.sys" or "*Util.DLL" is supplied to the hotkey server 30b. Information issued by the hotkey server 30b in the application programs 30 is supplied to "*Util.DLL" and "**PI.sys".

Figure 6:
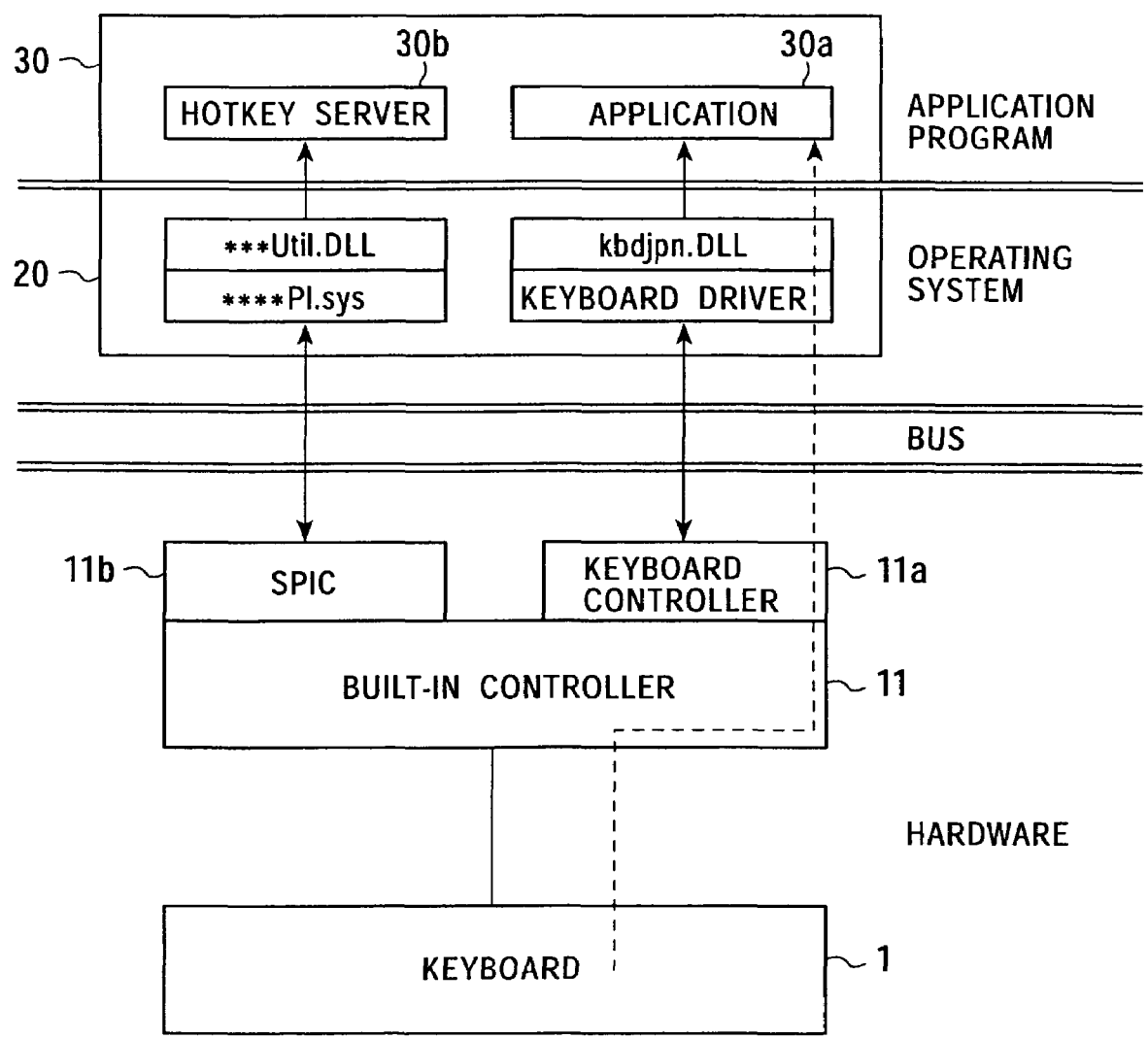
FIG. 6 is a diagram showing the hierarchical software and software structure of the information processing apparatus, wherein the diagram also shows a path for transmitting information in response to an input operation on a usual key.

In the information processing apparatus 10 having the hierarchical structure described above, if an input operation is performed on a usual key such as an alphanumeric key, information indicating that the key has been pressed or released is supplied to the operating system 20 via the keyboard controller 11a in the built-in controller 11 and further to the application 30a via the keyboard driver and the stub driver in the operating system 20, as represented by a broken line in FIG. 6. For example, in the present information processing apparatus 10, if an alphanumeric key labeled "A" on a keyboard is pressed, information indicating that the key has been pressed is supplied to the operating system 20 via the keyboard controller 11a in the built-in controller 11. At the same time, in the present information processing apparatus 10, information indicating whether a key labeled "Caps Lock" on the keyboard for switching between uppercase and lowercase is in a pressed state is supplied to the operating system 20 via the keyboard controller 11a in the built-in controller 11. In the present information processing apparatus 10, if the stub driver in the operating system 20 receives information indicating that an alphanumeric key labeled "A" on the keyboard and also information indicating whether the key labeled "Caps Lock" on the keyboard for switching between uppercase and lowercase is in a pressed state, the stub driver makes a conversion between uppercase and lowercase. Thus, in the present information processing apparatus 10, information indicating "A" or "a" is finally supplied to the application 30a in the application programs 30.

Figure 7:
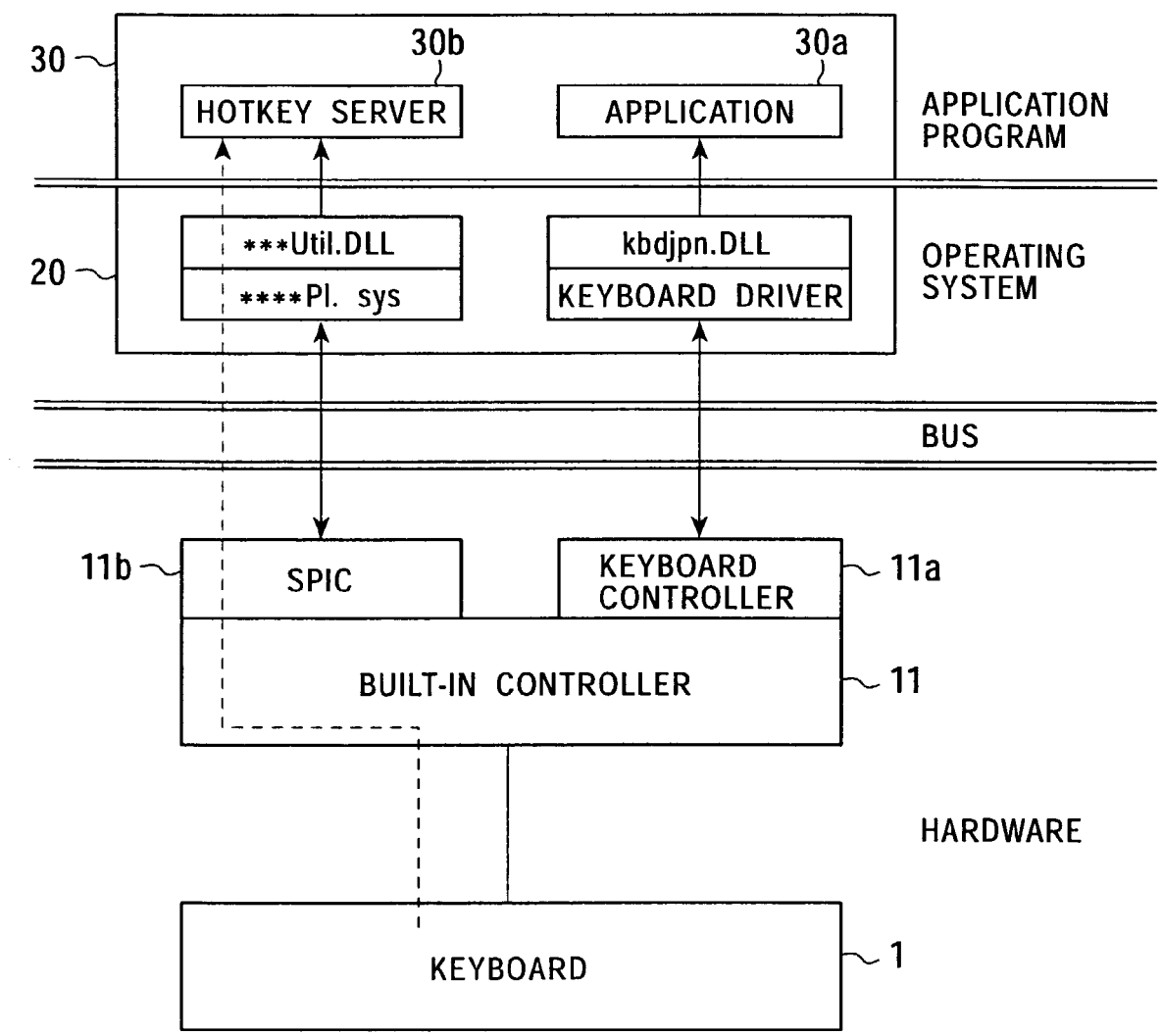
FIG. 7 is a diagram showing the hierarchical software and software structure of the information processing apparatus, wherein the diagram also shows a path for transmitting information in response to an input operation for calling a hotkey function using a Fn key.

In the present information processing apparatus 10, if an input operation is performed on a hotkey in conjunction with the Fn key, information indicating that the key has been pressed or released is supplied to the operating system 20 via the SPIC 11b in the built-in controller 11 and further to the hotkey server 30b via "**PI.sys" and "**Util.DLL" in the operating system 20, as represented by a broken line in FIG. 7.

A specific process associated with a hotkey using the Fn key performed in the information processing apparatus 10 having the above-described construction is described below.

In the present information processing apparatus 10, as described above, the process associated with the hotkeys using the Fn key locking mechanism is performed by the keyboard BIOS executed by the built-in controller 10. More specifically, in the present information processing apparatus 10, the built-in controller 11 performs the routine including a sequence of processing steps shown in FIGS. 8 to 10.

Figure 8:
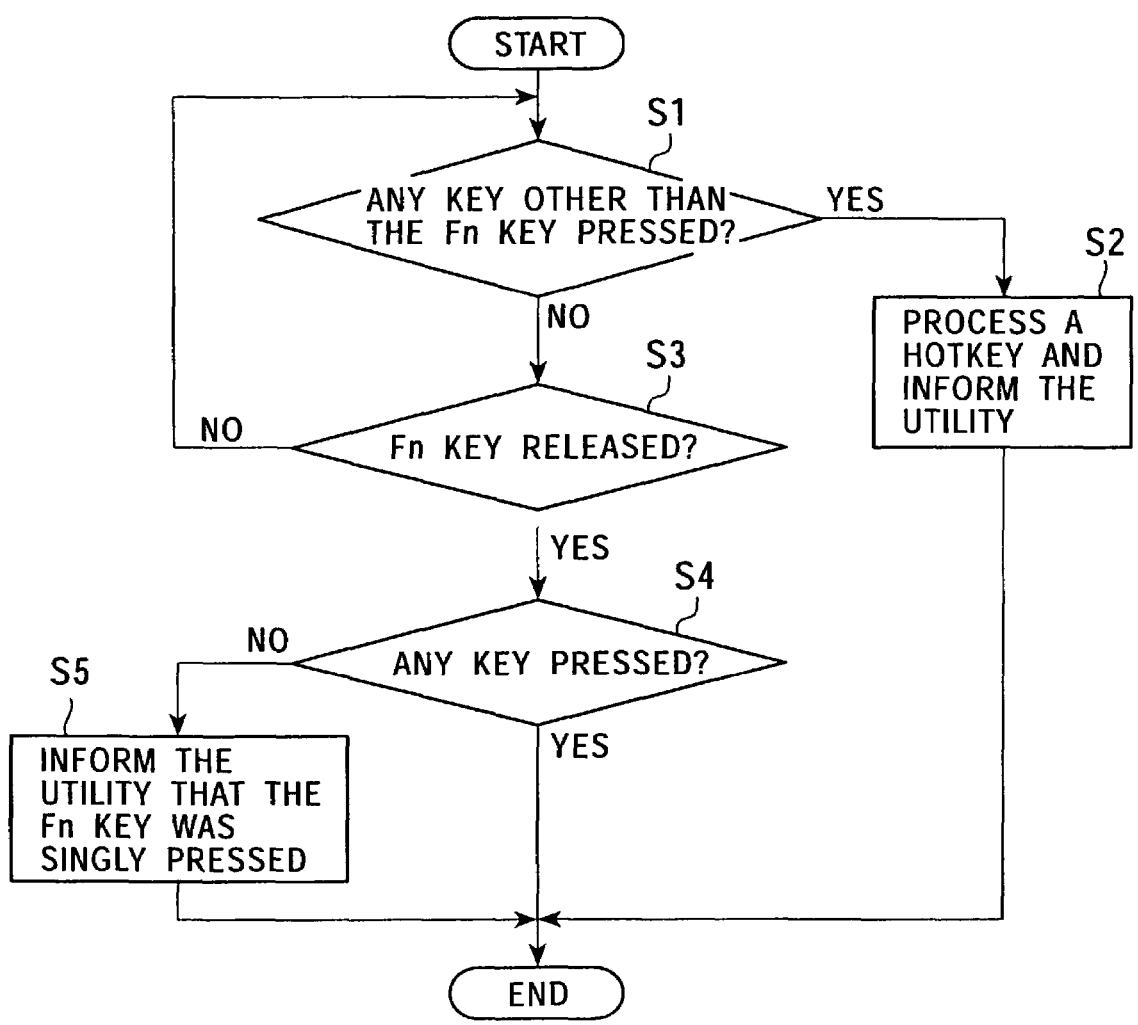
FIG. 8 is a flow chart showing a routine performed by a built-in controller, provided in the information processing apparatus, in response to pressing of the Fn key, wherein the routine includes a process associated with a hotkey and a process of supplying informing to utility.

First, if the Fn key is pressed, the built-in controller 11 performs the routine shown in FIG. 8.

That is, as shown in FIG. 8, if the Fn key is pressed, the built-in controller 11 determines, in step S1, whether an arbitrary key has also been pressed in addition to the Fn key. More specifically, the built-in controller 11 periodically checks, that is, monitors, as described earlier, the keyboard 1 to detect whether an arbitrary key other than the Fn key has been pressed.

If it is determined that an arbitrary key has been pressed in addition to the Fn key, the process proceeds to step S2. In step S2, the built-in controller 11 performs a process associated with a hotkey corresponding to a combination of the Fn key and the pressed arbitrary key other than the Fn key. The built-in controller 11 then informs the utility via the SPIC 11b that the process associated with the hotkey has been performed, and the present routine is ended.

On the other hand, if it is determined that no arbitrary key other than the Fn key is pressed, the process proceeds to step S3 and the built-in controller 11 determines whether the Fn key has been released. More specifically, the built-in controller 11 monitors the keyboard 1, as described above, to determine whether the Fn key has been released.

If it is determined that the Fn key has not been released, that is, if it is determined that the Fn key is still in the pressed state, the process returns to step S1 and the built-in controller 11 repeats the above-described process from step S1.

In a case in which it is determined in step S3 that the Fn key has been released, the process proceeds to step S4 and the built-in controller 11 determines whether any arbitrary key has been pressed.

If it is determined herein that some arbitrary key has been pressed, the built-in controller 11 ends the routine to perform not a hotkey process but a process in response to a usual key input operation via the keyboard controller 11a.

On the other hand, in a case in which it is determined in step S4 that any arbitrary key is not pressed, the process proceeds to step S5, and the built-in controller 11 informs the utility via the SPIC 11b that the Fn key has been singly pressed, and ends the present routine.

As described above, if the Fn key is pressed, the built-in controller 11 performs the routine including a process associated with a hotkey and a process of supplying information to the utility, depending on what occurs after the Fn key was pressed, that is, depending on whether an key other than the Fn key is pressed or whether the Fn key is released.

Figure 9:
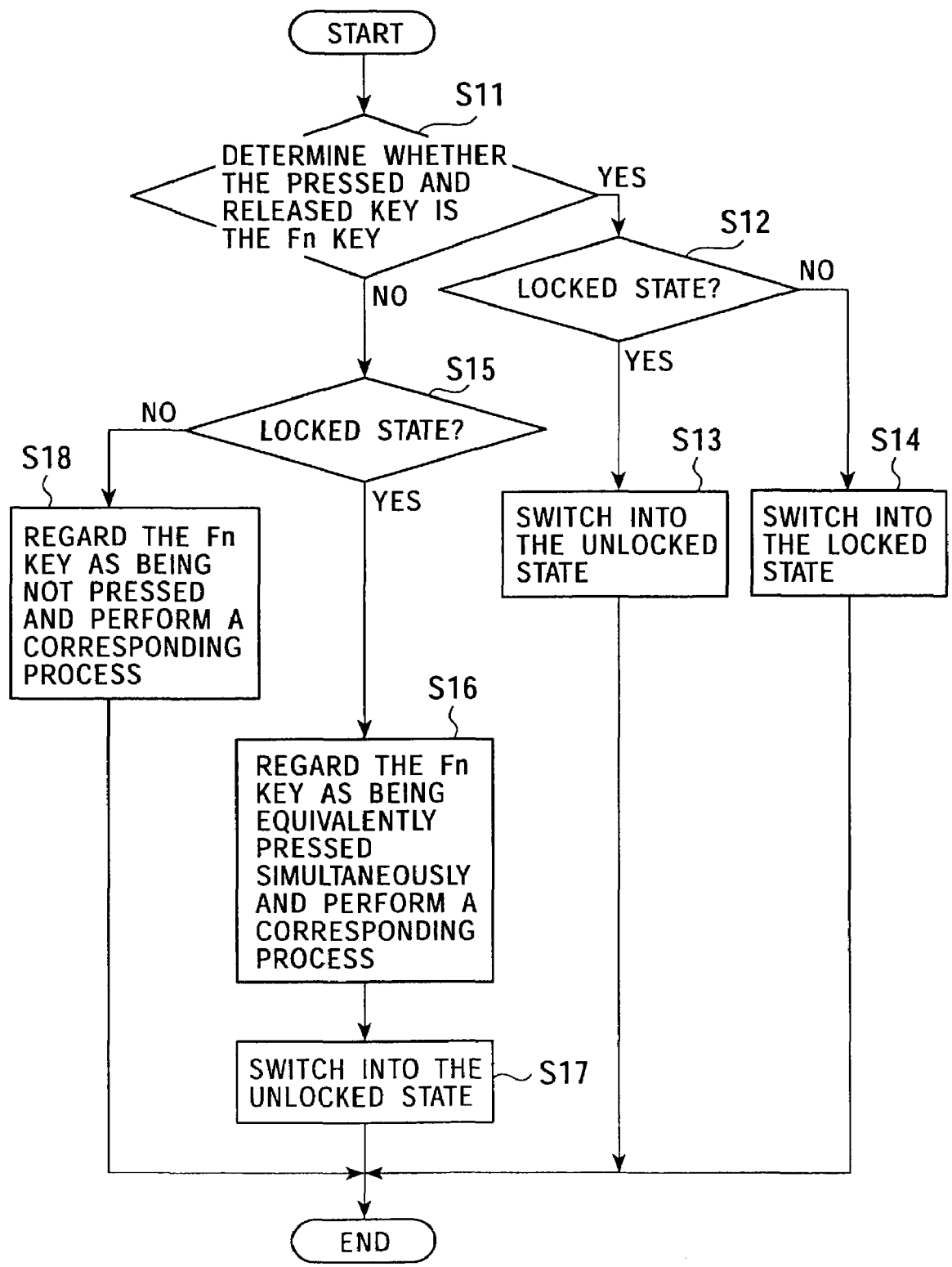
FIG. 9 is a flow chart showing a routine performed by the built-in controller in response to pressing of an arbitrary key to switch an Fn key locking mechanism between a locked state and an unlocked state.

The built-in controller 11 performs the routine shown in FIG. 9 to switch the state between the locked state and the unlocked state.

More specifically, as shown in FIG. 9, if an arbitrary key is pressed and released, the built-in controller 11 determines, in step S11, whether the pressed and released key is the Fn key and determines whether the Fn key has been singly pressed, by performing the routine shown in FIG. 8.

In a case in which it is determined that the pressed and released key is the Fn key and any other key is not pressed, the process proceeds to step S12. In step S12, the built-in controller 11 determines whether the Fn key is currently in the locked state.

If it is determined that the Fn key is currently in the locked state, the process proceeds to step S13. In step D13, the built-in controller 11 switches the state into the unlocked state and ends the present routine. That is, if the Fn key is singly pressed and then released when the Fn key is in the locked state, the built-in controller 11 switches the state of the Fn key into the unlocked state.

On the other hand, if it is determined in step S12 that the Fn key is not in the locked state, that is, if it is determined that the Fn key is currently in the unlocked state, the process proceeds to step S14. In step S14, the built-in controller 11 switches the Fn key into the locked state and ends the current routine. That is, if the Fn key is singly pressed and then released when the Fn key is in the unlocked state, the built-in controller 11 switches the Fn key into the locked state.

In the case in which it is determined in step S11 that the pressed and released key is not singly pressing and releasing of the Fn key, the process proceeds to step S15 and the built-in controller 11 determines whether the Fn key is currently in the locked state.

If it is determined herein that the Fn key is currently in the locked state, the process proceeds to step S16 and the built-in controller 11 performs a process by assuming that the Fn key is held in the pressed state. That is, in this case, a hotkey process assigned to a combination of the Fn key and the arbitrary key detected at the start of the routine is performed.

The process then proceeds to step S17, and the built-in controller 11 switches the Fn key into the unlocked state. The routine is then ended.

On the other hand, if it is determined that the current state of the Fn key is not the locked state, that is, if it is determined that the Fn key is currently in the unlocked state, the process proceeds to step S18 and the built-in controller 11 ends the present routine in order to perform a process designated to be performed when the Fn key is not pressed together, that is, in order to perform a process to designated to be performed in response to a normal key input operation via the keyboard controller.

As described above, if any one of keys including the Fn key is pressed and then released, the built-in controller 11 performs the routine described above thereby switching the state of the Fn key between the locked state and the unlocked state.

Figure 10:
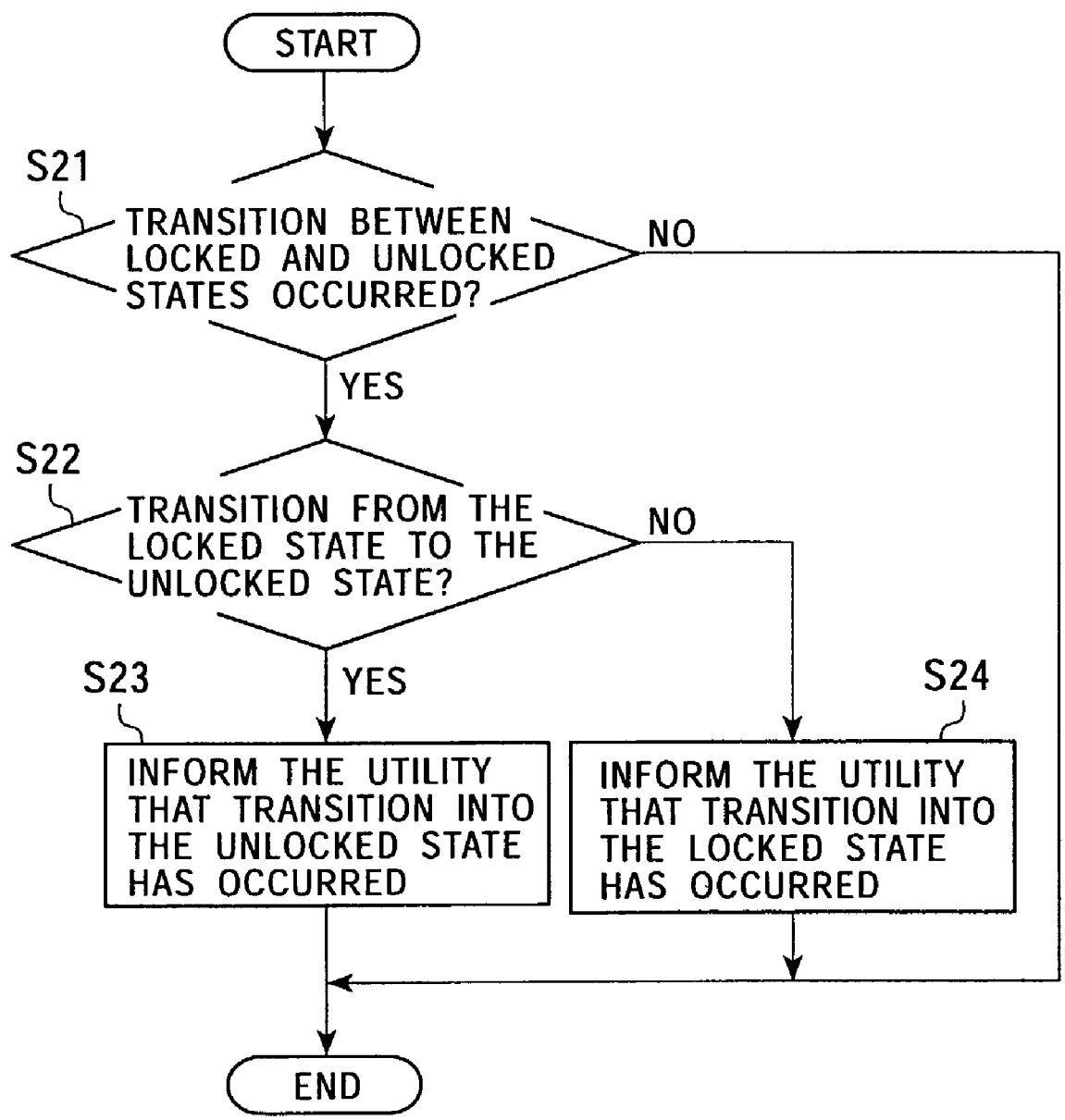
FIG. 10 is a flow chart showing a routine performed by the built-in controller to inform a utility that a transition between the locked state and the unlocked state has occurred in the state of the Fn key locking mechanism.

Furthermore, by performing the routine shown in FIG. 10, the built-in controller 11 informs the utility that a transition between the locked state and the unlocked state has occurred.

That is, as shown in FIG. 10, the built-in controller 11 determines, in step S21, whether a transition between the locked state and the unlocked state has occurred.

If no transition between the locked state and the unlocked state is detected, the built-in controller 11 ends this routine without performing any operation.

On the other hand, if a transition between the locked state and the unlocked state is detected, the process proceeds to step S22 and the built-in controller 11 determines whether the transition occurred from the locked state.

If it is determined herein that the transition was from the locked state, the process proceeds to step S23 and the built-in controller 11 informs the utility via the SPIC 11b of the transition into the unlocked state. Thereafter, the built-in controller 11 ends the present routine.

On the other hand, if it is determined that the transition was not from the locked state, that is, if it is determined that the transition was from the unlocked state, the process proceeds to step S24 and the built-in controller 11 informs the utility via the SPIC 11b of the transition into the locked state. Thereafter, the built-in controller 11 ends the present routine.

As described above, by performing the present routine, the built-in controller 11 detects a transition between the locked state and the unlocked state and informs the utility of the transition.

Thus, the information processing apparatus 10 realizes the Fn key locking mechanism by performing, using the built-in controller 11, the routine described above with reference to FIGS. 8 to 10.

Figure 11:
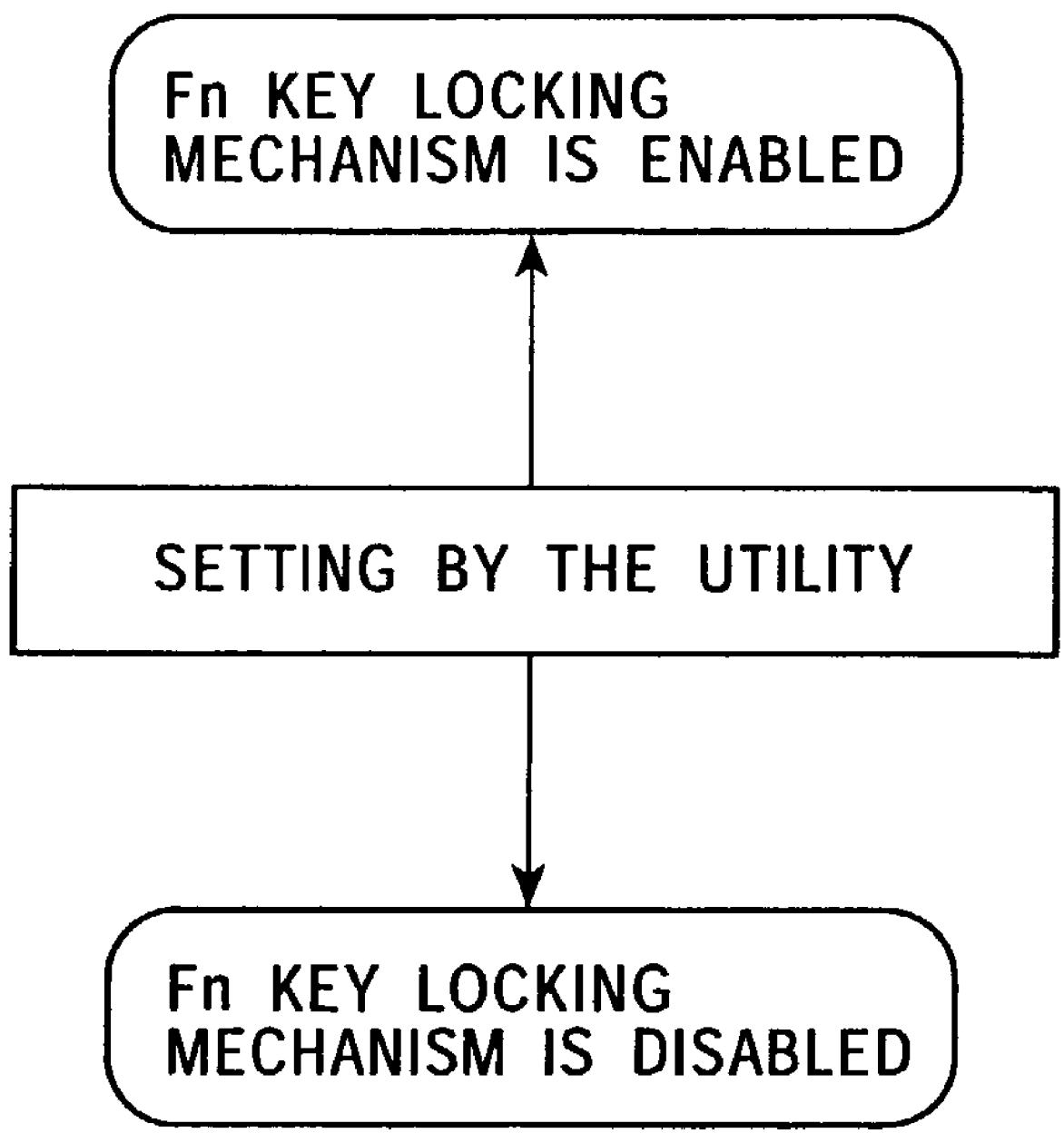
FIG. 11 is a diagram showing state transitions between an enabled state and a disabled state in the Fn key locking mechanism.

The built-in controller 11, which performs the routine described above, also switches the state of the Fn key locking mechanism between the enabled state and the disabled state in accordance with the setting by the utility, as shown in FIG. 11.

Figure 12:
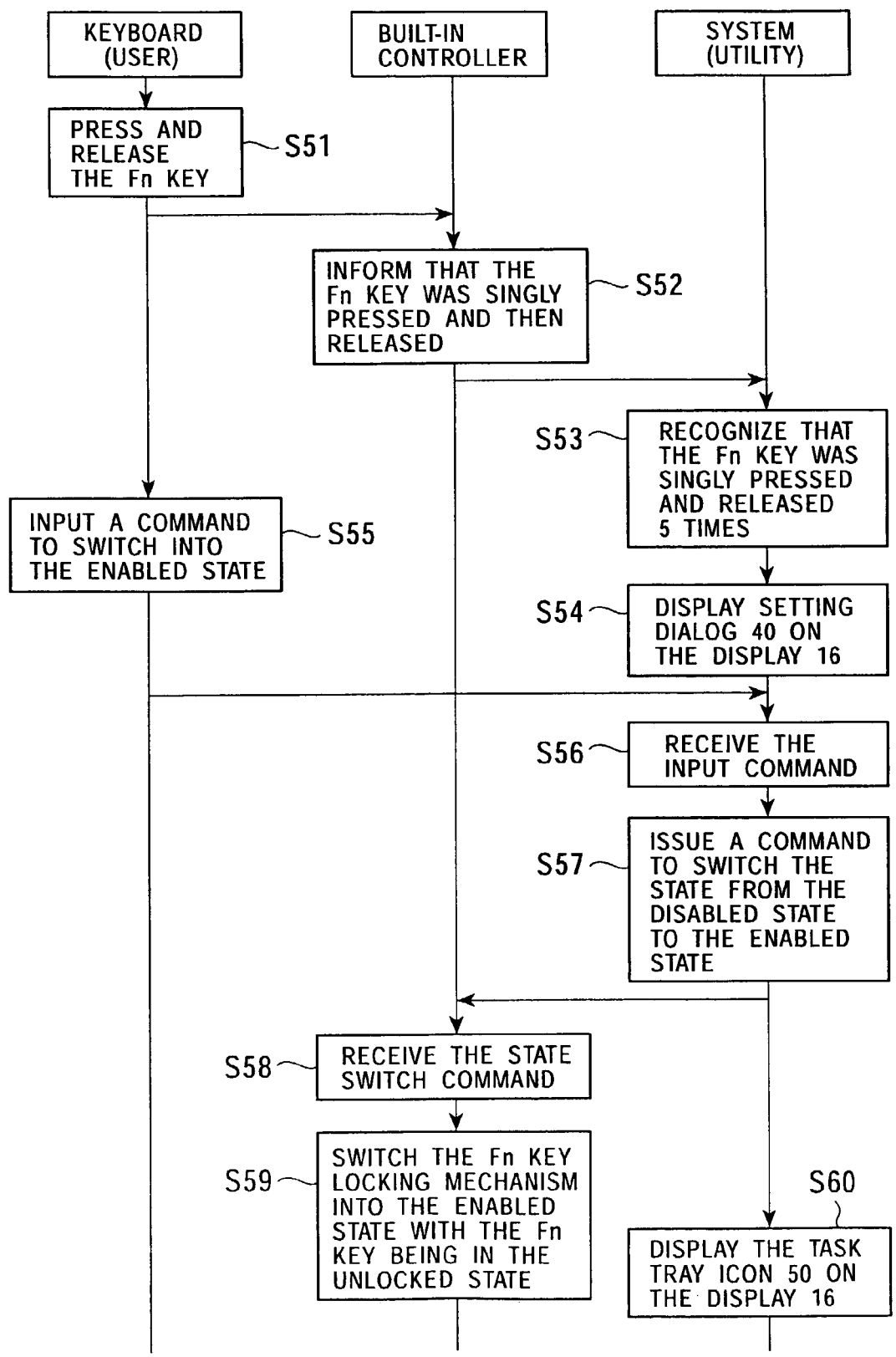
FIG. 12 is a flow chart showing a sequence of processing steps for switching the Fn key locking mechanism from the disabled state into the enabled state.
Figure 14:
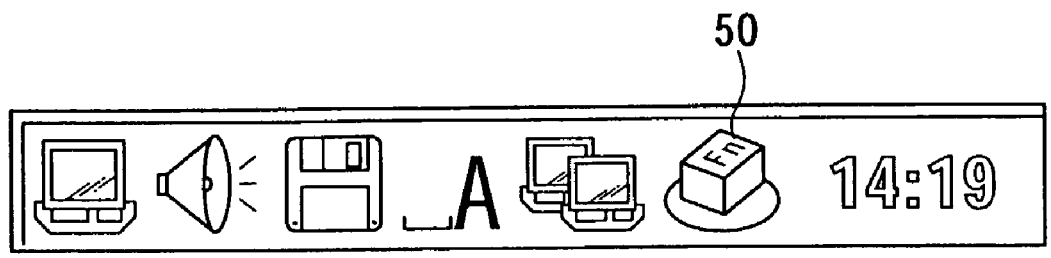
FIG. 14 is a diagram showing examples of task tray icons displayed on the display to inform a user of the state of the Fn key locking mechanism.
Figure 15:
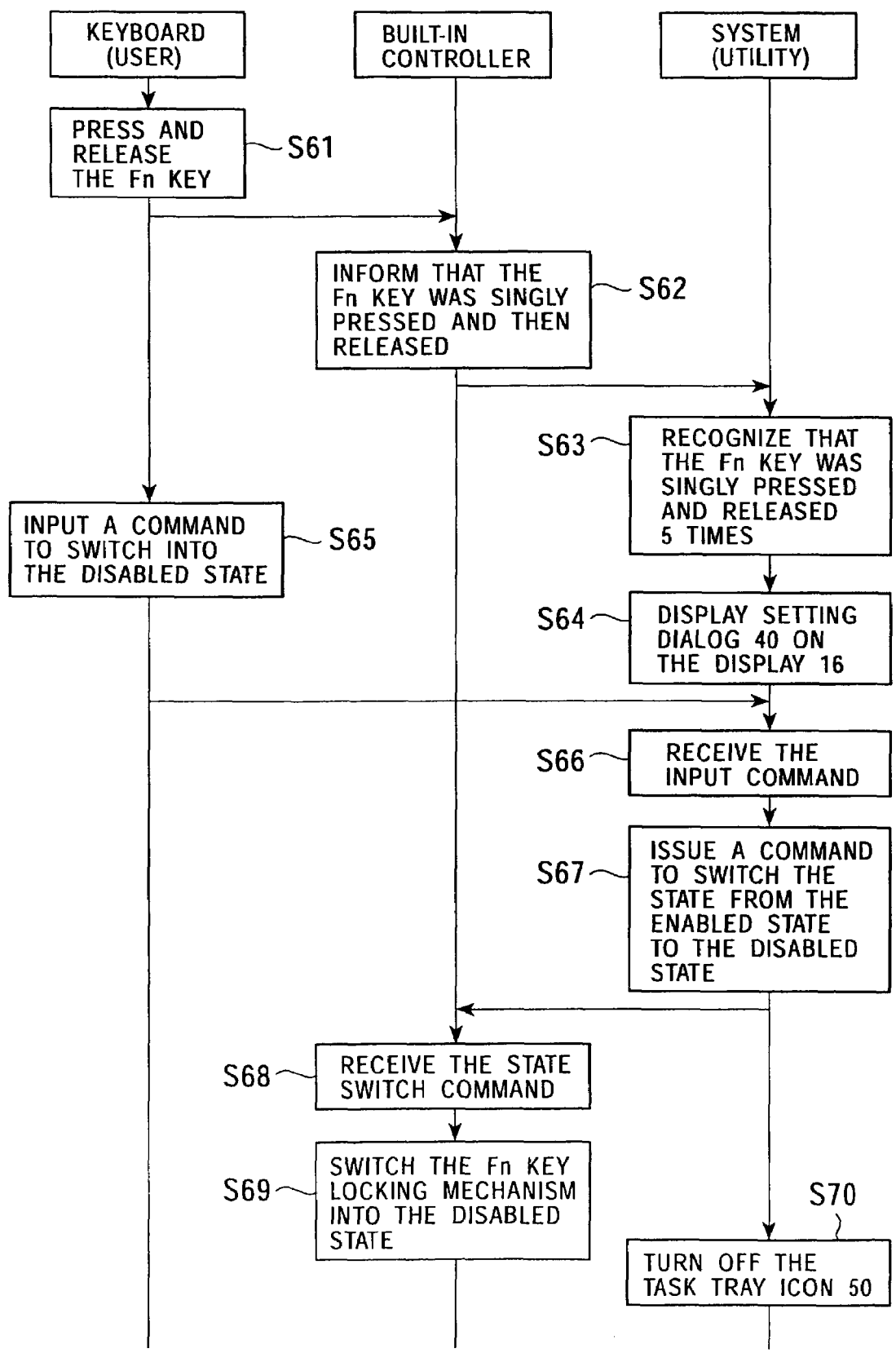
FIG. 15 is a flow chart showing a sequence of processing steps of switching the Fn key locking mechanism from the enabled state into the disabled state.

More specifically, in the information processing apparatus 10, the built-in controller 11 switches the state of the Fn key locking mechanism between the enabled state and the disabled state by performing a process including a sequence of steps shown in FIGS. 12 and 15. In this process performed in the information processing apparatus 10, the Fn key locking mechanism is set by the utility in response to an operation serving as a trigger performed by a user. In the present embodiment, when the Fn key is pressed and released successively 5 times by a user, the utility performs setting of the Fn key locking mechanism. In FIGS. 12 and 15, processes performed respectively by the keyboard 1, the built-in controller 11, and the higher-level system including the utility in the information processing apparatus 10 are shown, while timings of transmitting information among the keyboard 1, the built-in controller 11, and the higher-level system including the utility are also shown. Note that, in FIGS. 12 to 15, some of the processing steps performed by the keyboard 1 are actually performed by a user.

First, a process of switching the Fn key locking mechanism from the disabled state into the enabled state is described. Herein, it is assumed that, in the information processing apparatus 10, the utility has already determined that the keyboard BIOS operating on the built-on controller 11 is adapted to the Fn key locking mechanism and that the Fn key locking mechanism is in the disabled state.

As shown in FIG. 12, in the information processing apparatus 10, if, in step S51, a user presses and releases singly the Fn key on the keyboard 1, the pressing and releasing of the Fn key is detected by the built-in controller 11 monitoring the input operation on the keyboard 1.

In the information processing apparatus 10, in the next step S52, the built-in controller 11 informs the utility that the Fn key has been singly pressed and released. More specifically, in the information processing apparatus 10, the routine described earlier with reference to FIG. 8 is performed by the built-in controller 11 to inform the utility that the Fn key has been singly pressed and released. In the above process, in the present information processing apparatus 10, the information indicating that the Fn key has been singly pressed and released is transmitted not via the keyboard controller 11a but via the SPIC 11b.

In the information processing apparatus 10, if steps S51 and S52 are performed repeatedly 5 times within a predetermined period, then in step S53 the utility recognized that the Fn key has been singly pressed and released repeatedly 5 times.

Figure 13:
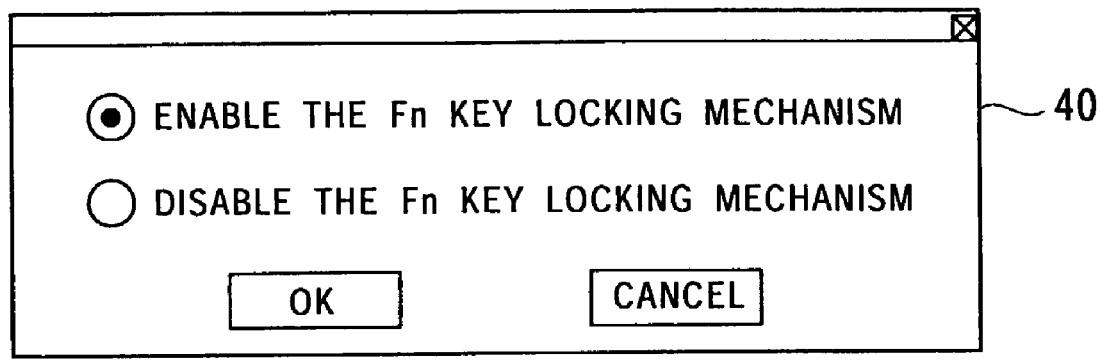
FIG. 13 is a diagram showing an example of a setting dialog box displayed on the display to allow a user to set the Fn key locking mechanism into the enabled state or the disabled state.

In the information processing apparatus 10, in the next step S54, in order to determine whether the user wants to set the Fn key locking mechanism into the enabled state, a user interface in the form of a setting dialog box 40 such as that shown in FIG. 13 is displayed on the display 16 under the control of the utility. In order for the user to easily respond to the setting dialog box 40, the setting dialog box 40 includes, for example, radio buttons for setting the Fn key locking mechanism into the enabled state and the disabled state, respectively, an OK button for final decision, and a Cancel button for cancellation.

In the information processing apparatus 10, in step S55, the user performs an operation to enable the Fn key locking mechanism, that is, to set it into the enabled state. More specifically, in the information processing apparatus 10, the user presses and releases the Tab key to check (focus on) a desired radio button in the setting dialog box 40, presses and releases a predetermined key so as to select a radio button for setting the Fn key locking mechanism into the enabled state, and further presses and releases the Tab key so as to focus on the OK button. Thereafter, if an Enter key on the keyboard is pressed and released, the Fn key locking mechanism is set into the enabled state. In the present information processing apparatus 10, the above input operation may also be performed using a pointing device such as a mouse or a jog dial. In the information processing apparatus 10, information indicating the content of the above input operation is supplied to the utility.

In the information processing apparatus 10, in the next step S56, the utility receives, from the keyboard 1, the information indicating the content of the input operation. In the next step S57, the utility transmits a state switch command to the built-in controller 11 to switch the Fn key locking mechanism from the disabled state to the enabled state. In the present information processing apparatus 10, the above state switch command is transmitted not via the keyboard controller 11a but via the SPIC 11b.

In the information processing apparatus 10, in step S58, the built-in controller 11 receives the state switch command from the utility. In the next step S59, the built-in controller 11 sets the Fn key locking mechanism into the enabled state and sets the Fn key into the unlocked state. That is, in the in the present information processing apparatus 10, when the Fn key is switched into the enabled state, the Fn key is set not into the locked state but into the unlocked state.

Thereafter, in the information processing apparatus 10, in order for the user to easily recognize that the Fn key locking mechanism is in the enabled state, a state indication user interface in the form of a task tray icon 50 indicating that the Fn key locking mechanism is in the enabled state is displayed on the display 16 under the control of the utility, as shown in FIG. 14. Thus, the sequence of processing steps is completed. In the information processing apparatus 10, depending on whether the Fn key is in the locked state or the unlocked state, the utility may change the manner of displaying the task tray icon 50 indicating the state of the keyboard BIOS responsible for the process associated with the Fn key locking mechanism. More specifically, for example, the task tray icon 50 may be blinked or changed in color. In this specific case, the task tray icon 50 is displayed so as to indicate that the Fn key is in the unlocked state.

In the present information processing apparatus 10, as described above, if an input operation is performed by a user via the graphical user interface capable of controlling the keyboard BIOS responsible for performing the process associated with the Fn key locking mechanism, then, in response to the input operation, the utility transmits the state switch command to the built-in controller 11 via the SPIC 11b to switch the Fn key locking mechanism from the disabled state into the enabled state.

Now, a process of switching the Fn key locking mechanism from the enabled state into the disabled state is described. Herein, it is assumed that, in the information processing apparatus 10, the Fn key locking mechanism has already been set by the built-in controller 11 into the enabled state and the utility has already determined that the Fn key locking mechanism is in the enabled state.

As shown in FIG. 15, in the information processing apparatus 10, if, in step S61, a user presses and releases singly the Fn key on the keyboard 1, the pressing and releasing of the Fn key is detected by the built-in controller 11 monitoring the input operation on the keyboard 1.

In the information processing apparatus 10, in the next step S62, the built-in controller 11 informs the utility that the Fn key has been singly pressed and released. More specifically, in the information processing apparatus 10, the routine described earlier with reference to FIG. 8 is performed by the built-in controller 11 to inform the utility that the Fn key has been singly pressed and released. In the above process, in the present information processing apparatus 10, the information indicating that the Fn key has been singly pressed and released is transmitted not via the keyboard controller 11a but via the SPIC 11b.

In the information processing apparatus 10, if steps S61 and S62 are performed repeatedly 5 times within a predetermined period, then in step S63 the utility detects that the Fn key has been singly pressed and released repeatedly 5 times.

In the information processing apparatus 10, in the next step S64, in order to determine whether the user wants to set the Fn key locking mechanism into the disabled state, the setting dialog box 40 such as that described earlier with reference to FIG. 13 is displayed on the display 16 under the control of the utility.

In the information processing apparatus 10, in the next step S65, the user performs an operation to disable the Fn key locking mechanism, that is, to set it into the disabled state. More specifically, in the information processing apparatus 10, as described earlier, the user presses and releases the Tab key to check (focus on) a desired radio button in the setting dialog box 40, presses and releases the predetermined key so as to select a radio button for setting the Fn key locking mechanism into the disabled state, and further presses and releases the Tab key so as to focus on the OK button. Thereafter, if the Enter key on the keyboard is pressed and released, the Fn key locking mechanism is set into the disabled state. In the present information processing apparatus 10, as described earlier, the above input operation may also be performed using a pointing device such as a mouse or a jog dial. In the information processing apparatus 10, information indicating the content of the above input operation is supplied to the utility.

In the information processing apparatus 10, in the next step S66, the utility receives, from the keyboard 1, the information indicating the content of the input operation. In the next step S67, the utility transmits a state switch command to the built-in controller 11 to switch the Fn key locking mechanism from the enabled state to the disabled state. In the present information processing apparatus 10, the above state switch command is transmitted not via the keyboard controller 11a but via the SPIC 11b.

In the information processing apparatus 10, in step S68, the built-in controller 11 receives the state switch command from the utility. In the next step S69, the built-in controller 11 changes the Fn key locking mechanism into the disabled state. In this case, in the present information processing apparatus 10, the Fn key locking mechanism is set into the unlocked state regardless whether the Fn key was previously in the locked or unlocked state.

Thereafter, in the information processing apparatus 10, in order for the user to recognize that the Fn key locking mechanism is in the disabled state, the task tray icon 50 such as that described above with reference to FIG. 14 is displayed on the display 16, under the control of the utility. Thus, the sequence of processing steps is completed.

In the present information processing apparatus 10, as described above, if an input operation is performed by a user via the graphical user interface, then, in response to the input operation, the utility transmits the state switch command to the built-in controller 11 via the SPIC 11b to switch the Fn key locking mechanism from the enabled state into the disabled state.

In the present information processing apparatus 10, by performing the sequence of processing steps described above, the utility switches the Fn key locking mechanism between the enabled state and the disabled state in the hotkey process.

Figure 16:
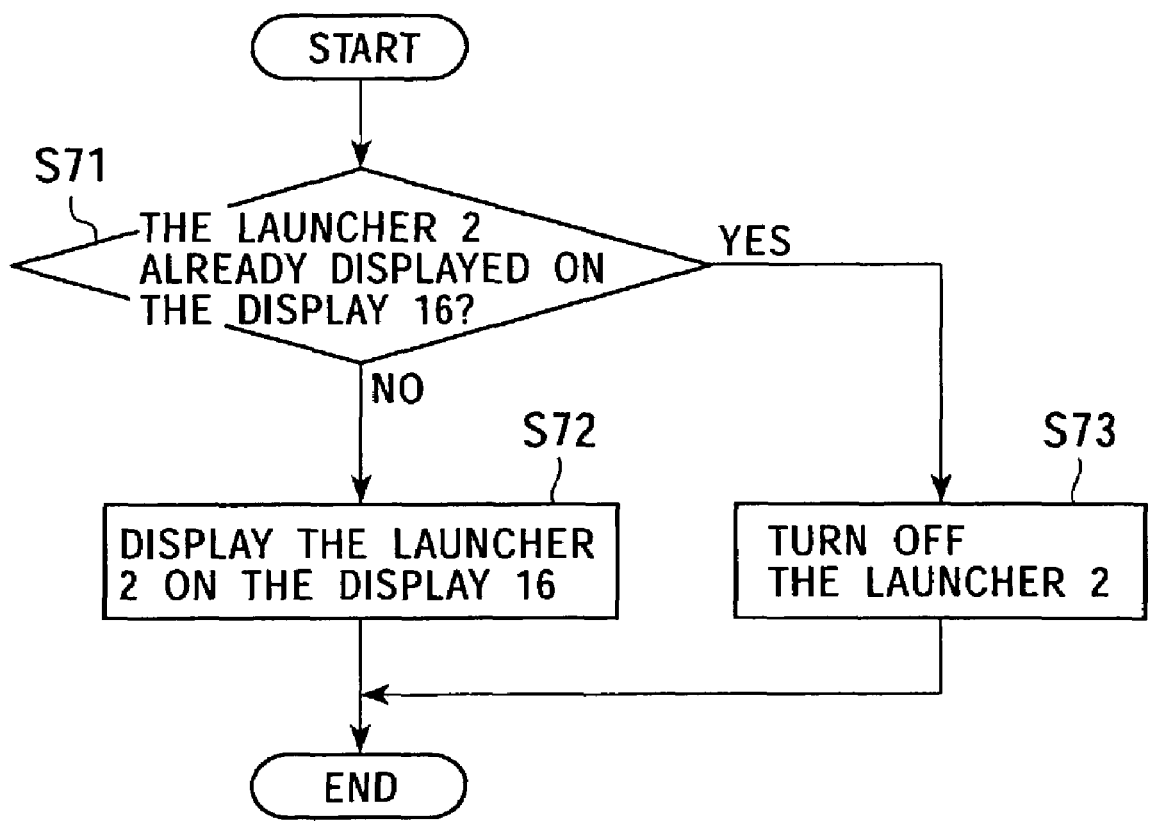
FIG. 16 is a flow chart showing a sequence of processing steps of displaying a launcher on the display.

In the information processing apparatus 10 in which the state is switched in the above-described manner, if the Fn key is singly pressed and released once, the sequence of processing steps shown in FIG. 16 is performed to display the launcher 2 on the display 16.

More specifically, in the information processing apparatus 10, as shown in FIG. 16, in step S71, under the control of the utility, it is determined whether the launcher 2 is already displayed on the display 16.

In a case in which it is determined that the launcher 2 is not yet displayed on the display 16, the process proceeds to step S72. In step S72, under the control of the utility, the information processing apparatus 10 displays the launcher 2 on the display 16, and the sequence of processing steps is completed.

On the other hand, in a case in which it is determined that the launcher 2 is already displayed on the display 16, the process proceeds to step S73. In step S73, under the control of the utility, the information processing apparatus 10 turns off the launcher 2 on the display 16, and the sequence of processing steps is completed.

As described above, in the present information processing apparatus 10, if the Fn key is singly pressed and released once, the launcher 2 is displayed on the display 16.

Figure 17:
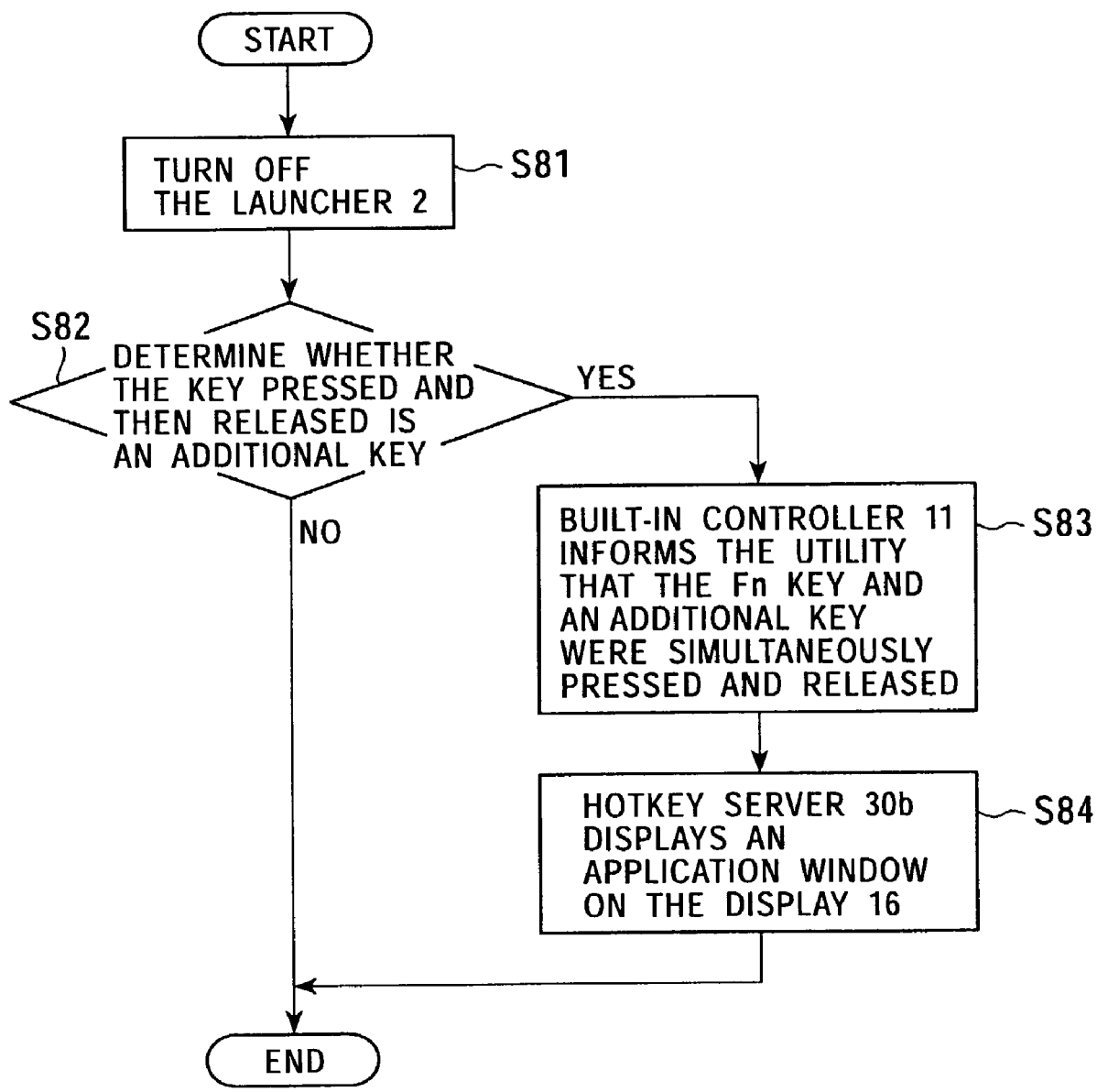
FIG. 17 is a flow chart showing a sequence of processing steps performed, in a case in which the Fn key locking mechanism is provided, in response to pressing and releasing an arbitrary key when the launcher is displayed on the display.

In the information processing apparatus 10, when the launcher 2 is displayed on the display 16, if an arbitrary key is pressed and released, a sequence of processing steps shown in FIG. 17 is performed.

More specifically, as shown in FIG. 17, in the information processing apparatus 10, in step S81, the launcher 2 displayed on the display 16 is turned off under the control of the hotkey server 30b serving as the utility.

In the information processing apparatus 10, in the next step S82, on the basis of a scan code corresponding to the pressed and released key, the hotkey server 30b serving as the utility determines whether the pressed and released key is one of additional keys assigned as hotkeys in combination with the Fn key.

If it is determined that the pressed and released key is not one of such additional keys, the information processing apparatus 10 terminates the sequence of processing steps.

On the other hand, in-the information processing apparatus 10, if it is determined that the pressed and released key is one of the additional keys, the process proceeds to step S83 and the built-in controller 11 informs the utility that the Fn key and the additional key have been simultaneously pressed and released by means of using the Fn key locking mechanism. In this process, in the present information processing apparatus 10, the information indicating that the Fn key and the additional key have been simultaneously pressed and released is transmitted not via the keyboard controller ha but via the SPIC 11b.

In the information processing apparatus 10, in the next step S84, in order to present to the user the hotkey function corresponding to the combination of the Fn key and the additional key, a predetermined application window in the form of a graphical user interface is displayed on the display 16 under the control of the hotkey server 30b serving as the utility, and the sequence of processing steps is completed. In the above process performed in the present information processing apparatus 10, if, for example, a function key labeled "F5" on the keyboard is pressed and released as an additional key, the application for controlling the brightness of the display 16 is activated and a predetermined window is displayed on the display 16, as described earlier.

In the present information processing apparatus 10, as described above, when the launcher 2 is displayed on the display 16, if an arbitrary key is pressed and released, a process is performed depending on which key has been pressed and released. In the present information processing apparatus 10, pressing and releasing an additional key is equivalent to indirectly selecting a corresponding hotkey menu icon 2a, 2b, 2c, 2d, or 2f in the launcher 2. Thus, instead of by pressing and releasing an additional key, the same process can be performed by directly selecting one of hotkey menu icons 2a, 2b, 2c, 2d, and 2f in the launcher 2 using a particular key such as a cursor key or tab key, a pointing device such as a mouse, or a jog dial. Specific examples of manners of operating the icons will be described later.

Figure 18:
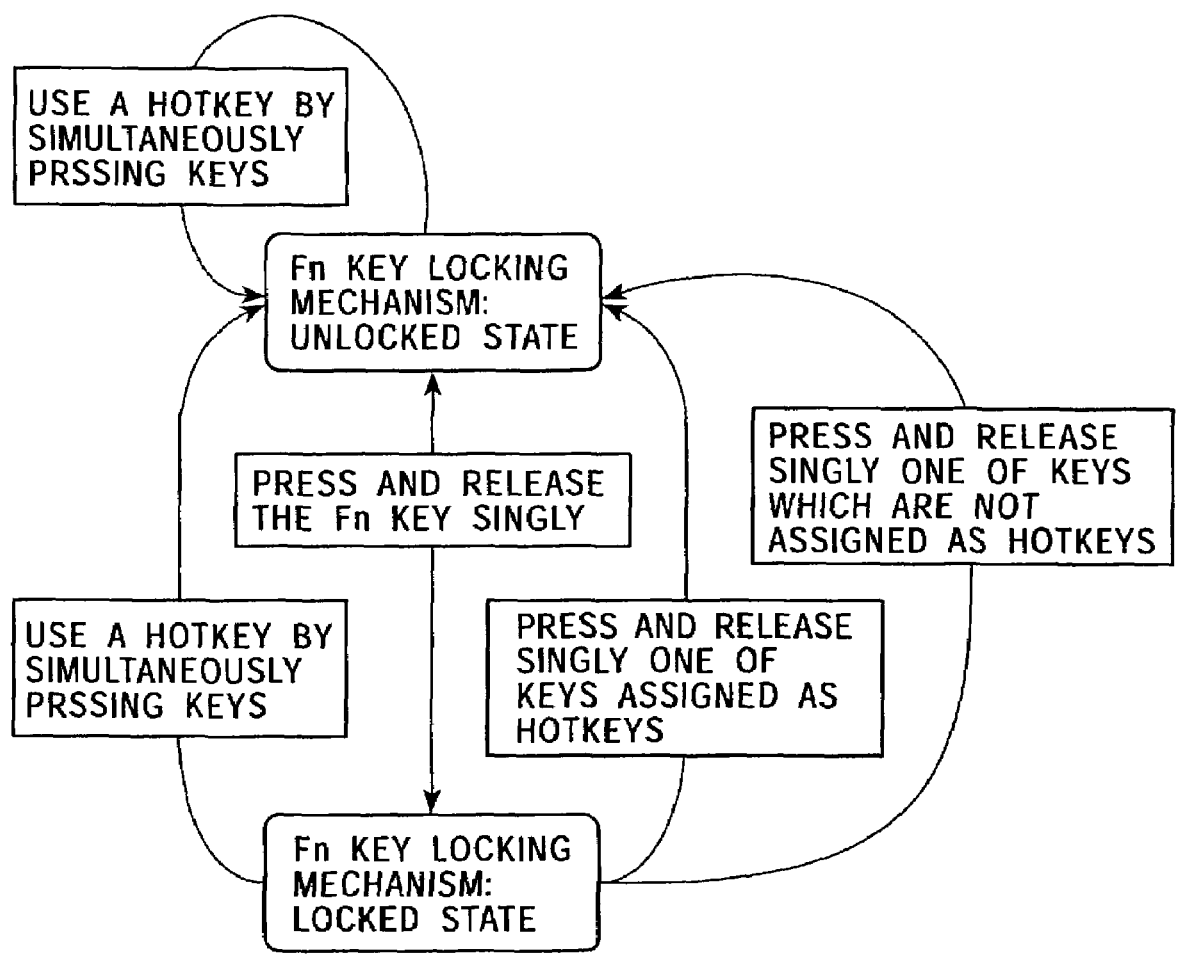
FIG. 18 is a diagram showing state transitions between the locked state and the unlocked state in the Fn key locking mechanism, which can occur when the Fn key locking mechanism is in the enabled state.

In the present information processing apparatus 10 in which the state is switched and information is displayed in the above-described manner, when the Fn key locking mechanism is in the enabled state, the built-in controller 11 switches the state of the Fn key between the locked state and the unlocked state each time the Fn key is singly pressed and released, as shown in FIG. 18. More specifically, in the present information processing apparatus 10, if a hotkey is used by simultaneously pressing the Fn key and arbitrary one of the additional keys when the Fn key is in the unlocked state, the Fn key is kept in the unlocked state. However, in the present information processing apparatus 10, when the Fn key is in the locked state, the state is switched into the unlocked state if (i) a hotkey is used by simultaneously pressing the Fn key and arbitrary one of the additional keys, (ii) one of the additional keys assigned for use as hotkeys in combination with the Fn key is singly pressed and released, or (iii) one of keys which are not assigned for use as hotkeys in combination with the Fn key is singly pressed and released. In the information processing apparatus 10, although not shown in the figures, when the Fn key is in the locked state, if one of the hotkey menu icons 2a, 2b, 2c, 2d, and 2f in the launcher 2 is selected via the predetermined operation instead of singly pressing and releasing one of the additional keys assigned for use as hotkeys in combination with the Fn key, Fn key is also switched into the unlocked state.

More specifically, in the present information processing apparatus 10, when one of various types of keys is pressed and released in the locked state or the unlocked state, the sequence of processing steps shown in FIGS. 19 to 27 is performed depending on which key is pressed and released. In FIGS. 19 to 27, processes performed respectively by the keyboard 1, the built-in controller 11, and the higher-level system including the utility in the information processing apparatus 10 are shown, while timings of transmitting information among the keyboard 1, the built-in controller 11, and the higher-level system including the utility are also shown. Note that, in FIGS. 19 to 27, some of the processing steps performed by the keyboard 1 are actually performed by a user. As described earlier, pressing and releasing an additional key is equivalent to indirectly selecting a corresponding hotkey menu icon 2a, 2b, 2c, 2d, or 2f in the launcher 2, and thus, in FIGS. 19 to 27, the process performed in response to singly pressing and releasing one of the additional keys can also be performed, although not described, by performing the predetermined operation to directly select a corresponding hotkey menu icons 2a, 2b, 2c, 2d, and 2f in the launcher 2.

First, a hotkey process is described below, which is performed in response to sequential pressing of the Fn key and a particular additional key when the Fn key locking mechanism is in the enabled and unlocked state. That is, when the Fn key locking mechanism in the enabled and unlocked state, if the Fn key locking mechanism is switched into the locked state and then if one of the additional keys assigned as the hotkeys in combination with the Fn key is pressed and released, a corresponding hotkey process is performed as described below. Herein, it is assumed that, in the information processing apparatus 10, the Fn key locking mechanism has already been set by the built-in controller 11 into the enabled state and the Fn key has been set into the unlocked state, and it is also assumed that the utility has already detected that the Fn key locking mechanism is in the enabled state. Furthermore, the launcher 2 is not currently displayed on the display 16, but the task tray icon 50 indicating that the Fn key is in the unlocked state is displayed on the display 16.

Figure 19:
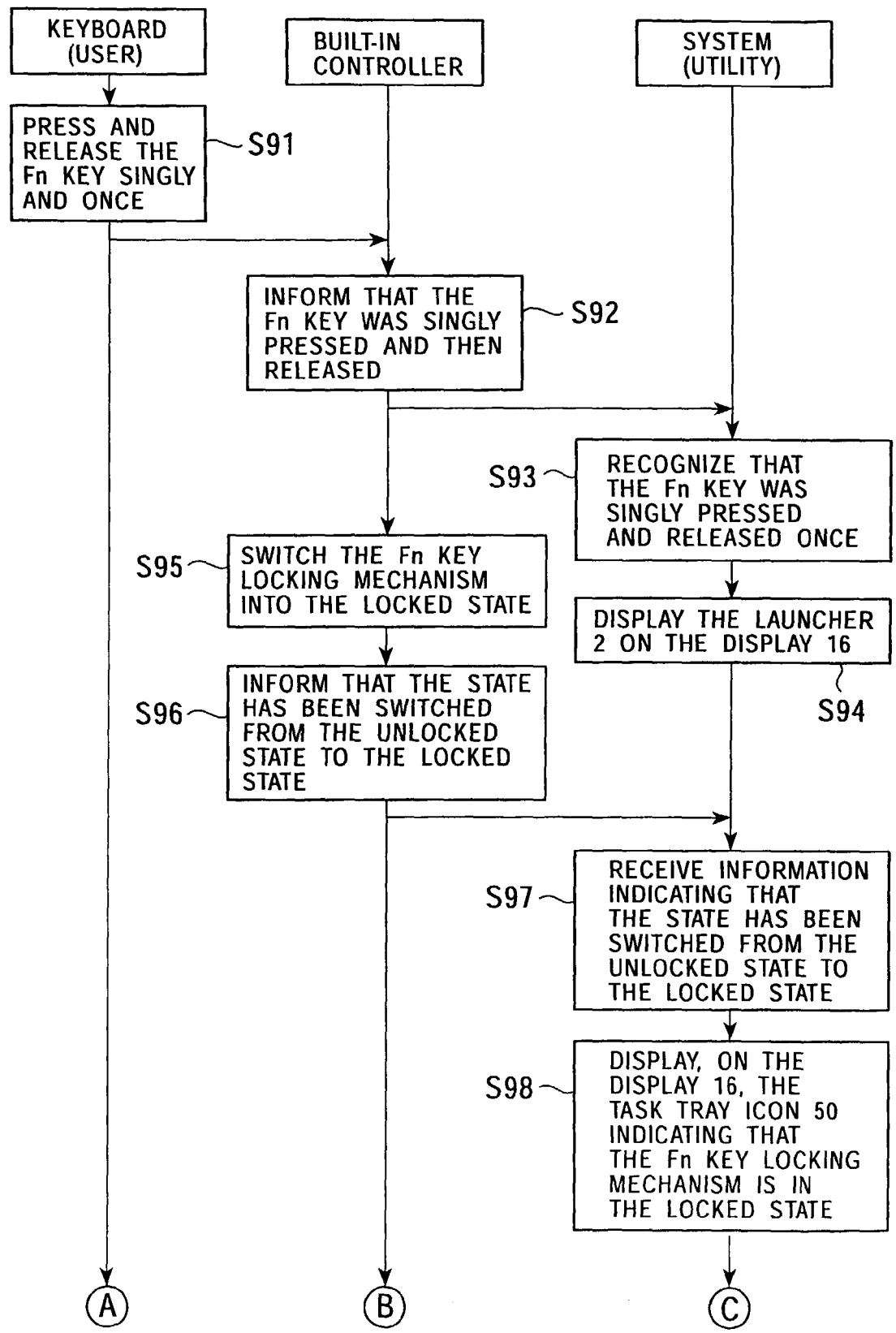
FIG. 19 is a flow chart showing a sequence of steps associated with a hotkey process which is performed in response to sequentially pressing the Fn key and one of additional keys when the Fn key locking mechanism is in the enabled and unlocked state, wherein steps from the start to a step in which the Fn key locking mechanism is switched into the locked state are shown.

As shown in FIG. 19, in the information processing apparatus 10, if, in step S91, a user presses and releases singly the Fn key on the keyboard 1 once, the pressing and releasing of the Fn key is detected by the built-in controller 11 monitoring the input operation on the keyboard 1.

In the information processing apparatus 10, in the next step S92, the built-in controller 11 informs the utility that the Fn key has been singly pressed and released. More specifically, in the information processing apparatus 10, the routine described earlier with reference to FIG. 8 is performed by the built-in controller 11 to inform the utility that the Fn key has been singly pressed and released. In the above process, in the present information processing apparatus 10, the information indicating that the Fn key has been singly pressed and released is transmitted not via the keyboard controller 11a but via the SPIC 11b.

In the information processing apparatus 10, in the next step S93, the utility receives the information indicating that the Fn key has been singly pressed and released once.

In response, in the information processing apparatus 10, in the next step S94, a launcher 2 is displayed on the display 16 under the control of the utility. More specifically, in the present information processing apparatus 10, the process described above with reference to FIG. 16 is performed to display the launcher 2 on the display 16.

In the information processing apparatus 10, in the next step S95, the built-in controller 11 switches the state of the Fn key locking mechanism into the locked state. In the next step S96, the built-in controller 11 informs the utility that the Fn key locking mechanism has been switched from the unlocked state into the locked state. More specifically, in the information processing apparatus 10, the routine described earlier with reference to FIGS. 9 and 10 is performed by the built-in controller 11 to inform the utility that the Fn key locking mechanism has been switched from the unlocked state into the locked state. In this process, in the information processing apparatus 10, the information indicating that the Fn key locking mechanism has been switched from the unlocked state into the locked state is transmitted not via the keyboard controller 11a but via the SPIC 11b.

In the information processing apparatus 10, in the next step S97, the utility receives, from the built-in controller 11, the information indicating that the Fn key locking mechanism has been switched from the unlocked state into the locked state. In step S98, in order to inform the user that the Fn key locking mechanism has been switched into the locked state, the task tray icon 50 displayed on the display 16 is changed, under the control of the utility, so as to indicate that the Fn key locking mechanism is in the locked state.

Figure 20:
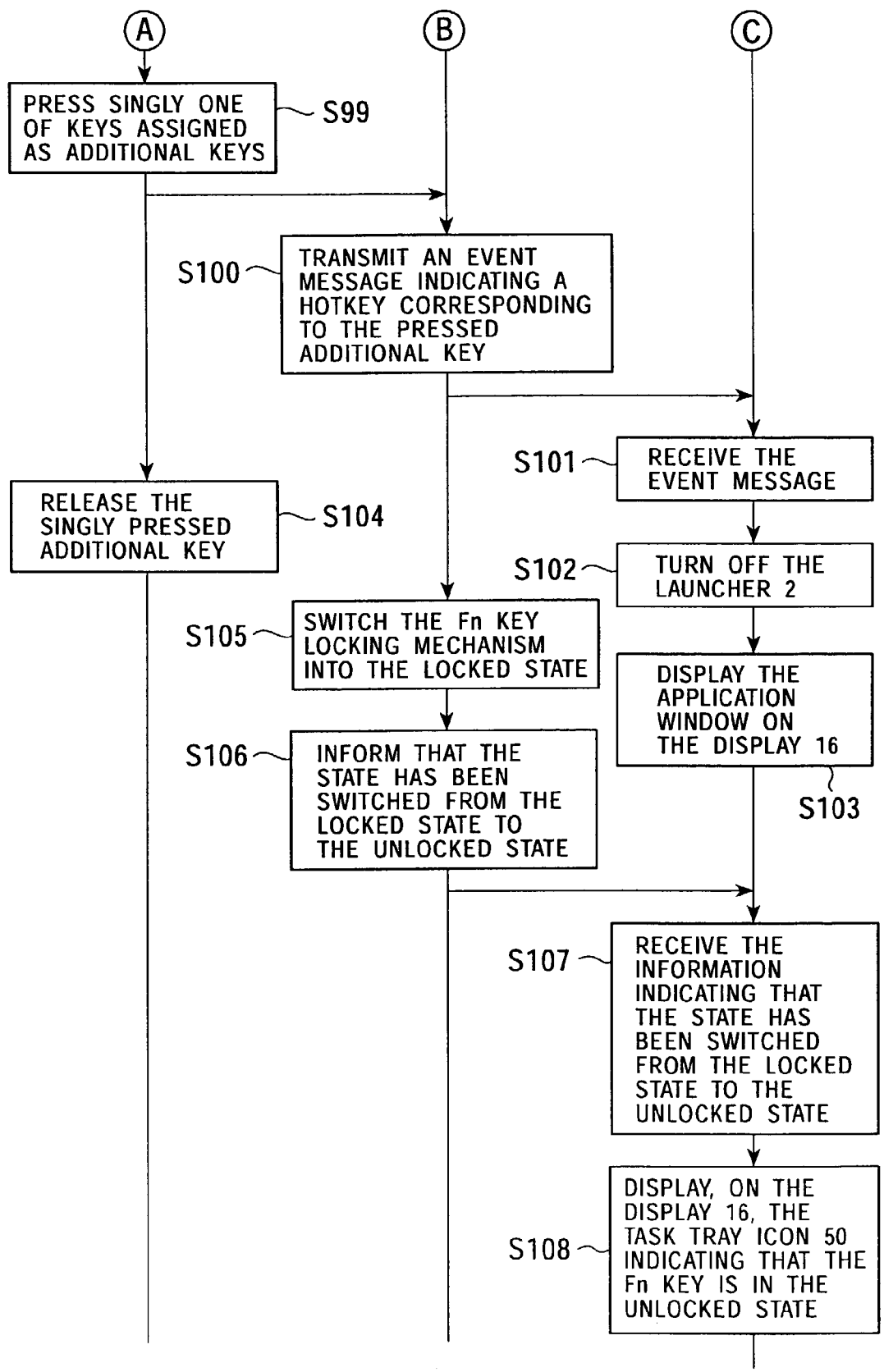
FIG. 20 is a flow chart showing a sequence of steps associated with a hotkey process which is performed in response to sequentially pressing the Fn key and one of additional keys when the Fn key locking mechanism is in the enabled and unlocked state, wherein steps following those shown in FIG. 19 are shown.

In the information processing apparatus 10, as shown in FIG. 20, if the user presses, in step S99, one of the additional keys assigned for use as hotkeys in combination with the Fn key, the pressing of the key is detected by the built-in controller 11 monitoring the input operation on the keyboard 1. More specifically, in the present information processing apparatus 10, if, for example, a function key labeled "F5" on the keyboard is pressed by the user, a hotkey function for controlling the brightness of the display 16 is performed.

In the information processing apparatus 10, in the next step S100, the built-in controller 11 transmits, to the utility, an event message which indicates not a scan code corresponding to the pressed additional key but a hotkey corresponding to the additional key. More specifically, in the present information processing apparatus 10, in a case in which the function key labeled "F5" on the keyboard is pressed in step S99, an event message indicating that the brightness control of the display 16 should be performed is transmitted from the built-in controller 11 to the utility. In this case, in the present information processing apparatus 10, the above event message is transmitted not via the keyboard controller 11a but via the SPIC 11b.

In the information processing apparatus 10, in step S101, the utility receives the event message transmitted from the built-in controller 11. In step S102, under the control of the utility, the launcher 2 displayed on the display 16 is turned off. In step S103, in order to present to the user the hotkey function corresponding to the combination of the Fn key and the additional key, the application window serving as the graphical user interface is displayed on the display 16 under the control of the utility. More specifically, in the present information processing apparatus 10, the process described above with reference to FIG. 17 is performed to display the application window on the display 16. For example, in the present information processing apparatus 10, if the event message received by the utility indicates that the brightness control of the display 16 should be performed, the application for controlling the brightness of the display 16 is activated and the predetermined window is displayed on the display 16 so as to present an environment which allows the user to adjust the brightness.

Thereafter, in the information processing apparatus 10, if the user releases, in step S104, the singly pressed additional key, then, in step S105, the built-in controller 11 switches the state of the Fn key locking mechanism into the unlocked state. Thereafter, in step S106, the built-in controller 11 informs the utility that the Fn key locking mechanism has been switched from the locked state into the unlocked state. More specifically, in the information processing apparatus 10, the routine described earlier with reference to FIGS. 9 and 10 is performed by the built-in controller 11 to inform the utility that the Fn key locking mechanism has been switched from the locked state into the unlocked state. In this process, in the present information processing apparatus 10, the information indicating that the Fn key locking mechanism has been switched from the locked state into the unlocked state is transmitted not via the keyboard controller 11a but via the SPIC 11b.

In the information processing apparatus 10, in the next step S107, the utility receives, from the built-in controller 11, the information indicating that the Fn key locking mechanism has been switched from the locked state into the unlocked state. In step S108, in order to inform the user that the Fn key locking mechanism has been switched into the unlocked state, the task tray icon 50 displayed on the display 16 is changed, under the control of the utility, so as to indicate that the Fn key locking mechanism is in the unlocked state. Thus, the sequence of processing steps is completed.

In the present information processing apparatus 10, as described above, when the Fn key locking mechanism is in the enabled state and the Fn key is in the unlocked state, if the Fn key is singly pressed and released by the user, the Fn key is switched into the locked state and the launcher 2 serving as the graphical user interface is displayed on the display 16. In this state, if the user presses and releases one of the additional keys while referring to the launcher 2, a hotkey process corresponding to the pressed additional key is performed. Thus, in the present information processing apparatus 10, a desired hotkey process can be performed by sequentially pressing the Fn key and an additional key instead of simultaneously pressing and releasing them.

When the Fn key locking mechanism is in the enabled state and the Fn key is in the unlocked state, if one of the additional keys which are not assigned for use as hotkeys in combination with the Fn key is singly pressed and released, the Fn key is switched into the locked state and the process described below is performed. Herein, it is assumed that, in the information processing apparatus 10, the Fn key locking mechanism has already been set by the built-in controller 11 into the enabled state and the Fn key has been set into the unlocked state, and it is also assumed that the utility has already detected that the Fn key locking mechanism is in the enabled state. Furthermore, the launcher 2 is not currently displayed on the display 16, but the task tray icon 50 indicating that the Fn key is in the unlocked state is displayed on the display 16.

Figure 21:
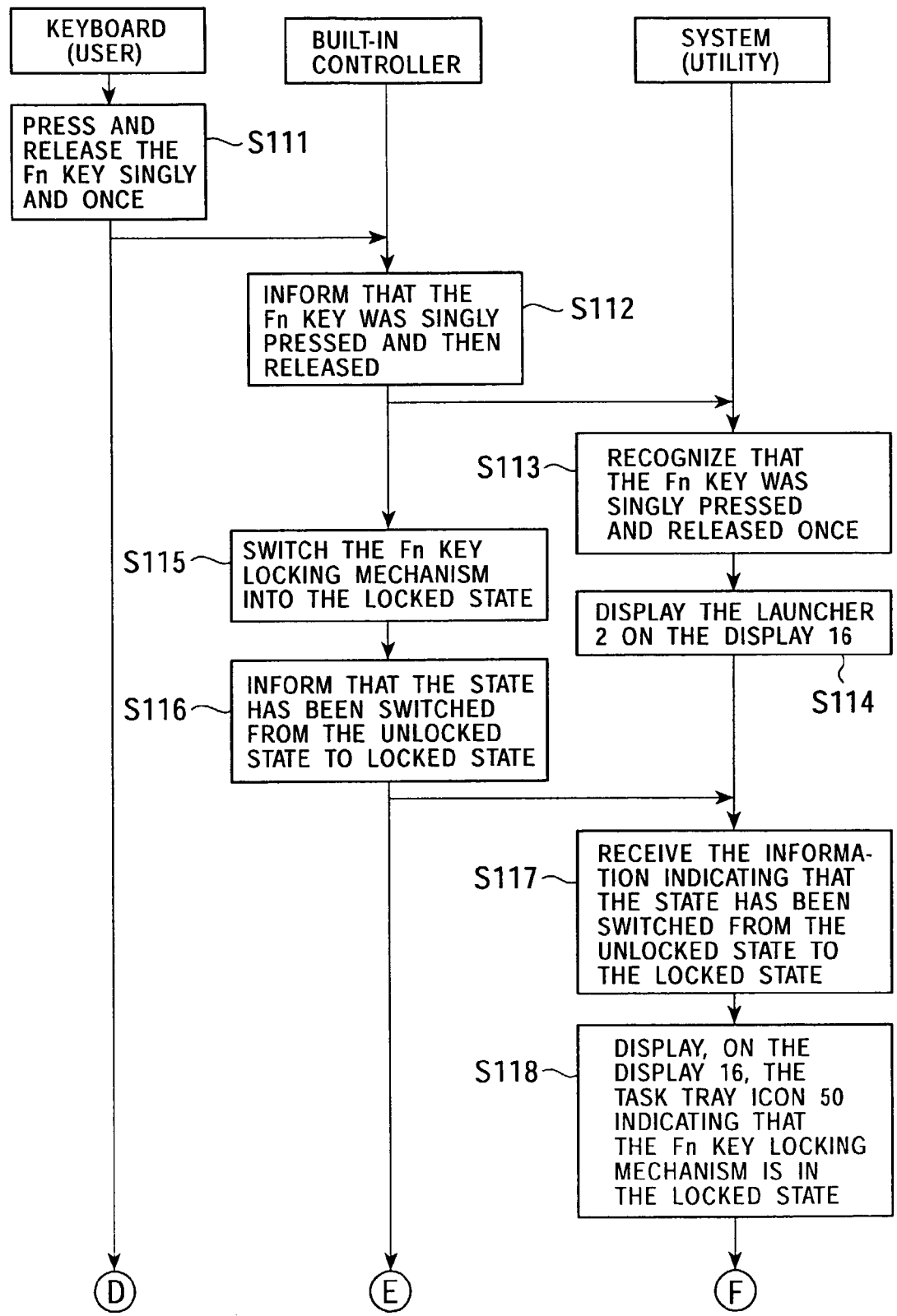
FIG. 21 is a flow chart showing a sequence of steps including a process of switching the Fn key locking mechanism from the enabled and unlocked state into the locked state and also including a process performed in response to singly pressing an arbitrary key which is not assigned as a hotkey used in combination with the Fn key, wherein steps from the start to a step in which the Fn key locking mechanism is switched into the locked state are shown.

As shown in FIG. 21, in the information processing apparatus 10, if, in step S111, a user presses and releases singly the Fn key on the keyboard 1 once, the pressing and releasing of the Fn key is detected by the built-in controller 11 monitoring the input operation on the keyboard 1.

In the information processing apparatus 10, in the next step S112, the built-in controller 11 informs the utility that the Fn key has been singly pressed and released. More specifically, in the information processing apparatus 10, the routine described earlier with reference to FIG. 8 is performed by the built-in controller 11 to inform the utility that the Fn key has been singly pressed and released. In the above process, in the present information processing apparatus 10, the information indicating that the Fn key has been singly pressed and released is transmitted not via the keyboard controller 11a but via the SPIC 11b.

In the information processing apparatus 10, in the next step S113, the utility receives the information indicating that the Fn key has been singly pressed and released once.

In response, in the information processing apparatus 10, in the next step S114, a launcher 2 is displayed on the display 16 under the control of the utility. More specifically, in the present information processing apparatus 10, the process described above with reference to FIG. 16 is performed to display the launcher 2 on the display 16.

Thereafter, in the information processing apparatus 10, in step S115, the built-in controller 11 switches the state of the Fn key locking mechanism into the locked state. Thereafter, in step S116, the built-in controller 11 informs the utility that the Fn key locking mechanism has been switched from the unlocked state into the locked state. More specifically, in the information processing apparatus 10, the routine described earlier with reference to FIGS. 9 and 10 is performed by the built-in controller 11 to inform the utility that the Fn key locking mechanism has been switched from the unlocked state into the locked state. In the above process, in the present information processing apparatus 10, the information indicating that the Fn key locking mechanism has been switched from the unlocked state into the locked state is transmitted not via the keyboard controller 11a but via the SPIC 11b.

In the information processing apparatus 10, in the next step S117, the utility receives, from the built-in controller 11, the information indicating that the Fn key locking mechanism has been switched from the unlocked state into the locked state. In step S118, in order to inform the user that the Fn key locking mechanism has been switched into the locked state, the task tray icon 50 displayed on the display 16 is changed, under the control of the utility, so as to indicate that the Fn key locking mechanism is in the locked state.

Figure 22:
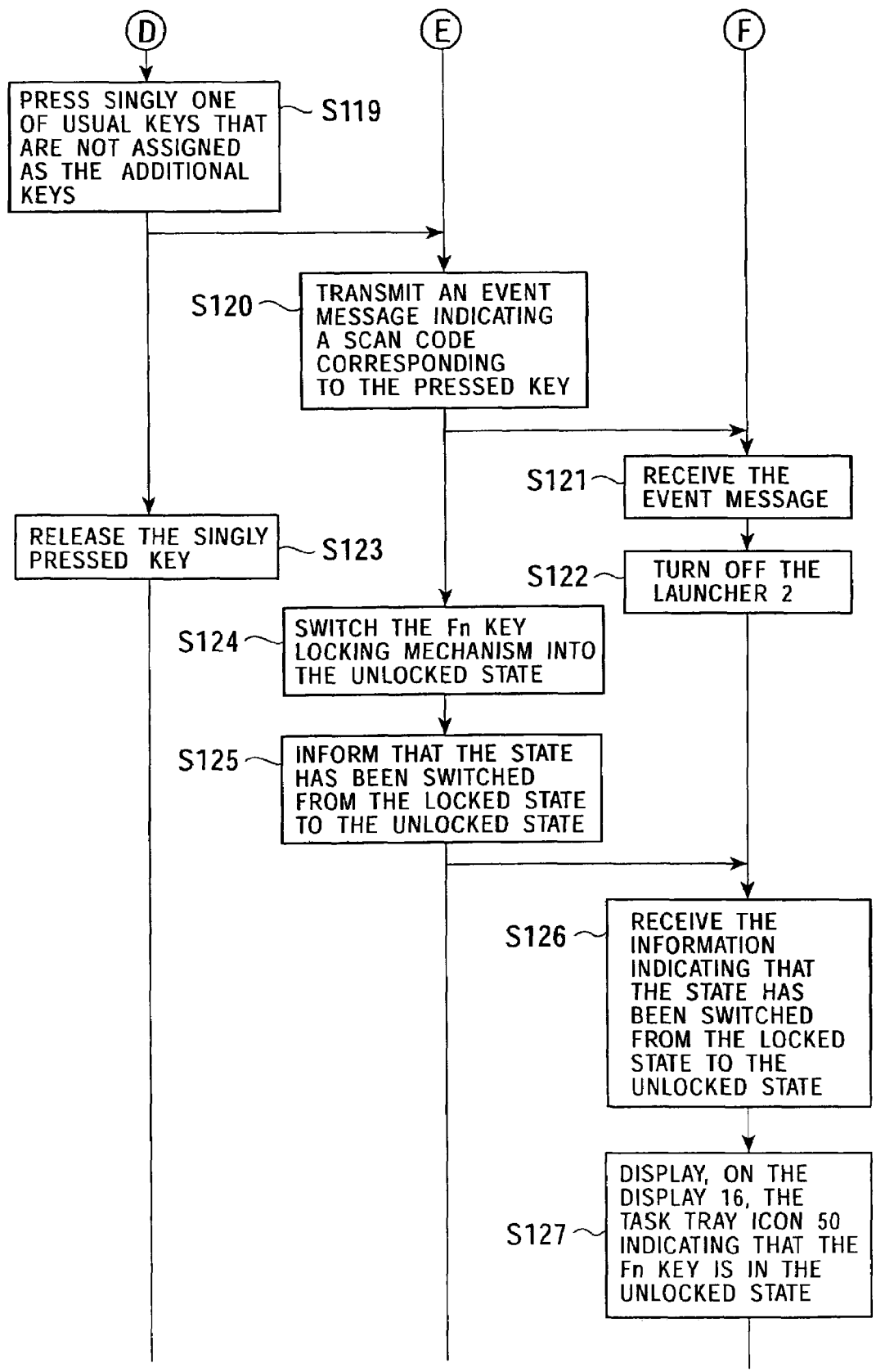
FIG. 22 is a flow chart showing a sequence of steps including a process of switching the Fn key locking mechanism from the enabled and unlocked state into the locked state and also including a process performed in response to singly pressing an arbitrary key which is not assigned as a hotkey used in combination with the Fn key, wherein steps following those shown in FIG. 21 are shown.

In the information processing apparatus 10, as shown in FIG. 22, in step S119, if one of the additional keys on the keyboard 1, which are not assigned for use as hotkeys in combination with the Fn key, such as a function key labeled "F9" on the keyboard, is singly pressed by the user, the pressing of the key is detected by the built-in controller 11 monitoring the input operation on the keyboard 1.

Thereafter, in the information processing apparatus 10, in step S120, the built-in controller 11 transmits, to the conventional higher-level system part other than the utility, an event message indicating a scan code corresponding to the pressed key. For example, in the present information processing apparatus 10, in a case in which the function key labeled "F9" on the keyboard is pressed in step S119, an event message indicating that the function key "F9" has been pressed is transmitted from the built-in controller 11 to the higher-level system. In this case, in the present information processing apparatus 10, the above event message is transmitted via the keyboard controller 11a. That is, in the in the present information processing apparatus 10, because keys which are not assigned for use as hotkeys in combination with the Fn key are not recognized by the SPIC 11b, the event message indicating the scan code assigned to the pressed key of such the type is transmitted via a usual path, that is, via the keyboard controller 11a. Thereafter, in the information processing apparatus 10, in step S121, the higher-level system receives the event message transmitted from the built-in controller 11.

Thereafter, in the information processing apparatus 10, in step S122, under the control of the utility, the launcher 2 displayed on the display 16 is turned off. If the user releases, in step S123, the singly pressed key, then, in step S124, the built-in controller 11 switches the state of the Fn key locking mechanism into the unlocked state. Thereafter, in step S125, the built-in controller 11 informs the utility that the Fn key locking mechanism has been switched from the locked state into the unlocked state. More specifically, in the information processing apparatus 10, the routine described earlier with reference to FIGS. 9 and 10 is performed by the built-in controller 11 to inform the utility that the Fn key locking mechanism has been switched from the locked state into the unlocked state. In the above process, in the present information processing apparatus 10, the information indicating that the Fn key locking mechanism has been switched from the locked state into the unlocked state is transmitted not via the keyboard controller 11a but via the SPIC 11b.

In the information processing apparatus 10, in the next step S126, the utility receives, from the built-in controller 11, the information indicating that the Fn key locking mechanism has been switched from the locked state into the unlocked state. In step S127, in order to inform the user that the Fn key locking mechanism has been switched into the unlocked state, the task tray icon 50 displayed on the display 16 is changed, under the control of the utility, so as to indicate that the Fn key locking mechanism is in the unlocked state. Thus, the sequence of processing steps is completed.

In the present information processing apparatus 10, as described above, when the Fn key locking mechanism is in the enabled state and the Fn key is in the unlocked state, if the Fn key is singly pressed and then released, the Fn key is switched into the locked state. In this state, if any key other than the additional keys is pressed and released, the Fn key is switched again into the unlocked state. Thus, in the present information processing apparatus 10, when the Fn key is in the locked state, if any one of the keys which are not assigned for use as hotkeys in combination with the Fn key is singly pressed and released, a corresponding process is properly performed without resulting in any problem.

When the Fn key locking mechanism is in the enabled state and the Fn key is in the unlocked state, if the Fn key and one of additional keys are simultaneously pressed, a corresponding hotkey process is performed in the conventional manner as described below. That is, when the Fn key locking mechanism is in the enabled state and the Fn key is in the unlocked state, if the Fn key and one of the additional keys assigned for use as hotkeys in combination with the Fn key are simultaneously pressed, a hotkey process assigned to the combination of the Fn key and the pressed additional key is performed. Herein, it is assumed that, in the information processing apparatus 10, the Fn key locking mechanism has already been set by the built-in controller 11 into the enabled state and the Fn key has been set into the unlocked state, and it is also assumed that the utility has already detected that the Fn key locking mechanism is in the enabled state. Furthermore, the launcher 2 is not currently displayed on the display 16, but the task tray icon 50 indicating that the Fn key is in the unlocked state is displayed on the display 16.

Figure 23:
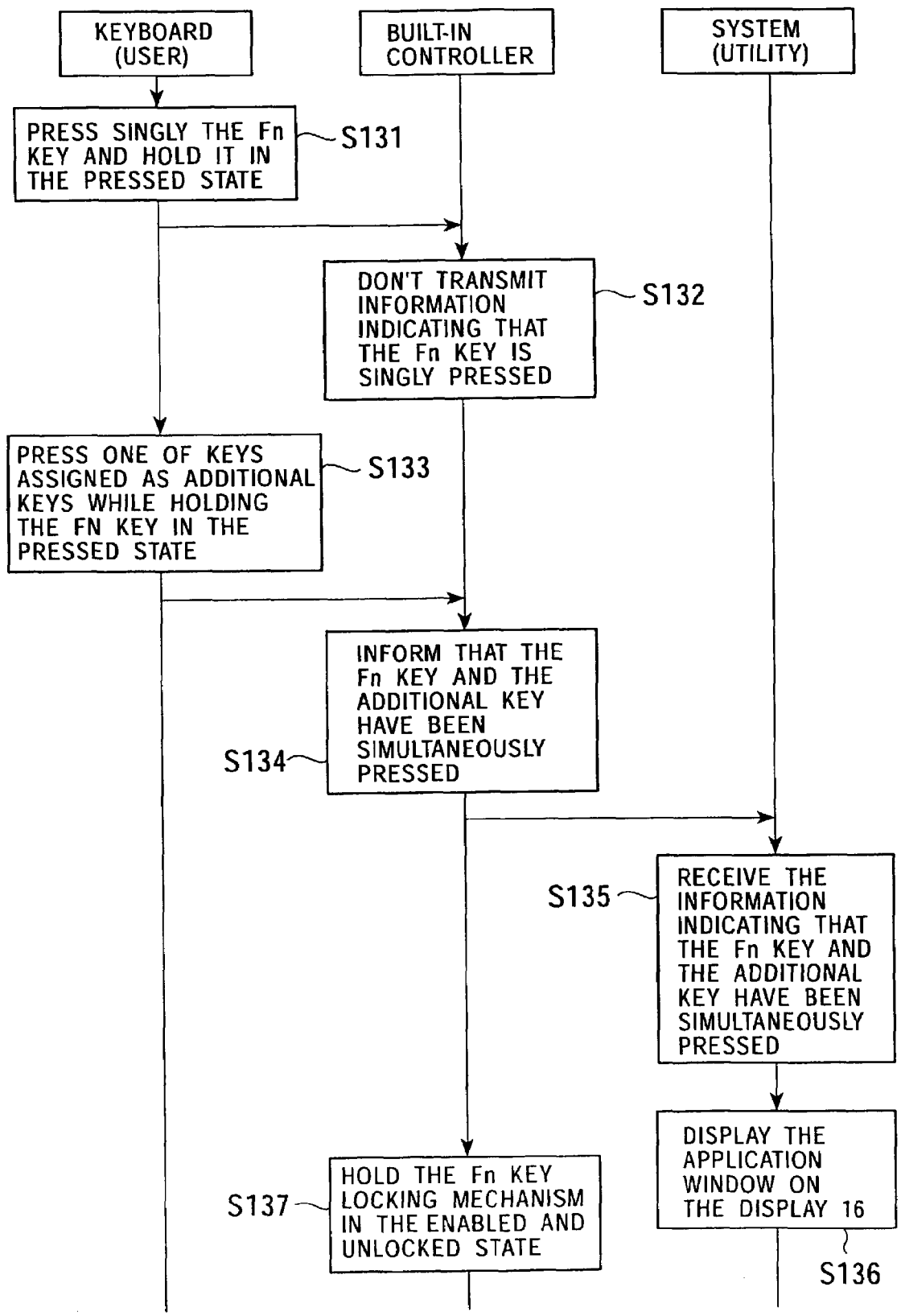
FIG. 23 is a flow chart showing a sequence of steps associated with a conventional hotkey process performed, when the Fn key locking mechanism is in the enabled and unlocked state, in response to simultaneously pressing the Fn key and an additional key.

As shown in FIG. 23, in the information processing apparatus 10, if, in step S131, a user presses singly the Fn key on the keyboard 1 and holds it in the pressed state, the pressing of the Fn key is detected by the built-in controller 11 monitoring the input operation on the keyboard 1.

In the information processing apparatus 10, in the next step S132, the built-in controller 11 does not inform the utility that the Fn key has been singly pressed. That is, as described earlier, in the present information processing apparatus 10, if the Fn key being in the pressed state is released, the built-in controller 11 transmits informs the utility that the Fn key has been pressed, as described earlier. However, because the Fn key is not released yet at this step S132, the information is not transmitted to the utility.

In the information processing apparatus 10, in the next step S133, if one of the additional keys, on the keyboard 1, assigned for use as hotkeys in combination with the Fn key is further pressed by the user while holding down the Fn key, the pressing of the key is detected by the built-in controller 11 monitoring the input operation on the keyboard 1. For example, in the present information processing apparatus 10, when the user wants to activate a hotkey process for brightness control of the display 16, the user can do it, as described earlier, by pressing the function key labeled "F5" on the keyboard serving as an additional key together with the Fn key.

In the information processing apparatus 10, in the next step S134, the built-in controller 11 informs the utility that the Fn key and the additional key have been simultaneously pressed. In the above process, in the present information processing apparatus 10, the information indicating that the Fn key and the additional key has been simultaneously pressed is transmitted not via the keyboard controller 11a but via the SPIC 11b.

Thus, in the information processing apparatus 10, in the next step S135, the utility receives, from the built-in controller 11, the information indicating that the Fn key and the additional key have been simultaneously pressed. In the next step S136, in order to present to the user the hotkey function corresponding to the combination of the Fn key and the additional key, the application window serving as the graphical user interface is displayed on the display 16 under the control of the utility. For example, in the present information processing apparatus 10, in a case in which the information received by the utility indicates that the Fn key and the function key labeled "F5" on the keyboard have been simultaneously pressed, the application for controlling the brightness of the display 16 is activated and the predetermined window is displayed on the display 16 so as to present an environment which allows the user to adjust the brightness, as described earlier.

In the information processing apparatus 10, in the next step S137, the built-in controller 11 holds the Fn key locking mechanism in the enabled and unlocked state without changing the state, and the process is completed. In this case, in the present information processing apparatus 10, the built-in controller 11 is not required to inform the utility that no state transitions occurred but the Fn key locking mechanism is held in the enabled state and the Fn key is held in the unlocked state.

In the present information processing apparatus 10, as described above, when the Fn key locking mechanism is in the enabled state and the Fn key is in the unlocked state, if the user simultaneously presses the Fn key and one of the additional keys, a corresponding hotkey process desired by the user is performed. That is, in the present information processing apparatus 10, any hotkey process can be performed not only by sequentially pressing and releasing the Fn key and a corresponding additional key but also by simultaneously pressing the Fn key and the additional key in the conventional manner. This allows users who are proficient in the conventional operation to use hotkeys without encountering any problem.

When the Fn key locking mechanism is in the enabled state and the Fn key is in the locked state, if the Fn key and one of the additional keys are simultaneously pressed, a corresponding hotkey process is performed in the conventional manner, as described below. That is, when the Fn key locking mechanism is in the enabled state and the Fn key is in the locked state, if the Fn key and one of the additional keys assigned for use as hotkeys in combination with the Fn key are simultaneously pressed, a hotkey process assigned to the combination of the Fn key and the pressed additional key is performed. Herein, it is assumed that, in the information processing apparatus 10, the Fn key locking mechanism has already been set by the built-in controller 11 into the enabled state and the Fn key has been set into the locked state, and it is also assumed that the utility has already detected that the Fn key locking mechanism is in the enabled state. Furthermore, the launcher 2 is not currently displayed on the display 16, but the task tray icon 50 indicating that the Fn key is in the locked state is displayed on the display 16.

Figure 24:
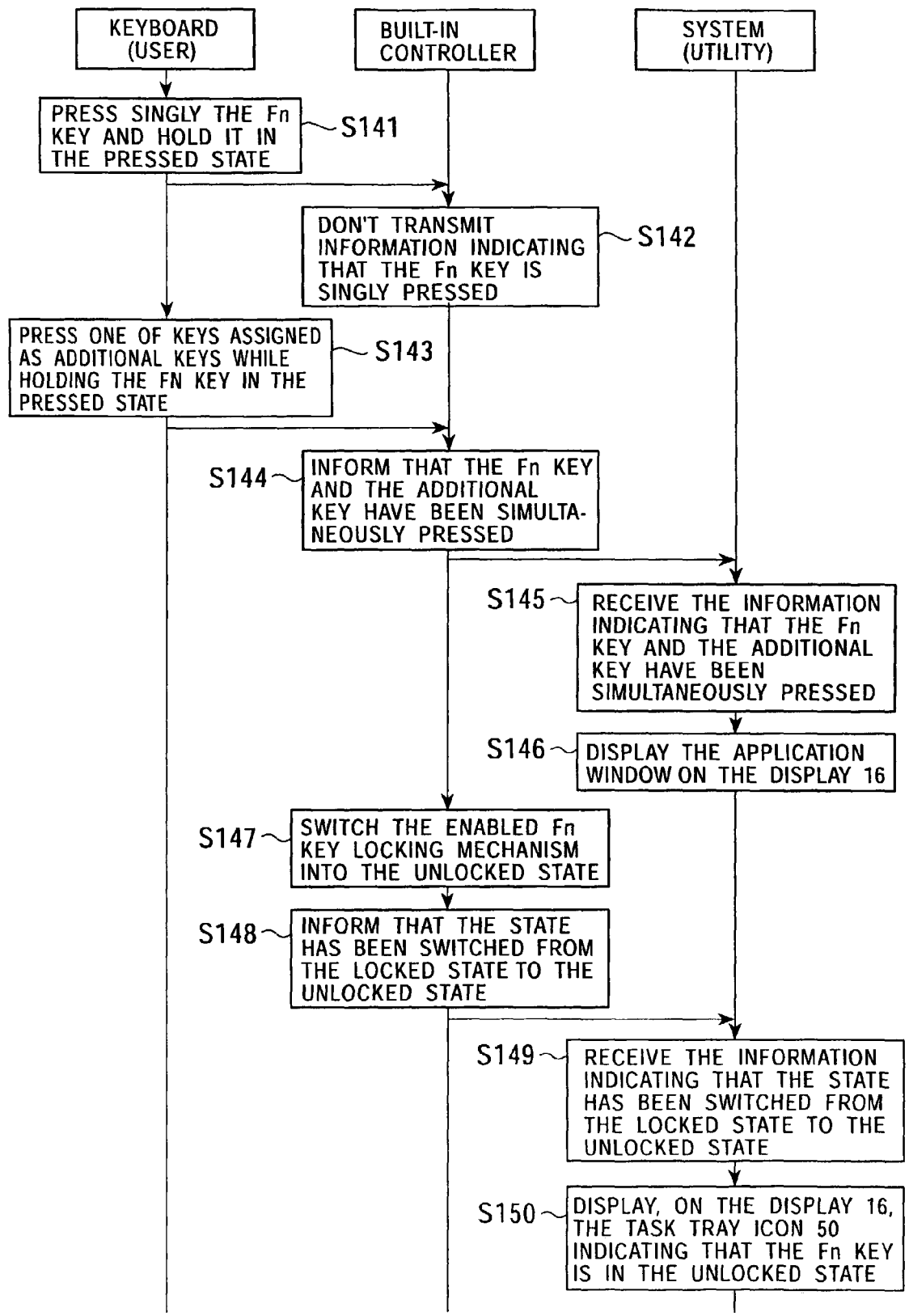
FIG. 24 is a flow chart showing a sequence of steps associated with a conventional hotkey process performed, when the Fn key locking mechanism is in the enabled and locked state, in response to simultaneously pressing the Fn key and an additional key.

As shown in FIG. 24, in the information processing apparatus 10, if, in step S141, a user presses singly the Fn key on the keyboard 1 and holds it in the pressed state, the pressing of the Fn key is detected by the built-in controller 11 monitoring the input operation on the keyboard 1.

In the information processing apparatus 10, in the next step S142, the built-in controller 11 does not inform the utility that the Fn key has been singly pressed.

In the information processing apparatus 10, in the next step S143, if one of the additional keys, on the keyboard 1, assigned for use as hotkeys in combination with the Fn key is further pressed by the user while holding down the Fn key, the pressing of the key is detected by the built-in controller 11 monitoring the input operation on the keyboard 1. For example, in the present information processing apparatus 10, when the user wants to activate a hotkey process for brightness control of the display 16, the user can do it, as described earlier, by pressing the function key labeled "F5" on the keyboard serving as an additional key together with the Fn key.

In the information processing apparatus 10, in the next step S144, the built-in controller 11 informs the utility that the Fn key and the additional key have been simultaneously pressed. In the above process, in the present information processing apparatus 10, the information indicating that the Fn key and the additional key has been simultaneously pressed is transmitted not via the keyboard controller 11a but via the SPIC 11b.

Thus, in the information processing apparatus 10, in the next step S145, the utility receives, from the built-in controller 11, the information indicating that the Fn key and the additional key have been simultaneously pressed. In the next step S146, in order to present to the user the hotkey function corresponding to the combination of the Fn key and the additional key, the application window serving as the graphical user interface is displayed on the display 16 under the control of the utility. For example, in the present information processing apparatus 10, in a case in which the information received by the utility indicates that the Fn key and the function key labeled "F5" on the keyboard have been simultaneously pressed, the application for controlling the brightness of the display 16 is activated and the predetermined window is displayed on the display 16 so as to present an environment which allows the user to adjust the brightness, as described earlier.

In the information processing apparatus 10, in the next step S147, the built-in controller 11 switches the Fn key locking mechanism into the enabled and unlocked state. In the next step S148, the built-in controller 11 informs the utility that the Fn key locking mechanism has been switched from the locked state into the unlocked state. More specifically, in the information processing apparatus 10, the routine described earlier with reference to FIGS. 9 and 10 is performed by the built-in controller 11 to inform the utility that the Fn key locking mechanism has been switched from the locked state into the unlocked state. In the above process, in the present information processing apparatus 10, the information indicating that the Fn key locking mechanism has been switched from the locked state into the unlocked state is transmitted not via the keyboard controller 11a but via the SPIC 11b.

In the information processing apparatus 10, in the next step S149, the utility receives, from the built-in controller 11, the information indicating that the Fn key locking mechanism has been switched from the locked state into the unlocked state. In the next step S150, in order to inform the user that the Fn key locking mechanism has been switched into the unlocked state, the task tray icon 50 displayed on the display 16 is changed, under the control of the utility, so as to indicate that the Fn key locking mechanism is in the unlocked state. Thus, the sequence of processing steps is completed.

In the present information processing apparatus 10, as described above, when the Fn key locking mechanism is in the enabled state and the Fn key is in the locked state, if the user simultaneously presses the Fn key and one of the additional keys, a corresponding hotkey process desired by the user is performed. Thus, in the present information processing apparatus 10, also in the unlocked state, any hotkey process can be performed not only by sequentially pressing and releasing the Fn key and a corresponding additional key but also by simultaneously pressing the Fn key and the additional key in the conventional manner. This allows users who are proficient in the conventional operation to use hotkeys without encountering any problem.

When the Fn key locking mechanism is in the disabled state, if the Fn key and one of the additional keys are simultaneously pressed, a corresponding hotkey process is also performed in the conventional manner as described below. That is, when the Fn key locking mechanism is in the disabled state, if the Fn key and one of the additional keys assigned for use as hotkeys in combination with the Fn key are simultaneously pressed, a hotkey process assigned to the combination of the Fn key and the pressed additional key is performed. In other words, this provides exactly the same user interface as the conventional user interface for achieving hotkeys by simultaneously pressing the Fn key and one of the additional keys. Note that, in the present information processing apparatus 10, as a matter of course, when the Fn key locking mechanism is in the disabled state, the Fn key is always in the unlocked state. Herein, it is assumed that, in the information processing apparatus 10, the Fn key locking mechanism has already been set by the built-in controller 11 into the disabled state, and it is also assumed that the utility has already detected that the Fn key locking mechanism is in the disabled state. Furthermore, the launcher 2 and the task tray icon 50 are not displayed on the display 16.

Figure 25:
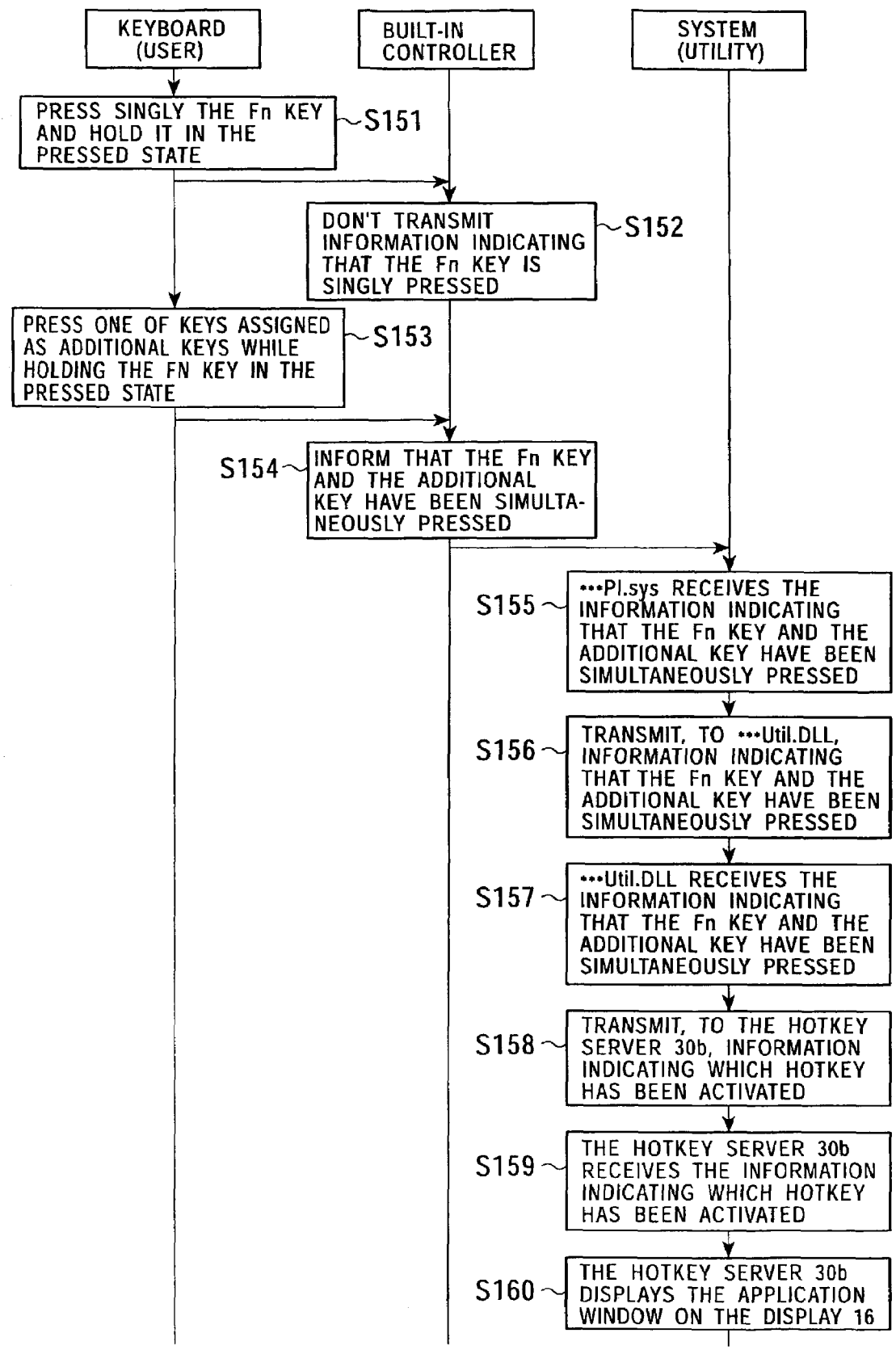
FIG. 25 is a flow chart showing a sequence of steps associated with a conventional hotkey process performed, when the Fn key locking mechanism is in the disabled state, in response to simultaneously pressing the Fn key and an additional key.

As shown in FIG. 25, in the information processing apparatus 10, if, in step S151, a user presses singly the Fn key on the keyboard 1 and holds it in the pressed state, the pressing of the Fn key is detected by the built-in controller 11 monitoring the input operation on the keyboard 1.

In the information processing apparatus 10, in the next step S152, the built-in controller 11 does not inform the utility that the Fn key has been singly pressed.

In the information processing apparatus 10, in the next step S153, if one of the additional keys, on the keyboard 1, assigned for use as hotkeys in combination with the Fn key is further pressed by the user while holding down the Fn key, the pressing of the key is detected by the built-in controller 11 monitoring the input operation on the keyboard 1. For example, in the present information processing apparatus 10, when the user wants to activate a hotkey process for brightness control of the display 16, the user can do it, as described earlier, by pressing the function key labeled "F5" on the keyboard serving as an additional key together with the Fn key.

In the information processing apparatus 10, in the next step S154, the built-in controller 11 informs the utility that the Fn key and the additional key have been simultaneously pressed. In the above process, in the present information processing apparatus 10, the information indicating that the Fn key and the additional key has been simultaneously pressed is transmitted not via the keyboard controller 11*a* but via the SPIC 11*b*.

Thus, in the information processing apparatus 10, in the next step S155, "**PI.sys" in the operating system 20 receives, from the built-in controller 11, the information indicating that the Fn key and the additional key have been simultaneously pressed. Then in step S156, the information is transferred to "*Util.DLL".

In the present information processing apparatus 10, if "*Util.DLL" receives, in step S157, the information indicating that the Fn key and the additional key have been simultaneously pressed, then, in step S158, "*Util.DLL" converts this information so as to indicate a specific hotkey process assigned to the combination of the Fn key and the pressed additional key. The resultant information is then transmitted to the hotkey server 30*b* serving as the utility in the application program 30.

In the present information processing apparatus 10, if the hotkey server 30*b* receives, in step S159, the information indicating the specific hotkey process, then in the next step S160, in order to present to the user the hotkey function corresponding to the combination of the Fn key and the additional key, the application window serving as the graphical user interface is displayed on the display 16 under the control of the hotkey server 30*b*, and the sequence of processing steps is completed. For example, in the present information processing apparatus 10, in a case in which the information received by the utility indicates that the Fn key and the function key labeled "F5" on the keyboard have been simultaneously pressed, the application for controlling the brightness of the display 16 is activated and the predetermined window is displayed on the display 16 so as to present an environment which allows the user to adjust the brightness, as described earlier.

In the present information processing apparatus 10, as described above, when the Fn key locking mechanism is in the disabled state, if the user simultaneously presses the Fn key and one of the additional keys, a corresponding hotkey process desired by the user is performed. That is, in the present information processing apparatus 10, when the Fn key locking mechanism is in the disabled state, any hotkey process can be performed properly in the conventional manner without resulting in any problem.

As described above, in the present information processing apparatus 10, any hotkey process in conjunction with the Fn key can be performed regardless of whether the Fn key locking mechanism is in the enabled state or the disabled state.

Figure 26:
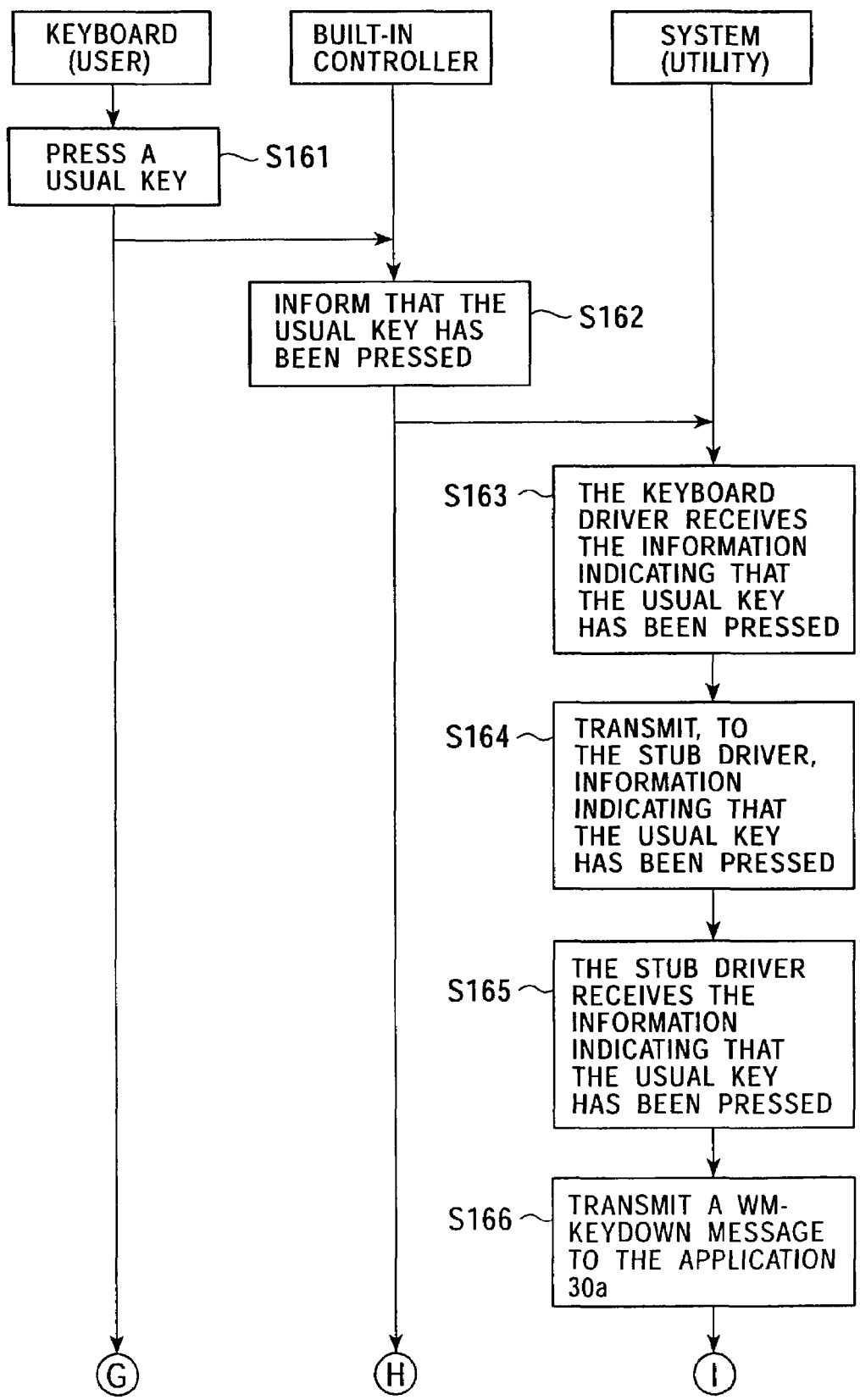
FIG. 26 is a flow chart showing a sequence of processing steps performed, when the Fn key locking mechanism is enabled or disabled and is in the unlocked state, in response to pressing a usual key other than the Fn key, wherein steps from a first step in which the key is pressed to a step in which the key-is released are shown.
Figure 27:
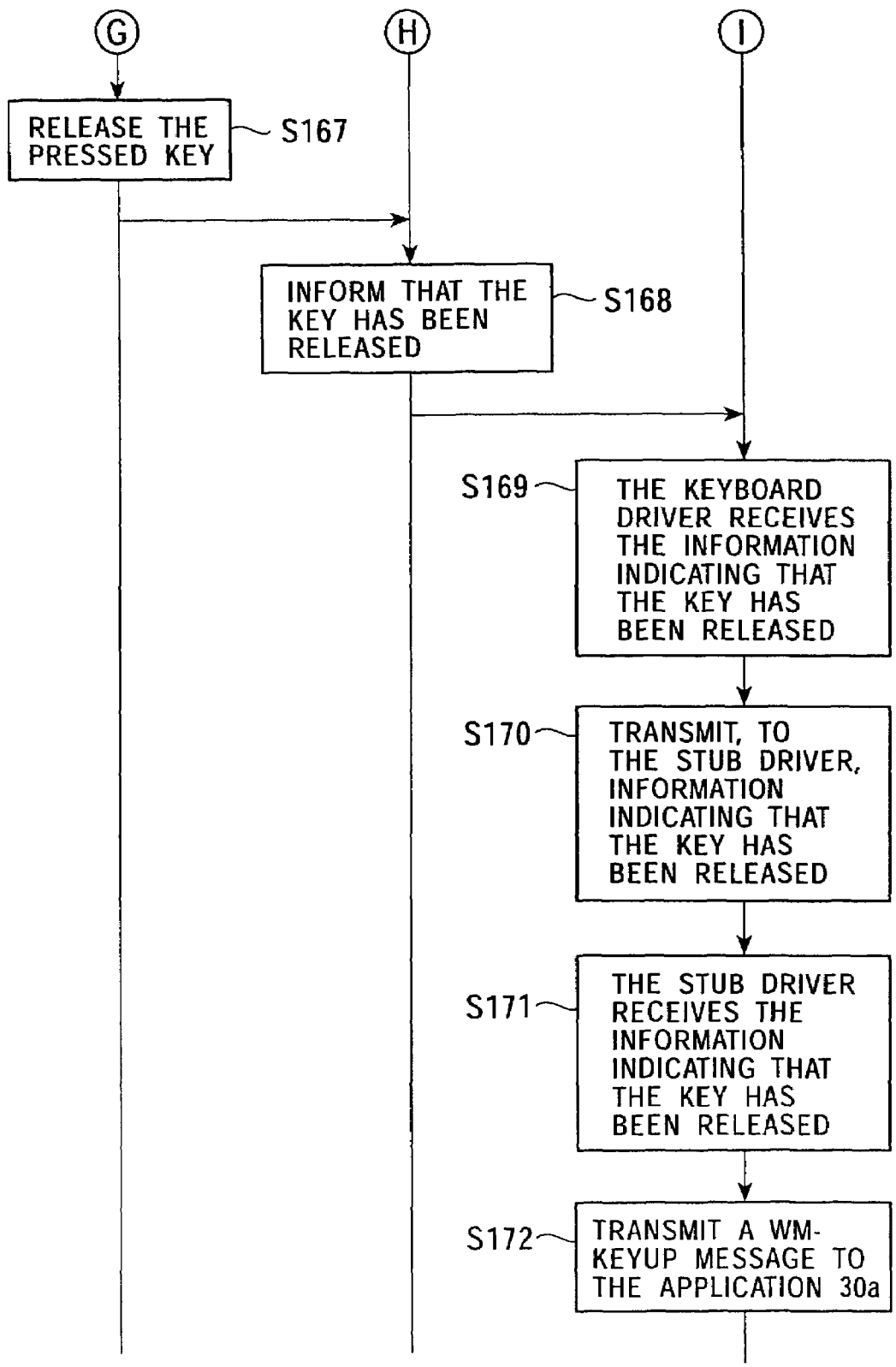
FIG. 27 is a flow chart showing a sequence of processing steps performed, when the Fn key locking mechanism is enabled or disabled and is in the unlocked state, in response to pressing a usual key other than the Fn key, wherein steps following those shown in FIG. 26 are shown.

In the present information processing apparatus 10, when the Fn key locking mechanism is in either the enabled state or the disabled state and the Fn key is in the unlocked state, if a usual key other than the Fn key is pressed and released, a sequence of processing steps shown in FIGS. 26 and 27 is performed, as described below. Herein, it is assumed that, in the information processing apparatus 10, the Fn key locking mechanism has already been set by the built-in controller 11 into the enabled state or the disabled state, and it is also assumed that the utility has already detected whether the Fn key locking mechanism is in the enabled state or the disabled state.

As shown in FIG. 26, in the information processing apparatus 10, if, in step S161, a user presses an arbitrary key other than the Fn key on the keyboard 1, the pressing of the key is detected by the built-in controller 11 monitoring the input operation on the keyboard 1. For convenience of description, it is assured herein that an alphanumeric key labeled "A" on the keyboard has been pressed.

In the information processing apparatus 10, in the next step S162, the built-in controller 11 informs the higher-level system that the alphanumeric key labeled "A" on the keyboard has been pressed. In this case, in the present information processing apparatus 10, the above information indicating that the key has been pressed is transmitted via the keyboard controller 11*a* as in the normal operation.

In the information processing apparatus 10, if, in step S163, the keyboard driver described above in the operating system 20 receives, from the built-in controller 11, the information indicating that the alphanumeric key labeled "A" on the keyboard has been pressed, then, in the next step S164, this information is transferred to the stub driver such as "kbd-jpn.DLL".

In the information processing apparatus 10, if the stub driver receives, in step S165, the information indicating that the alphanumeric key labeled "A" on the keyboard has been pressed, then, in the next step S166, the stub driver converts the received information indicating that the alphanumeric key labeled "A" on the keyboard has been pressed into information indicating that a specific key, "A" or "a" in this case, has been pressed. The resultant information is then supplied, as "WM_KEYDOWN", to the application 30a in the application programs 30.

In the information processing apparatus 10, as shown in FIG. 27, in step S167, if the user releases the pressed alphanumeric key labeled "A" on the keyboard, the releasing of the key is detected by the built-in controller 11 monitoring the input operation on the keyboard 1.

In the information processing apparatus 10, in the next step S168, the built-in controller 11 informs the higher-level system that the alphanumeric key labeled "A" on the keyboard has been released from the pressed state. In this case, in the present information processing apparatus 10, the information indicating that the key has been released is transmitted via the keyboard controller 11a, as in the normal operation.

Thus, in the information processing apparatus 10, in step S169, if the keyboard driver receives, from the built-in controller 11, the information indicating that the alphanumeric key labeled "A" on the keyboard has been released, then, in the next step S170, this information is transferred to the stub driver such as "kbdjpn.DLL".

In the information processing apparatus 10, if the stub driver receives, in step S171, the information indicating that the alphanumeric key labeled "A" on the keyboard has been released, then, in the next step S172, the stub driver converts the received information indicating that the alphanumeric key labeled "A" on the keyboard has been released into information indicating that a specific key, "A" or "a" in this case, has been released. The resultant information is then supplied, as "WM_KEYUP", to the particular application 30a in the application program 30.

In the present information processing apparatus 10, as described above, when the Fn key locking mechanism is in either the enabled state or the disabled state and the Fn key is in the unlocked state, if a usual key other than the Fn key is pressed, a corresponding process is performed via the keyboard controller 11a in the normal manner.

In the information processing apparatus 10 according to the present embodiment described above, one of the additional keys is pressed and released. Alternatively, one of hotkey menu icons 2a, 2b, 2c, 2d, and 2f in the launcher 2 may be directly selected using a particular key such as a cursor key or tab key, a pointing device such as a mouse, or a jog dial. That is, instead of by pressing and releasing an additional key, the same process can be performed by directly selecting corresponding one of the hotkey menu icons 2a, 2b, 2c, 2d, and 2f in the launcher 2 using a particular key such as a cursor key or tab key, the pointing device such as the mouse, or the jog dial.

More specifically, in the present information processing apparatus 10, a desired one of the hotkey menu icons 2a, 2b, 2c, 2d, and 2f in the launcher 2 can be selected not only by directly pressing and releasing an additional key corresponding to the desired icon to be selected, but also by pressing and releasing a particular key such as a cursor key or a Tab key on the keyboard so as to focus the hotkey menu icon to be selected and then pressing and releasing the Enter key, thereby causing the same process as that performed in response to pressing and releasing the corresponding additional key to be performed under the control of the utility. Furthermore, in the present information processing apparatus 10, the same hotkey process as that performed in response to pressing and releasing an additional key can also be performed by a desired hotkey menu icon can also be selected by clicking on the icon with a pointing device such as a mouse. Also in this case, the same hotkey process as that performed in response to pressing and releasing the additional key corresponding to the clicked icon is performed under the control of the utility. Still furthermore, in the present information processing apparatus 10, a desired one of the hotkey menu icons can also be selected by rotating a jog dial so as to focus the hotkey menu icon to be selected and then pressing down the jog dial, thereby causing the same process as that performed in response to pressing and releasing the corresponding additional key to be performed under the control of the utility.

In the present information processing apparatus 10, if an application corresponding to an additional key is activated and a corresponding window is displayed on the display 16, the settings of the hotkey menu are changed under the control of the utility in response to an operation performed by a user. The setting of the hotkey menu may also be changed via an operation described below.

That is, in the present information processing apparatus 10, when the launcher 2 is active and displayed on the display 16, a desired one of the hotkey menu icons is focused on and selected by means of one of methods described earlier. In response, in the present information processing apparatus 10, an application corresponding to the selected hotkey menu icon is activated and a specific window is displayed on the display 16 under the control of the utility. In this state, a setting of the hotkey menu can be changed using a cursor key or the like. After changing the setting, if the Enter key is pressed and released, the setting is saved under the control of the utility.

In the present information processing apparatus 10, the settings of the respective hotkey menus can also be changed by performing the above operation. In the present information processing apparatus 10, after changing the setting of a hotkey menu corresponding to a hotkey menu icon, the setting of another hotkey menu can be changed by repeating the above-described operation without having to again press and release the Fn key.

Furthermore, in the present information processing apparatus 10, the built-in controller 11 may switch the state of the Fn key locking mechanism in response to a change in the state of a power supply.

That is, in the present information processing apparatus 10, as shown in FIG. 28, if the sate of the power supply has been switched from an active state into a sleep state, the state of the Fn key locking mechanism associated with the Fn key is switched into the unlocked state, while holding the Fn key locking mechanism in the same enabled or disabled state as the Fn key locking mechanism was before the transition of the state of the power supply. In the present information processing apparatus 10, if the sate of the power supply has been switched from an active state into a sleep state, the state of the Fn key locking mechanism is switched into the disabled and unlocked state. In the present information processing apparatus 10, if the state of the power supply is switched from a standby state into an active state, the state of the Fn key locking mechanism associated with the specific key is switched into the unlocked state, while holding the Fn key locking mechanism in the same enabled or disabled state as the Fn key locking mechanism was before the transition of the state of the power supply. In the present information processing apparatus 10, if the sate of the power supply has been switched from a sleep state into an active state, the Fn key locking mechanism is switched into the disabled and unlocked state.

In the present information processing apparatus 10, as described above, when the status of the power supply is changed, for example, by performing a hotkey process, the state of the Fn key locking mechanism is switched depending on the change in the state of the power supply.

In the present information processing apparatus 10, backward compatibility associated with the keyboard BIOS and the utility can be achieved even when one or both of the keyboard BIOS and the utility are not adapted to the Fn key locking mechanism, because the keyboard BIOS and the utility operate in the manner described below. Herein, for convenience, a BIOS and a utility which are adapted to the Fn key locking mechanism are respectively referred to as a new-type keyboard BIOS and a new-type utility, and a BIOS and a utility which are not adapted to the Fn key locking mechanism are respectively referred to as a conventional keyboard BIOS and a conventional utility.

More specifically, in the information processing apparatus 10, as shown in FIG. 29, in a case where a new-type keyboard BIOS and a new-type utility are combined together, the utility queries the keyboard BIOS whether the keyboard BIOS is adapted to the Fn key locking mechanism. In response, the keyboard BIOS informs the utility that the keyboard BIOS is adapted to the Fn key locking mechanism. Thus, the utility recognizes that the keyboard BIOS is adapted to the Fn key locking mechanism. Thereafter, if the keyboard BIOS receives a communication request from the utility, the keyboard BIOS behaves as a new-type keyboard BIOS. Thus, in this case, the information processing apparatus 10 behaves as an apparatus adapted to the Fn key locking mechanism.

In the information processing apparatus 10, as shown in FIG. 29, in a case where a new-type keyboard BIOS and a conventional utility are combined together, because the utility operates in the conventional manner and does not performs a process associated with the Fn key locking mechanism, the keyboard BIOS never receives a communication request from the utility and thus the keyboard BIOS operates in a similar manner to the conventional keyboard BIOS. Thus, in this case, the information processing apparatus 10 behaves as an apparatus which is not adapted to the Fn key locking mechanism.

In the information processing apparatus 10, as shown in FIG. 29, in a case where a conventional keyboard BIOS and a new-type utility are combined together, although the utility queries the keyboard BIOS whether the keyboard BIOS is adapted to the Fn key locking mechanism, the keyboard BIOS cannot reply to the query. Thus, the utility recognizes that the keyboard BIOS is not adapted to the Fn key locking mechanism. Thus, in this case, the information processing apparatus 10 behaves as an apparatus which is not adapted to the Fn key locking mechanism.

In the information processing apparatus 10, as shown in FIG. 29, in a case where a conventional keyboard BIOS and a conventional utility are combined together, the utility operates in the conventional manner without performing a process associated with the Fn key locking mechanism, and the keyboard BIOS operates in the conventional manner without performing a process associated with the Fn key locking mechanism. Thus, in this case, the information processing apparatus 10 behaves as an apparatus which is not adapted to the Fn key locking mechanism.

In the present information processing apparatus 10, as described above, backward compatibility can be achieved for any combination of the keyboard BIOS and the utility.

In the present information processing apparatus 10, as described above, the process associated with the Fn key locking mechanism is performed by the keyboard BIOS operating on the built-in controller 11 such that the Fn key locking mechanism has the enabled state in which the Fn key locking mechanism is enabled and also has the disabled state in which the Fn key locking mechanism is disabled, and such that the Fn key locking mechanism further has the locked state and the unlocked state which are switchable between each other when the Fn key locking mechanism is enabled. The keyboard BIOS and the utility communicate with each other via the SPIC 11*b* which is an input/output port different from the keyboard controller 11*a*, thereby allowing the utility to detect the state of the keyboard BIOS and set the keyboard BIOS regarding the state of the Fn key locking mechanism. This allows the information processing apparatus 10 to have not only the capability of hotkeys by means of simultaneously pressing a plurality of keys but also the capability of hotkeys by means of sequentially pressing a plurality of keys. Thus, the present information processing apparatus 10 allows even a user having a difficulty in simultaneously pressing a plurality of keys because of, for example, a physical disability, to easily use the hotkey capability.

Furthermore, in the present information processing apparatus 10, the launcher 2 including an array of hotkey menu icon buttons 2*a*, 2*b*, 2*c*, 2*d*, and 2*f* for performing the hotkey functions corresponding to the respective additional keys is displayed on the display 16 under the control of the utility, thereby allowing a user to call a desired hotkey function not only by pressing and releasing a corresponding additional key but also simply by selecting a corresponding hotkey menu icon via a predetermined operation without having to remember which additional key corresponds to which hotkey function, and thus providing a user interface which can be easily used by the user to use hotkey functions.

Furthermore, in the present information processing apparatus 10, because the keyboard BIOS can be controlled by the utility, the user can set the Fn key locking mechanism into a desired state at any time the user wants.

Furthermore, in the present information processing apparatus 10, by setting the Fn key locking mechanism into the disabled state, it is possible to provide a user interface similar to a conventional one in which a hotkey function is performed by simultaneously pressing a plurality of keys.

Furthermore, in the present information processing apparatus 10, because the conventional user interface, in which a hotkey function is called by simultaneously pressing a plurality of keys, and the Fn key locking mechanism are both available without causing any confliction, users who are proficient in the conventional operation can also use the hotkey capability without encountering any problem, even when the Fn key locking mechanism is in the enabled state.

Furthermore, in the present information processing apparatus 10, because the graphical user interfaces such as the setting dialog box 40 and the task tray icon 50 are displayed on the display 16 as required, the user can easily recognize the state of the Fn key locking mechanism.

Furthermore, in the present information processing apparatus 10, the Fn key locking mechanism can be controlled by software without having to use special hardware such as a PPK (Programmable Power Key) button. Furthermore, because the task tray icon 50 is displayed on the display 16 to inform the user of the state of the Fn key locking mechanism, additional special hardware such as an indication LED (Light Emitting Diode) is not needed, and thus the number of necessary parts can be reduced.

As described above, in the present information processing apparatus 10, it is possible to provide an excellent user interface having high operability and high convenience which meet requirements of various users, even in a case in which the information processing apparatus 10 in limited in space for installing the keyboard 1.

Note that the present invention is not limited to the embodiments described above. For example, although in the information processing apparatus according to the embodiments described above, the information processing apparatus has the Fn key locking mechanism, and the launcher 2 is displayed on the display 16, the present invention may also be applied to an information processing apparatus which does not have the Fn key locking mechanism.

Figure 30:
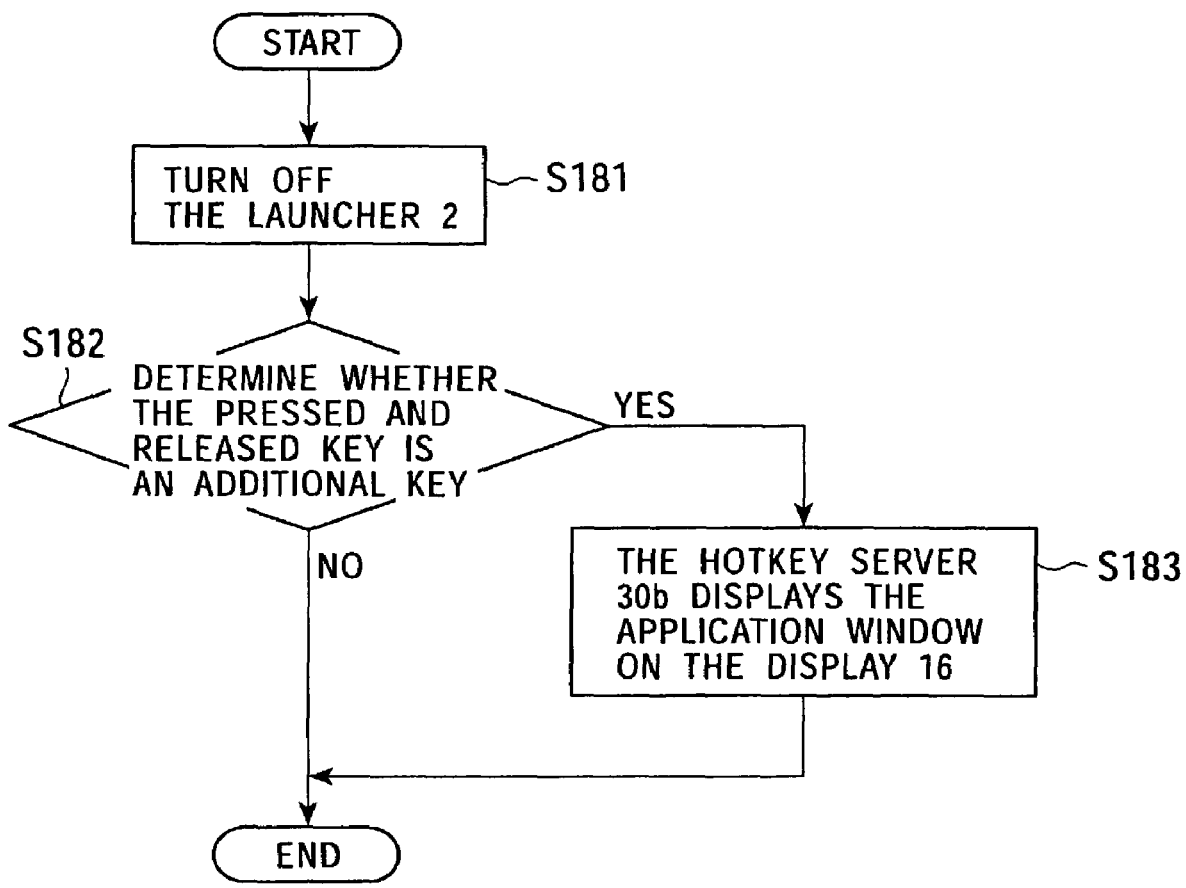
FIG. 30 is a flow chart showing a sequence of processing steps performed, in a case in which the Fn key locking mechanism is not provided, in response to pressing and releasing an arbitrary key when the launcher is displayed on the display.

More specifically, in the case in which the information processing apparatus 10 does not have the Fn key locking mechanism, although the display process described above with reference to FIG. 16 is performed in a similar manner as described above, the process to be performed, when the launcher 2 is displayed on the display 16, in response to pressing and releasing of an arbitrary key is performed not in accordance with the flow shown in FIG. 17 but in accordance with the flow shown in FIG. 30.

That is, as shown in FIG. 30, in the information processing apparatus 10, in step S181, the launcher 2 displayed on the display 16 is turned off under the control of the hotkey server 30b serving as the utility.

In the information processing apparatus 10, in the next step S182, on the basis of a scan code corresponding to the pressed and released key, the hotkey server 30b serving as the utility determines whether the pressed and released key is one of additional keys assigned as hotkeys used in combination with the Fn key.

If it is determined that the pressed and released key is not one of such additional keys, the information processing apparatus 10 terminates the sequence of processing steps.

On the other hand, in the present information processing apparatus 10, if it is determined that the pressed and released key is one of the additional keys, then in the next step S183, in order to present to the user the hotkey function corresponding to the combination of the Fn key and the additional key, a predetermined application window in the form of a graphical user interface is displayed on the display 16 under the control of the hotkey server 30b serving as the utility, and the sequence of processing steps is completed. In the above process performed in the present information processing apparatus 10, if, for example, a function key labeled "F5" on the keyboard is pressed and released as an additional key, the application for controlling the brightness of the display 16 is activated and a predetermined window is displayed on the display 16, as described earlier.

As described above, in the present information processing apparatus 10, even in the case in which the Fn key locking mechanism is not provided, when the launcher 2 is displayed on the display 16, if an arbitrary key is pressed and released, a process is performed depending on which key has been pressed and released.

Figure 31:
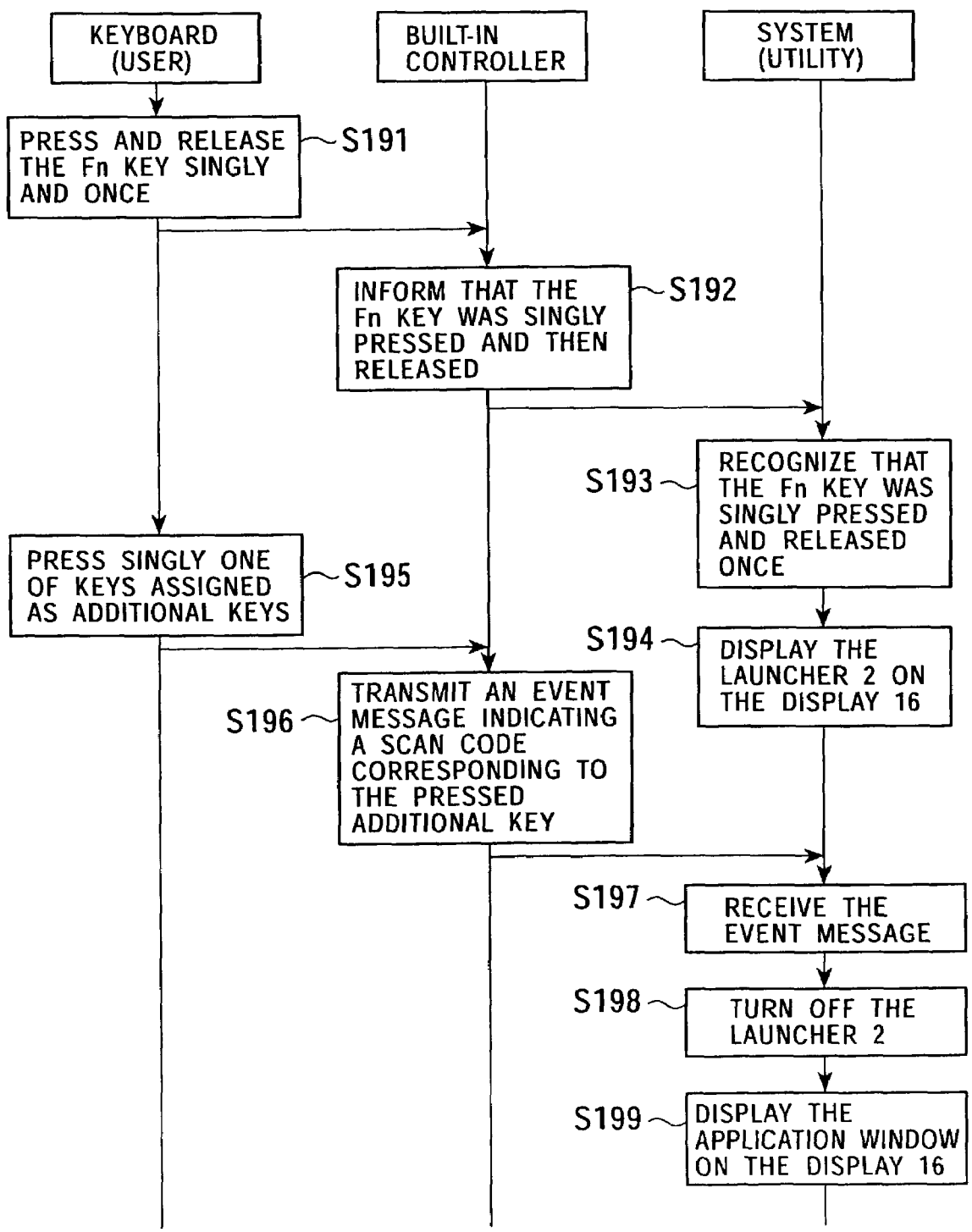
FIG. 31 is a flow chart showing a sequence of steps associated with a hotkey process performed, in a case in which the Fn key locking mechanism is not provided, in response to sequentially pressing the Fn key and an additional key.

In the present information processing apparatus 10, even in the case in which the Fn key locking mechanism is not provided, a hotkey process is performed, as shown in the flow chart of FIG. 31, in response to sequential pressing of the Fn key and one of the additional keys. More specifically, in the present information processing apparatus 10, when the launcher 2 is displayed on the display 16, if one of the additional keys is singly pressed and released, a hotkey process assigned to the combination of the Fn key and the pressed and released additional key is performed. The process is described in further detail below. Herein, it is assumed that the process starts from a state in which the launcher 2 is not displayed on the display 16.

As shown in FIG. 31, in the information processing apparatus 10, if, in step S191, a user presses and releases singly the Fn key on the keyboard 1 once, the pressing and releasing of the Fn key is detected by the built-in controller 11 monitoring the input operation on the keyboard 1.

In the information processing apparatus 10, in the next step S192, the built-in controller 11 informs the utility that the Fn key has been singly pressed and released. In the above process, in the present information processing apparatus 10, the information indicating that the Fn key has been singly pressed and released is transmitted not via the keyboard controller 11a but via the SPIC 11b.

In the information processing apparatus 10, in the next step S193, the utility receives the information indicating that the Fn key has been singly pressed and released once.

In response, in the information processing apparatus 10, in the next step S194, a launcher 2 is displayed on the display 16 under the control of the utility. More specifically, in the present information processing apparatus 10, the process described above with reference to FIG. 16 is performed to display the launcher 2 on the display 16.

Thereafter, in the information processing apparatus 10, in step S195, if one of the additional keys, on the keyboard 1, assigned for use as hotkeys in combination with the Fn key is pressed by the user, then the pressing of the key is detected by the built-in controller 11 monitoring the input operation on the keyboard 1. For example, in the present information processing apparatus 10, when the user wants to activate a hotkey process for brightness control of the display 16, the user can do it by pressing the function key labeled "F5" on the keyboard serving as an additional key.

In the information processing apparatus 10, in the next step S196, the built-in controller 11 transmits, to the utility, an event message indicating a scan code corresponding to the pressed key. In this case, in the present information processing apparatus 10, the above event message is transmitted via the keyboard controller 11a.

In the information processing apparatus 10, in step S197, the utility receives the event message transmitted from the built-in controller 11. In step S198, under the control of the utility, the launcher 2 displayed on the display 16 is turned off. In the next step S199, in order to present to the user the hotkey function corresponding to the combination of the Fn key and the additional key, the application window serving as the graphical user interface is displayed on the display 16 under the control of the utility, and the sequence of processing steps is completed. More specifically, in the present information processing apparatus 10, the process described above with reference to FIG. 30 is performed to display the application window on the display 16. For example, in the present information processing apparatus 10, in a case in which the event message received by the utility indicates the scan code corresponding to the function key labeled "F5" on the keyboard, the application for controlling the brightness of the display 16 is activated and the predetermined window is displayed on the display 16 so as to present an environment which allows the user to adjust the brightness.

As described above, in the present information processing apparatus 10, even in the case in which the Fn key locking mechanism is not provided, the launcher 2 serving as the graphical user interface is displayed on the display 16 thereby allowing a user to call a hotkey function corresponding to an additional key by singly pressing and releasing the additional key indicated in the launcher 2. That is, in the present information processing apparatus 10, even in the case in which the Fn key locking mechanism is not provided, a desired hotkey function can be called by sequentially pressing the Fn key and an additional key instead of simultaneously pressing and releasing them.

In the embodiment described above, when the Fn key is singly pressed and released, the launcher 2 is displayed on the display 16 or turned off. Alternatively, in the present invention, the number of times the Fn key is pressed and released to trigger the turning on or off the launcher 2 may be set to any arbitrary value, and another key other than the Fn key or another device may be used to trigger it. Specific examples of triggering methods other than pressing the Fn key include operating a jog dial in a predetermined manner, clicking on, using a pointing device such as mouse, a desired one of the icons displayed on the display 16, and pressing and releasing a dedicated PPK button.

In the embodiment described above, when a user have pressed and released the Fn key successively 5 times, the setting dialog box 40 for setting the Fn key locking mechanism into the enabled state or the disabled state is displayed on the display 16, and setting is performed under the control of the utility. Alternatively, in the present invention, the number of times the Fn key is pressed and released to trigger the displaying of the setting dialog box 40 may be set arbitrarily. Furthermore, another key other than the Fn key may be used as a triggering key.

In the embodiment described above, when the Fn key locking mechanism is in the enabled state, if the Fn key is singly pressed and released once, a transition between the locked state and the unlocked state occurs. Alternatively, in the present invention, the number of times the Fn key is pressed and released to trigger the transition may be set to any arbitrary value. Furthermore, another key other than the Fn key may be used to trigger the transition.

In the embodiments described above, when an arbitrary key is pressed and released, the Fn key locking mechanism is basically switched into the unlocked state. Alternatively, in the present invention, the Fn key locking mechanism may be maintained in the locked state regardless of how many times an arbitrary key is pressed and released, unless a user intentionally switches the Fn key locking mechanism from the locked state into the unlocked state.

In the embodiment described above, the task tray icons 50 is displayed on the display 16 in order to inform a user of the state of the Fn key locking mechanism. Alternatively, in the present invention, an indication LED may be provided instead of displaying the task tray icon 50 on the display 16. In this case, the color of the LED may be changed or the LED may be blinked depending on the state of the Fn key locking mechanism. For example, no LED may be lit when the Fn key locking mechanism is in the disabled state, a green LED may be lit in the enabled and unlocked state, and an orange LED may be lit in the enabled and locked state.

In the embodiment described above, when the Fn key locking mechanism is in the disabled state, the task tray icons 50 is not displayed. Alternatively, in the present invention, the task tray icon 50 indicating that the Fn key locking mechanism is in the disabled state may be displayed on the display 16.

In the present invention, the utility may set and control the various states of the Fn key locking mechanism, such as the enabled state, the disabled state, the locked state, and the unlocked state.

In the present invention, an application for displaying the launcher 2 on the display 16 and an application for turning off the launcher 2 may be separately provided and they may be implemented in the hotkey server 30*b*.

Figure 32:
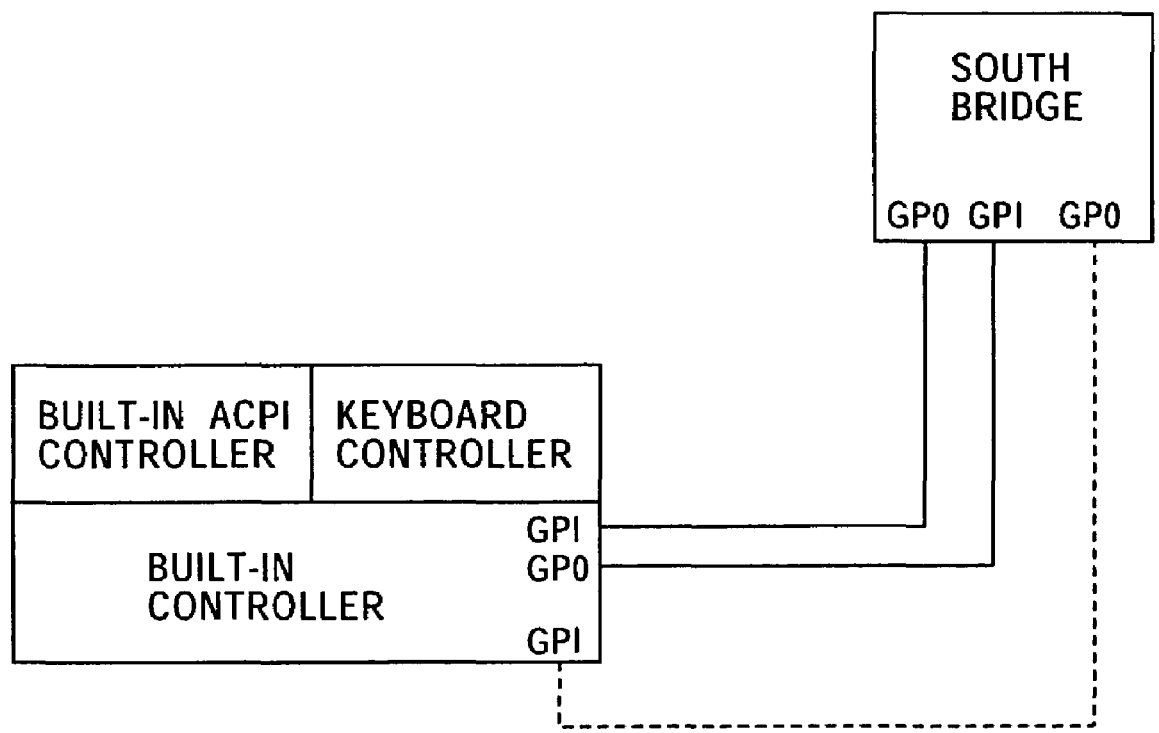
FIG. 32 is a block diagram showing the hardware structure of an information processing apparatus capable of performing a process associated with the Fn key locking mechanism by means of using hardware.

In the embodiment described above, the process associated with the Fn key locking mechanism is performed by software. Alternatively, in the present invention, the process associated with the Fn key locking mechanism may be performed by hardware using, for example, a PPK button corresponding to a hotkey. More specifically, in the information processing apparatus 10, as shown in FIG. 32, the built-in controller may be directly connected to a south bridge in a chip set for controlling a PPK button via a GPIO (General Purpose Input/Output port) serving as a port different from the keyboard controller implemented on the built-in controller or an ACPI (Advanced Configuration Power Interface) controller, whereby the process associated with the Fn key locking mechanism may be performed by means of hardware.

In the embodiments described above, the Esc (escape) key and functions keys labeled "F3", "F4", "F5", and "F12" on the keyboard are employed as the additional keys, and the suspend function, the muting function, the volume control function, the brightness control function, and the hibernation function are assigned as the specific processes to the respective additional keys. Alternatively, in the present invention, another key other than those described above may also be employed as an additional key, and the processes assigned to the additional keys are not limited to those described above.

In the embodiment described above, the hotkeys are realized in combination with the Fn key. Alternatively, in the present invention, hotkeys may also be realized in combination with another specific key.

In the embodiment described above, in a case in which a hotkey is used by means of simultaneously pressing the Fn key and an additional key, in response to pressing of the Fn key, information indicating the Fn key has been pressed is supplied to the utility, while in a case in which a hotkey is used not by means of simultaneously pressing the Fn key and an additional key, in response to pressing and releasing the key, information indicating that the key has been pressed and released is supplied to the utility. Alternatively, in the present invention, instead of detecting and informing of both pressing and releasing of the key, only pressing of the key may be detected and informed of.

In the embodiments described above, the Fn key locking mechanism is controlled by the keyboard BIOS. Alternatively, in the present invention, the Fn key locking mechanism may be controlled by the operating system. In the present invention, in the case in which the Fn key locking mechanism is controlled by the operating system, an application program located at a level higher than the operating system may set the operating system so that the Fn key locking mechanism is controlled via the application program.

For example, in the present information processing apparatus 10, a system at a level higher than the keyboard BIOS may set and control the drivers embedded in the operating system 20 thereby setting the state of the Fn key locking mechanism. Information associated with the state of the Fn key locking mechanism controlled by the operating system 20 is supplied to the keyboard BIOS at a level lower than the system via an input/output port different from the keyboard controller 11*a* thereby setting the built-in controller 11 so as to reflect the state of the Fn key locking mechanism. More specifically, in the present information processing apparatus 10, if the state of the Fn key locking mechanism is set or changed by the operating system 20, information associated with the state of the Fn key locking mechanism is supplied to the application program 30, thereby activating the utility in the application 30*b* or the application 30*a*. In the present information processing apparatus 10, at the same time as the information associated with the state of the Fn key locking mechanism is supplied to the application program 30, the information is also supplied to the built-in controller 11 thereby setting the keyboard 1 so as to reflect the state of the Fn key locking mechanism set by the operating system 20. In the present information processing apparatus 10, if the state of the Fn key locking mechanism is set by the operating system 20, the launcher 2 is displayed on the display 16 under the control of the utility in the application 30b and the Fn key locking mechanism is made usable, thereby allowing a user to call a desired hotkey function by sequentially pressing the Fn key and an additional key without having to simultaneously press them.

As described above, in the present invention, various modifications are possible without departing from the sprit and scope of the invention.

As can be understood from the above description, the present invention has great advantages. That is, the present invention provides the information processing apparatus having a capability of performing a specific process in response to pressing of a combination of a predetermined specific key and a predetermined additional key, the information processing apparatus comprising: key input means including a plurality of keys arranged thereon and including the specific key and the additional key; control means for controlling the key input means and for controlling displaying, on the display means, various kinds of information including at least a user interface for presenting a specific menu including a specific process menu icon button assigned to the specific process corresponding to the additional key, wherein, in response to pressing or releasing of the specific key, the control means activates the user interface for presenting the specific menu and displays the user interface on the display means.

In this information processing apparatus according to the present invention, in response to pressing or releasing of the specific key, the control means activates the user interface for presenting the specific menu and displays the user interface on the display means, thereby allowing a user to perform a desired specific process not only by simultaneously pressing a plurality of keys in the conventional manner but also by sequentially pressing the plurality of keys in accordance with the user interface for presenting the specific menu. This allows even a user having a difficulty in simultaneously pressing a plurality of keys because of, for example, a physical disability, to easily use the hotkey capability. Furthermore, because the conventional user interface in which a hotkey function is called by simultaneously pressing a plurality of keys and the user interface for presenting the specific menu are both available without causing any confliction, users who are proficient in the conventional operation can also use hotkeys without encountering any problem, and thus it is possible to provide an excellent user interface having high operability and high convenience which meet requirements of various users.

The information processing apparatus according to the present invention may further comprise built-in control means for operating firmware so as to monitor the key input means to detect an input operation performed on the key input means, wherein the built-in control means includes first and second input/output ports which are logically different from each other and implemented in the built-in control means, the first input/output port having a capability of transmitting information to a higher-level system in response to pressing or releasing of a normal key other than the specific key on the key input means to notify the higher-level system that the normal key has been pressed or released, the second input/output port serving to communicate with the control means; and in response to pressing or releasing of the specific key, the built-in control means transmits, by operating the firmware and via the second input/output port, information indicating that the specific key has been pressed or released to a utility which is software executed by the control means to control the key input means and control displaying, on the display means, various kinds of information including the user interface for presenting the specific menu.

In the information processing apparatus according to the present invention, the built-in control means may perform a process associated with a specific key locking mechanism having a locked state in which the specific key is equivalently kept pressed down although the specific key is not actually pressed down and also having an unlocked state in which the specific key is equivalently not pressed; and the control means may display, on the display means, the user interface which indicates at least the state of the specific key locking mechanism.

In this information processing apparatus according to the present invention, the control means may detect the state of the built-in control means via the second input/output port, and the control means may set the built-in control means into either an enabled state in which the specific key locking mechanism is enabled or a disabled state in which the specific key locking mechanism is disabled.

Thus, in this information processing apparatus according to the present invention, in response to pressing or releasing of the specific key, the built-in control means operates firmware so as to inform the utility via the second input/output port that the specific key has been pressed or released, and the control means operates the utility so as to activate the user interface for presenting the specific menu and display the user interface on the display means. The control means performs the process associated with the specific key locking mechanism such that the control means operates the utility so as to detect the state of the firmware via the second input/output port and to set the firmware into either the enabled state or the disabled state, thereby presenting both the conventional user interface in which a hotkey function is called by simultaneously pressing a plurality of keys and the Fn key locking mechanism without causing any confliction, and thus allowing users who are proficient in the conventional operation to use hotkeys without encountering any problem.

In the information processing apparatus according to the present invention, the control means may display, on the display means, a user interface for setting the specific key locking mechanism into the enabled state or the disabled state.

Thus, in the information processing apparatus, the user interface for setting the specific key locking mechanism into the enabled state or the disabled state is displayed on the display means under the control of the control means, thereby allowing a user to easily set the state of the specific key locking mechanism.

In the information processing apparatus according to the present invention, when the specific key locking mechanism is in the enabled state, the control means may display, on the display means, the state indication user interface so as to indicate that the specific key locking mechanism is in the enabled state.

In the information processing apparatus according to the present invention, when the specific key locking mechanism is in the disabled state, the control means may not display the state indication user interface on the display means, or the control means may display, on the display means, the state indication user interface indicating that the specific key locking mechanism is in the disabled state.

Thus, in the information processing apparatus according to the present invention, if the specific key locking mechanism is in the enabled state, the control means operates the utility so as to display, on the display means, a state indication user interface indicating that the specific key locking mechanism is in the enabled state. On the other hand, if the specific key locking mechanism is in the disabled state, the control means operates the utility so as to not display the state indication user interface on the display means or so as to display, on the display means, the state indication user interface indicating that the specific key locking mechanism is in the disabled state, thereby allowing a user to easily recognize the state of the Fn key locking mechanism.

The present invention also provides the an information processing method for performing a specific process in response to pressing of a combination of a predetermined specific key and a predetermined additional key, the information processing method comprising the steps of controlling key input means and controlling displaying, on display means, various kinds of information including at least a user interface for presenting a specific menu including a specific process menu icon button assigned to the specific process corresponding to the additional key; and in response to pressing or releasing of the specific key disposed on key input means including a plurality of keys arranged thereon and including the specific key and the additional key, activating the user interface for presenting the specific menu and displaying the user interface on the display means.

Thus, in the information processing method according to the present invention, in response to pressing or releasing of the specific key, the user interface for presenting the specific menu is activated and displayed on the display means, thereby allowing a user to perform a desired specific process not only by simultaneously pressing a plurality of keys in the conventional manner but also by sequentially pressing the plurality of keys in accordance with the user interface for presenting the specific menu. This allows even a user having a difficulty in simultaneously pressing a plurality of keys because of, for example, a physical disability, to easily use the hotkey capability. Furthermore, because the conventional user interface in which a hotkey function is called by simultaneously pressing a plurality of keys and the user interface for presenting the specific menu are both available without causing any confliction, users who are proficient in the conventional operation can also use hotkeys without encountering any problem, and thus it is possible to provide an excellent user interface having high operability and high convenience which meet requirements of various users.

The information processing method according to the present invention may further comprising the steps of monitoring, by operating firmware, the key input means to detect an input operation performed on the key input means; and in response to detecting that the specific key has been pressed or released, notifying the utility that the specific key has been pressed or released, via a second input/output port for communicating with a utility which is software for controlling the key input means and display means on which various kinds of information including the user interface for presenting the specific menu are displayed, the second input/output port being logically different from a first input/output port having a capability of transmitting information to a higher-level system in response to pressing or releasing of a normal key, on the key input means, other than the specific key to notify the higher-level system that the normal key has been pressed or released.

In this information processing method according to the present invention, the firmware may be operated so as to perform a process associated with a specific key locking mechanism having a locked state in which the specific key is equivalently kept pressed down although the specific key is not actually pressed down and also having an unlocked state in which the specific key is equivalently not pressed; and the user interface which indicates at least the state of the specific key locking mechanism may be displayed on the display means.

In this information processing method according to the present invention, the utility may be operated so as to detect the state of the firmware via the second input/output port and set the firmware into either an enabled state in which the specific key locking mechanism is enabled or a disabled state in which the specific key locking mechanism is disabled.

Thus, in the information processing method according to the present invention, in response to pressing or releasing of the specific key, the firmware is operated so as to inform the utility via the second input/output port that the specific key has been pressed or released, and the utility is operated so as to activate the user interface for presenting the specific menu and display the user interface on the display means. Furthermore, the process associated with the specific key locking mechanism is performed such that the utility is operated so as to detect the state of the firmware via the second input/output port and to set the firmware into either the enabled state or the disabled state, thereby presenting both the conventional user interface in which a hotkey function is called by simultaneously pressing a plurality of keys and the Fn key locking mechanism without causing any confliction, and thus allowing users who are proficient in the conventional operation to use hotkeys without encountering any problem.

In this information processing method according to the present invention, the user interface for setting the specific key locking mechanism into the enabled state or the disabled state may be displayed on the display means under the control of the utility.

Thus, in the information processing method according to the present invention, said utility is operated so as to display, on the display means, the user interface for setting the specific key locking mechanism into the enabled state or the disabled state, thereby allowing a user to easily set the state of the specific key locking mechanism.

In this information processing method according to the present invention, if the specific key locking mechanism is in the enabled state, the state indication user interface indicating that the specific key locking mechanism is in the enabled state is displayed on the display means under the control of the utility.

In this information processing method according to the present invention, if the specific key locking mechanism is in the disabled state, the utility is operated so as to not display the state indication user interface on the display means or so as to display, on the display means, the state indication user interface indicating that the specific key locking mechanism is in the disabled state.

Thus, in the information processing method according to the present invention, if the specific key locking mechanism is in the enabled state, the utility is operated so as to display, on the display means, a state indication user interface indicating that the specific key locking mechanism is in the enabled state, while, if the specific key locking mechanism is in the disabled state, the utility is operated so as to not display the state indication user interface on the display means or so as to display, on the display means, the state indication user interface indicating that the specific key locking mechanism is in the disabled state, thereby allowing a user to easily recognize the state of the Fn key locking mechanism.

What is claimed is:

1. An information processing apparatus controlled by an operating system including a keyboard driver and a utility separate from the keyboard driver, comprising:

a keyboard including a plurality of keys arranged thereon including a predetermined specific key;

a display configured to display information in response to pressing one of the plurality of keys;

a key lock enabling device configured to switch the information processing apparatus between a key lock disabled state and a key lock enabled state;

a specific key locking device configured to switch the information processing apparatus between a specific key locked state to a specific key unlocked state, the specific key locked state being a state in which the predetermined specific key is considered by the information processing apparatus to be pressed down when the predetermined specific key is not actually pressed, the specific key unlocked state being a state in which the predetermined specific key is not considered by the information processing apparatus to be pressed down when the predetermined specific key is not actually pressed, the specific key locking device being functional only when the key lock enabled state is set; and a built-in controller including a keyboard controller configured to inform the keyboard driver that a key other than the predetermined specific key has been pressed or released when the specific key locked state is not set, and a special key controller configured to inform the utility separate from the keyboard driver that the predetermined special key has been pressed, wherein the specific key locking device is configured to instruct the utility via the special key controller to execute a predetermined locked state hotkey operation when the specific key locked state is enabled and after a second predetermined key is pressed, and the specific key locking device is configured to switch the information processing apparatus from the specific key locked state to the specific key unlocked state when the predetermined specific key is pressed and released, the key other than the predetermined specific key is pressed and released while the predetermined specific key is not pressed, or the predetermined specific key is pressed and held, and the second predetermined key is pressed, said built-in controller further configured, after the specific key locked state is enabled and after the second predetermined key is pressed, to cause the display to display a menu including a menu icon assigned to the predetermined locked state hotkey operation, wherein the built-in controller is further configured to cause the display to display or remove the menu in response to pressing or releasing of the predetermined specific key singly.

2. The information processing apparatus of claim 1, wherein the built-in controller is configured to cause the display to display a user interface for selecting one of the key lock enabled state and the key lock disabled state.

3. The information processing apparatus of claim 1, wherein the built-in controller is configured to switch the information processing apparatus between the key lock enabled state and the key lock disabled state in response to detecting a predetermined number of pushes of the predetermined specific key.

4. The information processing apparatus of claim 3, wherein the built-in controller is configured to transmit a state switch command to the utility via the special key controller.

5. The information processing apparatus of claim 4, wherein the built-in controller is configured to instruct the key lock enabling device to switch the information processing apparatus between the key lock enabled state and the key lock disabled state in accordance with the state switch command.

6. The information processing apparatus of claim 1, wherein the built-in controller is configured to switch the information processing apparatus between the specific key unlocked state and the specific key locked state depending on a power supply state.

7. The information processing apparatus of claim 6, wherein the built-in controller is configured to switch the information processing apparatus to the specific key unlocked state without switching the information processing apparatus between the key lock disabled state and the key lock enabled state if the power supply state has switched from an active state to a standby state.

8. The information processing apparatus of claim 6, wherein the built-in controller is configured to switch the information processing apparatus to the key lock disabled state if the power supply has switched from an active state to a sleep state.

9. The information processing apparatus of claim 6, wherein the built-in controller is configured to switch the information processing apparatus to the specific key unlocked state without switching the information processing apparatus between the key lock disabled state and the key lock enabled state if the power supply has switched from a standby state to an active state.

10. The information processing apparatus of claim 6, wherein the built-in controller is configured to switch the information processing apparatus to the key lock disabled state if the power supply has switched from a sleep state to an active state.

11. The information processing apparatus of claim 1, wherein the predetermined specific key functions as a switch for causing the second predetermined key to act as a key which does not exist in a pre-established key table to cause the information processing apparatus to perform a specific process.

12. The information processing apparatus of claim 1, wherein the predetermined specific key is an Fn key labeled Fn on the keyboard.

13. The information processing apparatus of claim 1, wherein the built-in controller is configured to cause the display to display an icon indicating that the specific key locked state is in effect.

14. The information processing apparatus of claim 1, wherein the specific key locking device is configured to instruct the keyboard driver via the keyboard controller to execute the predetermined unlocked state hotkey operation when the predetermined specific key and the second predetermined key are pressed without switching the information processing apparatus to the specific key locked state when the key lock disabled state in effect or when the specific key unlocked state is in effect.

15. A method of operating an information processing apparatus controlled by an operating system including a keyboard driver and a utility separate from the keyboard driver, the information processing apparatus including a keyboard including a plurality of keys arranged thereon including a predetermined specific key, and a display, comprising:

switching the information processing apparatus between a key lock disabled state and a key lock enabled state;

only when the key lock enabled state is set, switching the information processing apparatus between a specific key locked state to a specific key unlocked state, the specific key locked state being a state in which the predetermined specific key is considered by the information processing apparatus to be pressed down when the predetermined specific key is not actually pressed, the specific key unlocked state being a state in which the predetermined specific key is not considered by the information processing apparatus to be pressed down when the predetermined specific key is not actually pressed;

informing the keyboard driver via a keyboard controller that a key other than the predetermined specific key has been pressed or released when the specific key locked state is not set, and informing, via a special key controller, the utility separate from the keyboard driver that the predetermined special key has been pressed;

instructing the utility via the special key controller to execute a predetermined locked state hotkey operation when the specific key locked state is enabled and after a second predetermined key is pressed; and switching the information processing apparatus from the specific key locked state to the specific key unlocked state when
- the predetermined specific key is pressed and released,
- the key other than the predetermined specific key is pressed and released when the predetermined specific key is not pressed, or
- the predetermined specific key is pressed and held, and the second predetermined key is pressed;

after the specific key locked state is enabled and after the second predetermined key is pressed, displaying a menu including a menu icon assigned to the predetermined locked state hotkey operation; and displaying or removing the menu in response to pressing or releasing of the predetermined specific key singly.

16. The method of claim 15, further comprising one of:
displaying of a user interface for selecting one of the key lock enabled state and the key lock disabled state, and
switching the information processing apparatus between the key lock enabled state and the key lock disabled state in response to detecting a predetermined number of pushes of the predetermined specific key.

17. The method of claim 16, further comprising:
transmitting a state switch command to the utility via the special key controller.

18. The method of claim 15, further comprising:
switching the information processing apparatus between the specific key unlocked state and the specific key locked state depending on a power supply state.

19. The method of claim 18, further comprising:
switching the information processing apparatus to the specific key unlocked state without switching the information processing apparatus between the key lock disabled state and the key lock enabled state if the power supply state has switched from an active state to a standby state.

20. The method of claim 18, further comprising:
switching the information processing apparatus to the key lock disabled state if the power supply has switched from an active state to a sleep state.

21. The method of claim 18, further comprising:
switching the information processing apparatus to the specific key unlocked state without switching the information processing apparatus between the key lock disabled state and the key lock enabled state if the power supply has switched from a standby state to an active state.

22. The method of claim 18, further comprising:
switching the information processing apparatus to the key lock disabled state if the power supply has switched from a sleep state to an active state.

23. The method of claim 15, wherein the predetermined specific key functions as a switch for causing the second predetermined key to act as a key which does not exist in a pre-established key table to cause the information processing apparatus to perform a specific process.

24. The method of claim 15, wherein the predetermined specific key is an Fn key labeled Fn on the keyboard.

25. The method of claim 15, further comprising:
displaying an icon indicating that the specific key locked state is in effect.

26. The method of claim 15, further comprising:
instructing the keyboard driver via the keyboard controller to execute the predetermined unlocked state hotkey operation when the predetermined specific key and the second predetermined key are pressed without switching the information processing apparatus to the specific key locked state when the key lock disabled state in effect or when the specific key unlocked state is in effect.

* * * * *